(12) United States Patent
Asami et al.

(10) Patent No.: US 8,909,935 B2
(45) Date of Patent: Dec. 9, 2014

(54) INFORMATION PROCESSING SYSTEM

(71) Applicant: Sony Corporation, Tokyo (JP)

(72) Inventors: Akiko Asami, Shizuoka (JP); Takashi Suzuki, Tokyo (JP); Takashi Takeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/056,666

(22) Filed: Oct. 17, 2013

(65) Prior Publication Data
US 2014/0042223 A1 Feb. 13, 2014

Related U.S. Application Data

(63) Continuation of application No. 10/515,936, filed as application No. PCT/JP03/06725 on May 29, 2003, now Pat. No. 8,601,277.

(30) Foreign Application Priority Data

May 29, 2002 (JP) ................................. 2002-156051

(51) Int. Cl.
*G06F 21/00* (2013.01)
*G07F 7/12* (2006.01)
(Continued)

(52) U.S. Cl.
CPC ............... *G06F 21/34* (2013.01); *G07F 7/122* (2013.01); *G07F 7/02* (2013.01); *G07F 7/08* (2013.01); *G06Q 20/04* (2013.01); *G06Q 30/06* (2013.01); *G06Q 20/341* (2013.01); *G06Q 20/12* (2013.01); *G07F 7/1008* (2013.01); *G06Q 20/40145* (2013.01); *H04W 8/26* (2013.01); *G06Q 20/3433* (2013.01); *G06Q 20/28* (2013.01); *H04W 4/00* (2013.01); *H04L 63/0853* (2013.01); *G06Q 10/10* (2013.01)
USPC .................. 713/182; 726/26; 726/4; 235/380

(58) Field of Classification Search
None
See application file for complete search history.

(56) References Cited

U.S. PATENT DOCUMENTS 5,845,260 A * 12/1998 Nakano et al. ................... 705/17
5,883,960 A * 3/1999 Maruyama et al. ........... 380/249
(Continued)

FOREIGN PATENT DOCUMENTS

| CA | 2267672 | 8/2000 |
| CN | 1268721 | 10/2000 |

(Continued)

OTHER PUBLICATIONS

Summons to Attend Oral Proceedings Purusant to Rule 115(1) EPC.
(Continued)

*Primary Examiner* — Fikremariam A Yalew
(74) *Attorney, Agent, or Firm* — K&L Gates LLP

(57) ABSTRACT

An information processing system, an information processing method for use with the system, an information providing system, and information providing method for use with the system, an information processing apparatus, an information processing method for use with the apparatus, a doll, an object, a program storage medium, and a program for authenticating users reliably are provided. A user acquires beforehand a doll called Pochara the Good Friend incorporating an IC chip that stores a user ID for authenticating the user. When the user mounts the doll on a platform connected to a personal computer, the user ID is read from the IC chip by a reader housed in the platform and transmitted over the Internet to a Pochara service server. The server has a Pochara database holding personal information about users of the service. The transmitted user ID is checked against the personal information in the database for authentication. This invention applies advantageously to servers offering services through networks.

24 Claims, 74 Drawing Sheets

(51) Int. Cl.

| | |
|---|---|
| *G07F 7/02* | (2006.01) |
| *G07F 7/08* | (2006.01) |
| *G06Q 20/04* | (2012.01) |
| *G06Q 30/06* | (2012.01) |
| *G06Q 20/34* | (2012.01) |
| *G06Q 20/12* | (2012.01) |
| *G07F 7/10* | (2006.01) |
| *G06Q 20/40* | (2012.01) |
| *G06F 21/34* | (2013.01) |
| *G06Q 20/28* | (2012.01) |
| *H04L 29/06* | (2006.01) |
| *G06Q 10/10* | (2012.01) |
| *H04W 8/26* | (2009.01) |
| *H04W 4/00* | (2009.01) |

(56) References Cited

U.S. PATENT DOCUMENTS

| | | | |
|---|---|---|---|
| 6,069,957 A * | 5/2000 | Richards | 380/281 |
| 6,108,789 A * | 8/2000 | Dancs et al. | 726/9 |
| 6,111,882 A | 8/2000 | Yamamoto | |
| 6,137,480 A | 10/2000 | Shintani | |
| 6,199,114 B1 | 3/2001 | White | |
| 6,202,211 B1 | 3/2001 | Williams, Jr. | |
| 6,226,744 B1 | 5/2001 | Murphy et al. | |
| 6,259,443 B1 | 7/2001 | Williams, Jr. | |
| 6,363,210 B1 | 3/2002 | Owashi et al. | |
| 6,380,971 B1 | 4/2002 | Brodigan | |
| 6,385,651 B2 | 5/2002 | Dancs et al. | |
| 6,654,797 B1 | 11/2003 | Kamper | |
| 6,678,004 B1 | 1/2004 | Schultheiss et al. | |
| 6,690,795 B1 | 2/2004 | Richards | |
| 6,738,901 B1 | 5/2004 | Boyles et al. | |
| 6,760,841 B1 | 7/2004 | Fernandez | |
| 6,845,388 B1 * | 1/2005 | Philyaw | 709/204 |
| 6,905,411 B2 | 6/2005 | Nguyen et al. | |
| 6,925,651 B2 | 8/2005 | Foster et al. | |
| 6,934,855 B1 | 8/2005 | Kipnis et al. | |
| 7,023,858 B2 | 4/2006 | Ozawa et al. | |
| 7,047,551 B2 | 5/2006 | Ogawa et al. | |
| 7,047,558 B1 | 5/2006 | Mariana | |
| 7,050,090 B2 | 5/2006 | Brodigan | |
| 7,080,400 B1 | 7/2006 | Navar | |
| 7,111,051 B2 | 9/2006 | Kobakht et al. | |
| 7,117,364 B1 | 10/2006 | Hepper et al. | |
| 1,739,398 A1 | 11/2006 | Candelore et al. | |
| 7,143,953 B2 * | 12/2006 | Takahashi et al. | 235/494 |
| 7,194,545 B2 | 3/2007 | Urien | |
| 7,239,709 B1 | 7/2007 | Yamada et al. | |
| 7,278,586 B2 * | 10/2007 | Takahashi et al. | 235/494 |
| 7,292,775 B1 | 11/2007 | Boyle et al. | |
| 7,340,773 B2 | 3/2008 | Edwards | |
| 7,424,732 B2 | 9/2008 | Matsumoto et al. | |
| 7,484,236 B2 | 1/2009 | Alao et al. | |
| 7,490,346 B2 | 2/2009 | Alao et al. | |
| 7,552,333 B2 | 6/2009 | Wheeler et al. | |
| 7,558,965 B2 | 7/2009 | Wheeler et al. | |
| 7,571,257 B2 | 8/2009 | Guthery | |
| 7,729,986 B1 | 6/2010 | Hoffman et al. | |
| 8,019,609 B2 * | 9/2011 | Tamir et al. | 704/273 |
| 2001/0023892 A1 | 9/2001 | Hendrick | |
| 2001/0030959 A1 | 10/2001 | Ozawa et al. | |
| 2001/0039583 A1 | 11/2001 | Nobakht et al. | |
| 2002/0016913 A1 | 2/2002 | Wheeler et al. | |
| 2002/0016972 A1 | 2/2002 | Ogawa et al. | |
| 2002/0046101 A1 | 4/2002 | Ogawa et al. | |
| 2002/0049980 A1 | 4/2002 | Hoang | |
| 2002/0049982 A1 | 4/2002 | Kikinis | |
| 2002/0062287 A1 | 5/2002 | Katz et al. | |
| 2002/0065950 A1 | 5/2002 | Katz et al. | |
| 2002/0066042 A1 | 5/2002 | Matsumoto et al. | |
| 2002/0069169 A1 | 6/2002 | Sukeda et al. | |
| 2002/0073428 A1 | 6/2002 | Gurevich et al. | |
| 2002/0077979 A1 | 6/2002 | Nagata | |
| 2002/0080160 A1 | 6/2002 | Devito et al. | |
| 2002/0108121 A1 | 8/2002 | Alao et al. | |
| 2002/0108122 A1 | 8/2002 | Alao et al. | |
| 2002/0117542 A1 | 8/2002 | Hamann et al. | |
| 2002/0124092 A1 | 9/2002 | Urien | |
| 2002/0126207 A1 | 9/2002 | Brodigan | |
| 2002/0129358 A1 | 9/2002 | Buehl et al. | |
| 2002/0137496 A1 | 9/2002 | Nagaoka et al. | |
| 2002/0169885 A1 | 11/2002 | Alao et al. | |
| 2002/0196939 A1 | 12/2002 | Unger et al. | |
| 2003/0009667 A1 | 1/2003 | Horiuchi et al. | |
| 2003/0012382 A1 | 1/2003 | Ferchichi et al. | |
| 2003/0014372 A1 | 1/2003 | Wheeler et al. | |
| 2003/0018491 A1 | 1/2003 | Nakahara et al. | |
| 2003/0021412 A1 | 1/2003 | Candelore et al. | |
| 2003/0026423 A1 | 2/2003 | Unger et al. | |
| 2003/0046686 A1 | 3/2003 | Candelore et al. | |
| 2003/0048380 A1 | 3/2003 | Tamura | |
| 2003/0051040 A1 | 3/2003 | Tanikawa et al. | |
| 2003/0081776 A1 | 5/2003 | Candelore | |
| 2003/0086542 A1 | 5/2003 | Urien | |
| 2003/0126611 A1 | 7/2003 | Chernock et al. | |
| 2003/0136840 A1 | 7/2003 | Wu et al. | |
| 2003/0150915 A1 | 8/2003 | Reece | |
| 2004/0005051 A1 | 1/2004 | Wheeler et al. | |
| 2004/0015948 A1 | 1/2004 | Sueyoshi et al. | |
| 2004/0123315 A1 | 6/2004 | Na | |
| 2004/0143741 A1 | 7/2004 | Edwards | |
| 2004/0151347 A1 * | 8/2004 | Wisniewski | 382/115 |
| 2004/0190038 A1 | 9/2004 | Shahindoust | |
| 2004/0249959 A1 | 12/2004 | Guthery | |
| 2005/0021766 A1 | 1/2005 | McKeowen et al. | |
| 2005/0027851 A1 | 2/2005 | McKeown et al. | |
| 2005/0105734 A1 | 5/2005 | Buer et al. | |
| 2006/0196941 A1 * | 9/2006 | Miura et al. | 235/451 |
| 2007/0094721 A1 | 4/2007 | Nguyen et al. | |

FOREIGN PATENT DOCUMENTS

| | | |
|---|---|---|
| EP | 1120757 | 8/2001 |
| JP | 2001-312512 | 9/2001 |
| JP | 2002-063092 | 2/2002 |
| JP | 2002-092351 | 3/2002 |
| WO | 99/61995 | 2/1999 |
| WO | 01/41027 | 6/2001 |

OTHER PUBLICATIONS

European Search Report issued Mar. 14, 2011 for corresponding European Appln. No. 10171455.8.

Statement in Accordance with the Notice from the European Patent Office dated Oct. 1, 2007 concerning businss methods, Nov. 1, 2007, XP002456252.

Japanese Search Report issued Sep. 10, 2009 for corresponding Japanese Appln. No. 2003-152451.

* cited by examiner

F I G. 1
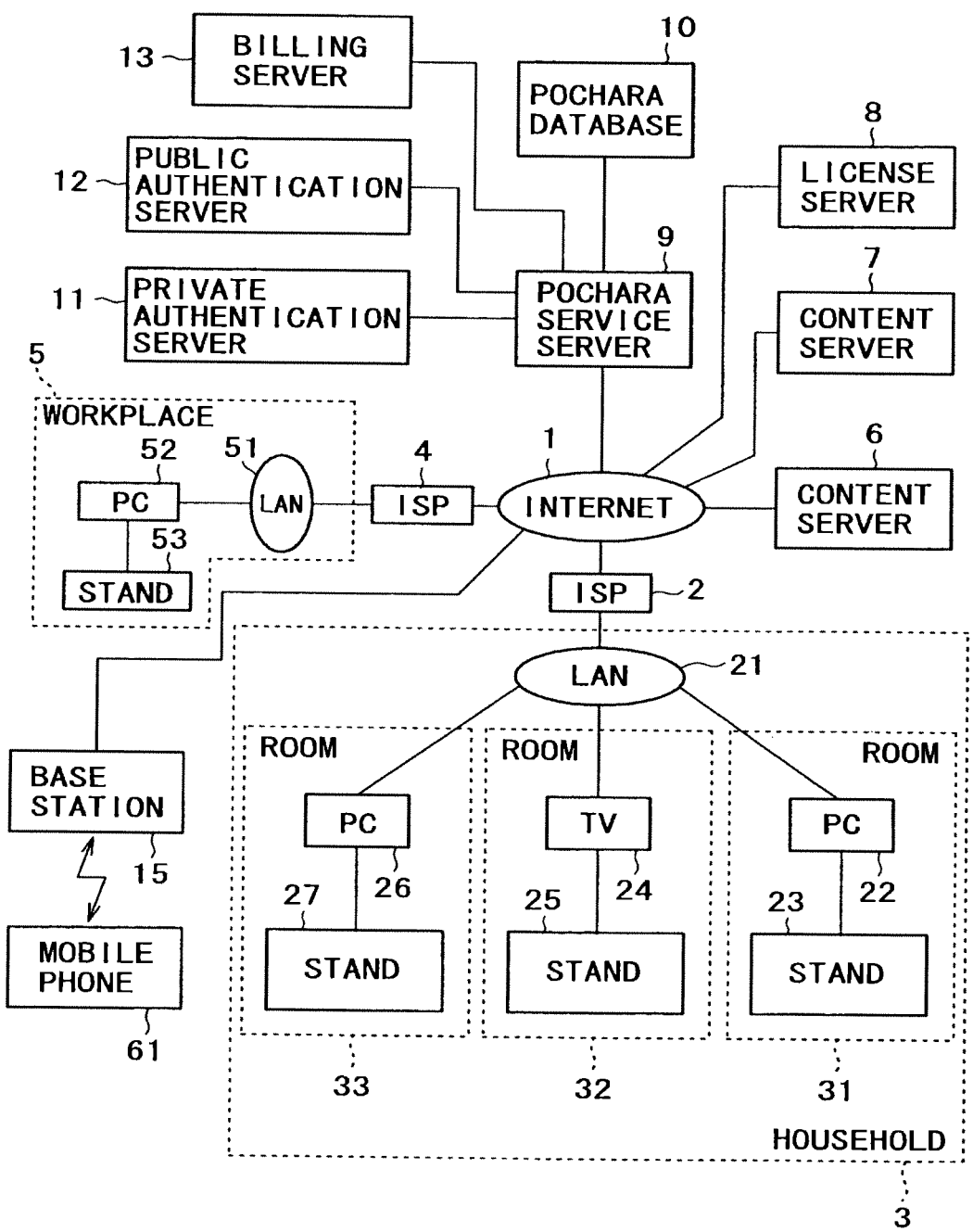

F I G. 1 7

| BRIEFCASE INFORMATION ABOUT POCHARA THE GOOD FRIEND ||
|---|---|
| CHARACTER INFORMATION | |
| MAIL INFORMATION | |
| SCHEDULE INFORMATION | |
| PREFERENCE INFORMATION | |
| JOB INFORMATION | |
| RECOMMENDED INFORMATION | |
| SEARCH INFORMATION | |
| CONTENT INFORMATION | CONTENT ID, ACCESS INFORMATION |
| POCHARA THE GOOD FRIEND FLAG | |

F I G. 1 8

| BRIEFCASE INFORMATION ABOUT ON-SALE POCHARA ||
|---|---|
| CHARACTER INFORMATION | |
| CONTENT INFORMATION | CONTENT ID, ACCESS DESTINATION INFORMATION |
| POCHARA THE GOOD FRIEND FLAG | |

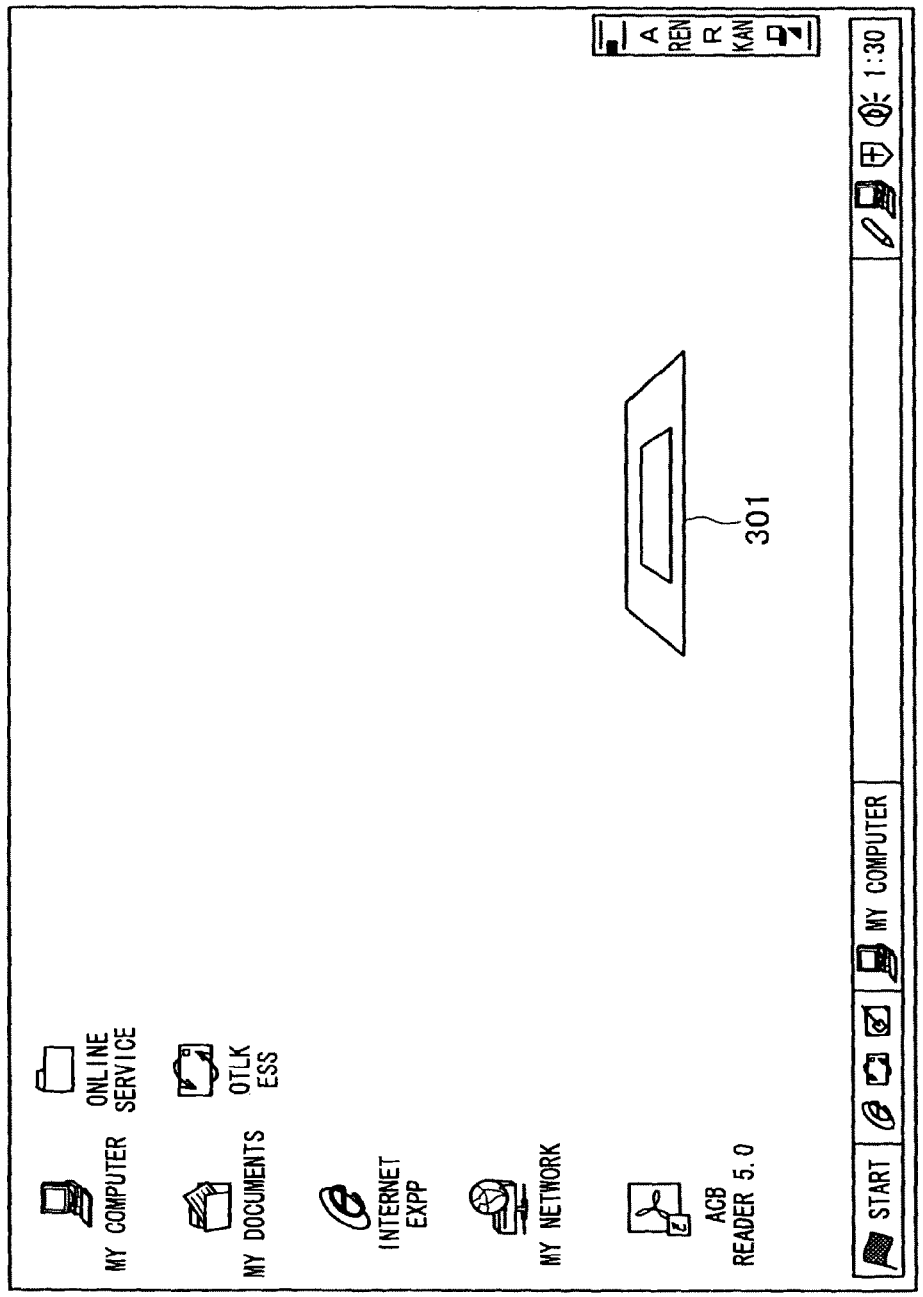

F I G. 3 0

| USER INFORMATION ||
|---|---|
| USER ID | |
| NAME | |
| ADDRESS | |
| DATE OF BIRTH | |
| GENDER | |
| TELEPHONE NUMBER | |
| FAX NUMBER | |
| E-MAIL ADDRESS | |
| DATE OF REGISTRATION | |
| CREDIT CARD NUMBER | |
| BANK ACCOUNT NUMBER | |

F I G. 3 1

| POCHARA INFORMATION ABOUT POCHARA THE GOOD FRIEND | |
|---|---|
| POCHARA ID | |
| USER ID | |
| POCHARA THE GOOD FRIEND FLAG | |
| CHARACTER INFORMATION | |
| MAIL INFORMATION | |
| SCHEDULE INFORMATION | |
| PREFERENCE INFORMATION | |
| JOB INFORMATION | |
| RECOMMENDED INFORMATION | |
| SEARCH INFORMATION | |
| CONTENT INFORMATION | CONTENT ID, ACCESS INFORMATION |
| LICENSE INFORMATION | SERVER ADDRESS, LICENSE ID, ENCRYPTION KEY |
| CURRENT LOCATION OF POCHARA THE GOOD FRIEND | |

F I G. 3 2

| POCHARA INFORMATION ABOUT ON-SALE POCHARA | |
|---|---|
| POCHARA ID | |
| POCHARA THE GOOD FRIEND FLAG | |
| CHARACTER INFORMATION | |
| CONTENT INFORMATION | CONTENT ID, ACCESS DESTINATION INFORMATION |
| LICENSE INFORMATION | SERVER ADDRESS, LICENSE ID, ENCRYPTION KEY |
| CONTENT USE INFORMATION | |

F I G. 3 9
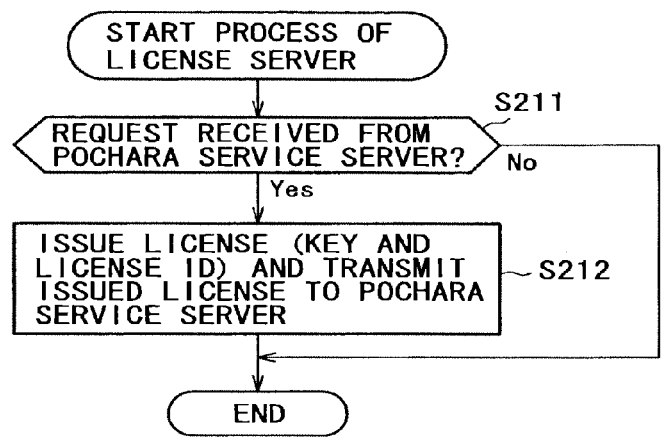

F I G. 5 7

|  | CONTENT IDs | DATES AND TIMES OF ACQUISITION |
|---|---|---|
| 1 | 10001 | 13:12, MAR. 07, 2002 |
| 2 | | |
| ⋮ | | |
| 40 | | |

FIG. 62

| CONTENT IDs | CORRESPONDING SERVICE IDs | LICENSES | DOWNLOADED CONTENT IDs |
|---|---|---|---|
| 1 | 1001 | 100 | XXXX | A,B,C |
| 2 | 1002 | 200 | YYYY | A,D |
| 3 | 1003 | 100 | ZZZZ | E,F |
| 4 | 1004 | 200 | AAAA | B |
| 5 | 1005 | 300 | BBBB | C |
| ... | ... | ... | ... | ... |

F I G. 6 3

| ITEMS | EXPLANATIONS |
|---|---|
| CONTENT ID | UNIQUE ID OF EACH SONG |
| SONG TITLE | |
| POINTS SOLD (THIS WEEK) | |
| POINTS SOLD (CUMULATIVE) | |
| ALBUM TITLE | TITLE OF ALBUM CONTAINING THIS TRACK |
| NEW-SONG FLAG | A FLAG INDICATING THIS TRACK IS A NEW SONG |
| ARTIST NAME | NAME OF ARTIST SINGING THIS TRACK |
| LYRICIST NAME | |
| COMPOSER NAME | |
| PLAYING TIME | |
| PATH TO LINER NOTE FILE | |
| PATH TO SONG DATA FILE (WEV) | |
| PATH TO KARAOKE DATA FILE | |
| PATH TO JACKET PHOTO FILE | |
| RELEASE DATE | DATE OF RELEASE OF THIS TRACK |
| GENRE NAME | NANE OF GENRE OF THIS TRACK |
| PREVIEW START FRAME NUMBER | |
| PREVIEW END FRAME NUMBER | |

F I G. 6 9
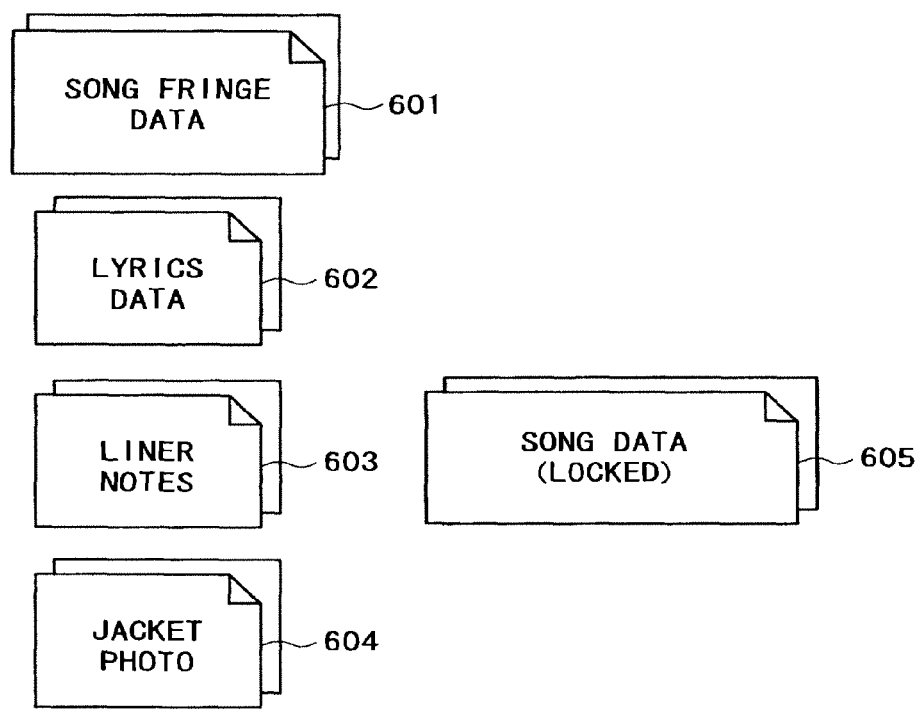

F I G. 7 2
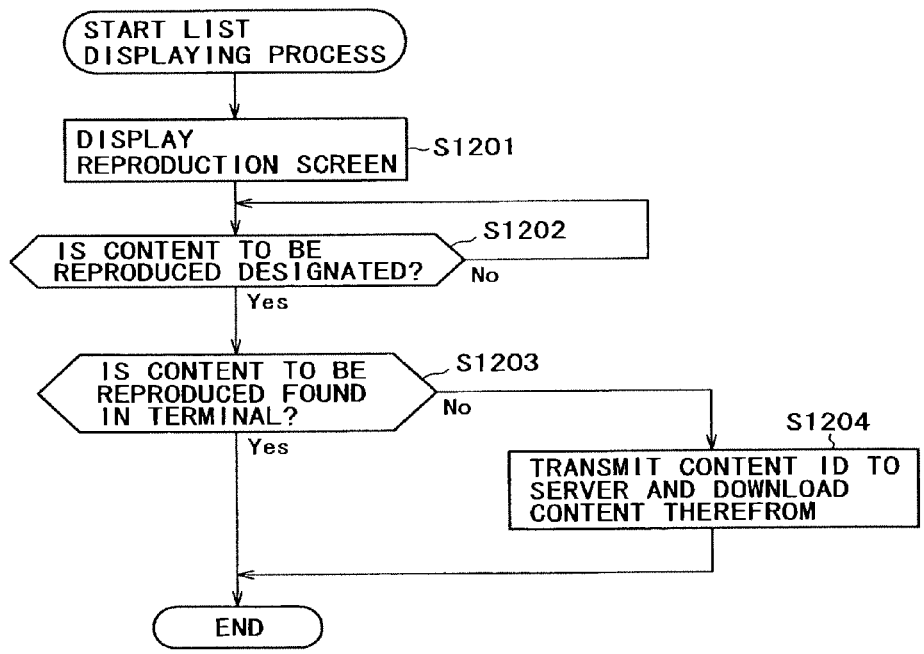

FIG. 74

| AYA MATSUSHITA — 581 | NO. OF SONGS IN POSSESSION: Y — 582 |
|---|---|
| SONG TITLES | DATES OF PURCHASE |
| Rosy Feelings | 2/02/2002 |
| 1,000 Kisses | 4/04/2002 |
|  |  |
|  |  |
|  |  |

583

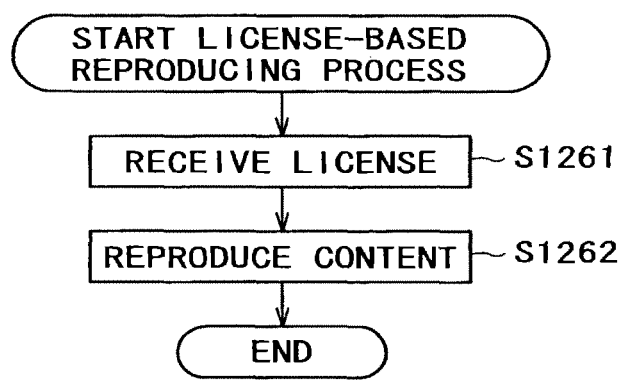
F I G. 7 7

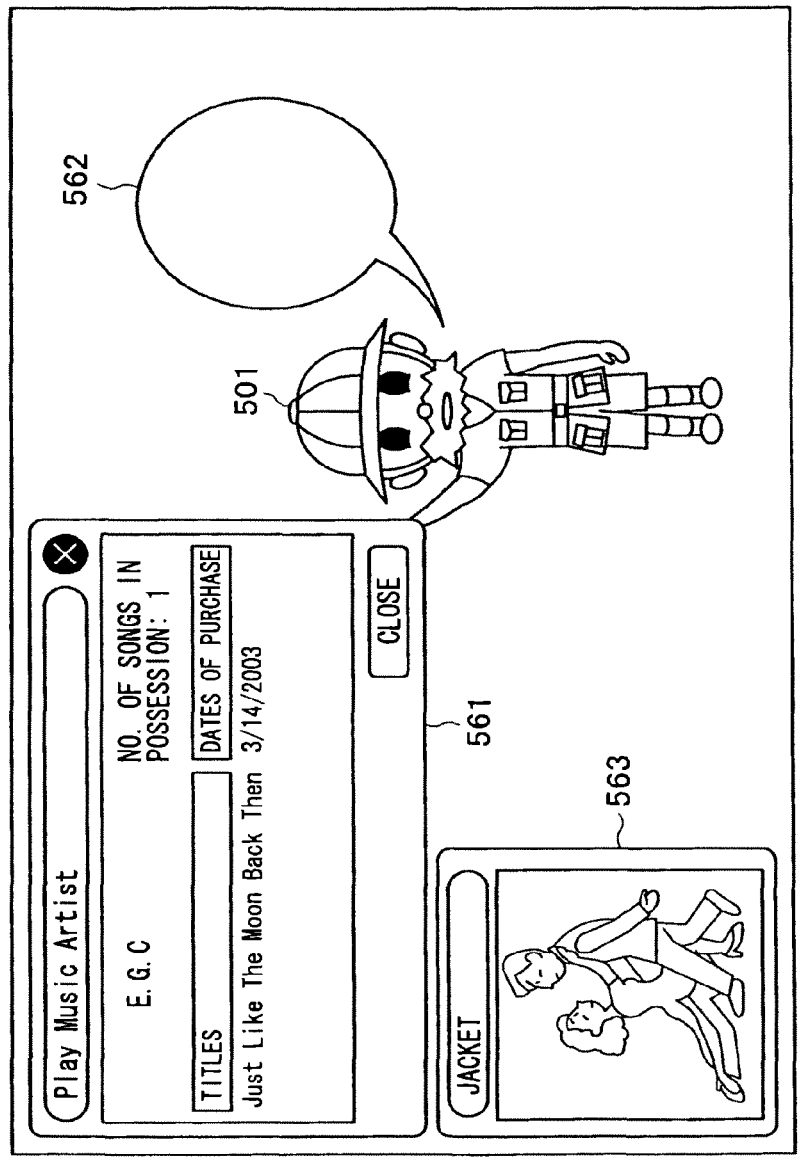

INFORMATION PROCESSING SYSTEM

CROSS REFERENCES TO RELATED APPLICATIONS

The present application in a continuation of U.S. application Ser. No. 10/515,936, filed Nov. 23, 2004, which is a U.S. national stage of Application No. PCT/JP2003/06725, filed on May 29, 2003, which claims priority to Japanese Patent Application No. 2002-156051 filed on May 29, 2002, the entire disclosure of which is hereby incorporated by reference. Also, the present application relates to Japanese Patent Application No. 2003-152451 filed on May 29, 2003, the entire disclosure of which is hereby incorporated by reference.

BACKGROUND

The present invention relates to an information processing system, an information processing method for use with the system, an information providing system, an information providing method for use with the system, an information processing apparatus, an information processing method for use with the apparatus, a doll, an object, a program storage medium, and a program. More particularly, the invention relates to an information processing system, an information processing method for use with the system, an information providing system, and information providing method for use with the system, an information processing apparatus, an information processing method for use with the apparatus, a doll, an object, a program storage medium, and a program for allowing users not familiar with computer operations to get authenticated easily and quickly.

Nowadays, networks exemplified by the Internet have received widespread acceptance, allowing network users to download and enjoy diverse kinds of content data such as video and audio data.

When acquiring content data through the network, users typically gain access through their personal computers to a suitable server and download the desired data from the server. In such cases, each user inputs an ID and a password assigned uniquely to the user through a keyboard or like equipment attached to the personal computer. The purpose of the ID/password input is for the user to get authenticated by the server prior to the download.

The keyboard-based user authentication procedure involving ID/password entry has turned out to be problematic to certain categories of users, i.e., those not comfortable with keyboard operations such as computer beginners, children, women, elderly people, or physically challenged people willing but unable to access the server simply and quickly.

SUMMARY

The present invention has been made in view of the above circumstances and provides inventive arrangements for authenticating users easily and quickly.

In carrying out the invention and according to one embodiment thereof, there is provided an information processing system including an object for holding user identification information for identifying a user; a first information processing apparatus for performing processes; a reader which is provided in conjunction with the first information processing apparatus and which reads the user identification information held in the object; and a second information processing apparatus which receives for authentication the user identification information read by the reader and forwarded by the first information processing apparatus over a network, and which transmits a result of the authentication to the first information processing apparatus connected over the network; wherein a display unit of the first information processing apparatus displays an image corresponding to the object based on the user identification information read by the reader and on the result of the authentication performed by the second information processing apparatus.

Preferably, the second information processing apparatus may receive over the network user information about the user who uses the first information processing apparatus, may write to a memory of the object user identification information which corresponds to the user information and which identifies the user, and may perform a process causing the object to be delivered to the user.

If the reader is prevented from reading the information held in the object, then the connection over the network between the first information processing apparatus and the second information processing apparatus may preferably be severed.

The object may preferably be a doll.

According to another embodiment of the invention, there is provided an information processing method for use with an information processing system including an object for holding user identification information for identifying a user; an information processing apparatus for performing processes; a reader which is provided in conjunction with the information processing apparatus and which reads the user identification information held in the object; and a second information processing apparatus which receives for authentication the user identification information read by the reader and forwarded by the first information processing apparatus over a network, and which transmits a result of the authentication to the first information processing apparatus connected over the network; wherein the information processing method includes the step of causing a display unit of the first information processing apparatus to display an image corresponding to the object based on the user identification information read by the reader and on the result of the authentication performed by the second information processing apparatus.

According to a further embodiment of the invention, there is provided a first information processing apparatus including managing means for managing user identification information for identifying a user; receiving means for receiving the user identification information read by a reader associated with an other information processing apparatus and transmitted by the other information processing apparatus over a network; authenticating means for authenticating the user identification information received by the receiving means on the basis of the user identification information managed by the managing means; and transmitting means for transmitting display information to the other information processing apparatus over the network, the display information being needed by the other information processing apparatus for displaying an image corresponding to the user identification information read by the reader on the basis of a result of the authentication performed by the authenticating means.

Preferably, the image corresponding to the user identification information may be representative of an object which stores the user identification information.

Preferably, the first information processing apparatus may further include delivering means for delivering to the user the object which has a memory holding the user identification information corresponding to user information about the user who uses the other information processing apparatus.

The object may preferably be a doll.

Preferably, the receiving means may receive the user identification information read by the reader when the object is mounted on the reader, as well as a signal indicating that the object is dismounted from the reader; and the managing means may further manage information about content used by the user, in conjunction with the user identification information; wherein the first information processing apparatus may further include updating means which, if the receiving means receives the signal indicating that the object is dismounted from the reader, then updates the information about the content managed in conjunction with the user identification information.

According to an even further embodiment of the invention, there is provided a first information processing method including the steps of managing user identification information for identifying a user; receiving the user identification information read by a reader associated with an other information processing apparatus and transmitted by the other information processing apparatus over a network; authenticating the user identification information received in the receiving step on the basis of the user identification information managed in the managing step; and transmitting display information to the other information processing apparatus over the network, the display information being needed by the other information processing apparatus for displaying an image corresponding to the user identification information read by the reader on the basis of a result of the authentication performed in the authenticating step.

According to a still further embodiment of the invention, there is provided a first program storage medium which stores a program for use with a computer for controlling an information processing apparatus connected to an other information processing apparatus over a network, the program including the steps of managing user identification information for identifying a user; receiving the user identification information read by a reader associated with the other information processing apparatus and transmitted by the other information processing apparatus over the network; authenticating the user identification information received in the receiving step on the basis of the user identification information managed in the managing step; and transmitting display information to the other information processing apparatus over the network, the display information being needed by the other information processing apparatus for displaying an image corresponding to the user identification information read by the reader on the basis of a result of the authentication performed in the authenticating step.

According to a yet further embodiment of the invention, there is provided a first program for use with a computer for controlling an information processing apparatus connected to an other information processing apparatus over a network, the first program causing the computer to execute the steps of managing user identification information for identifying a user; receiving the user identification information read by a reader associated with the other information processing apparatus and transmitted by the other information processing apparatus over the network; authenticating the user identification information received in the receiving step on the basis of the user identification information managed in the managing step; and transmitting display information to the other information processing apparatus over the network, the display information being needed by the other information processing apparatus for displaying an image corresponding to the user identification information read by the reader on the basis of a result of the authentication performed in the authenticating step.

According to another embodiment of the invention, there is provided a second information processing apparatus including acquiring means for acquiring user identification information for identifying a user; transmitting means for transmitting the user identification information acquired by the acquiring means to an other information processing apparatus over a network; receiving means for receiving a result of authentication performed by the other information processing apparatus on the basis of the user identification information transmitted by the transmitting means; and controlling means for controlling a display arrangement so as to display an image corresponding to the user identification information acquired by the acquiring means on the basis of the result of the authentication received by the receiving means.

Preferably, the image corresponding to the user identification information may be representative of an object which stores the user identification information.

The object may preferably be a doll.

Preferably, the second information processing apparatus may further include reading means for reading the user identification information from the doll; wherein the acquiring means may acquire the user identification information read by the reading means.

Preferably, the reading means may be provided independently of the second information processing apparatus, may be connected to the information processing apparatus, and may read the user identification information from the doll when the doll is mounted on the reading means.

Preferably, the second information processing apparatus may further include detecting means for detecting dismounting of the doll from the reading means; wherein, if the detecting means detects the dismounting of the doll from the reading means, then the transmitting means may transmit a signal to the other information processing apparatus over the network, the signal indicating that the doll is dismounted from the reading means.

If the detecting means detects the dismounting of the doll from the reading means, then the controlling means may preferably sever the connection over the network between the second information processing apparatus and the other information processing apparatus.

According to a further embodiment of the invention, there is provided a second information processing method including the steps of acquiring user identification information for identifying a user; transmitting the user identification information acquired in the acquiring step to an other information processing apparatus over a network; receiving a result of authentication performed by the other information processing apparatus on the basis of the user identification information transmitted in the transmitting step; and controlling a display arrangement so as to display an image corresponding to the user identification information read in the reading step on the basis of the result of the authentication received in the receiving step.

According to an even further embodiment of the invention, there is provided a second program storage medium which stores a program for use with a computer for controlling an information processing apparatus connected to an other information processing apparatus over a network, the program including the steps of acquiring user identification information for identifying a user; transmitting the user identification information acquired in the acquiring step to the other information processing apparatus over the network; receiving a result of authentication performed by the other information processing apparatus on the basis of the user identification information transmitted in the transmitting step; and controlling a display arrangement so as to display an image corresponding to the user identification information read in the reading step on the basis of the result of the authentication received in the receiving step.

According to a still further embodiment of the invention, there is provided a second program for use with a computer for controlling an information processing apparatus connected to an other information processing apparatus over a network, the second program causing the computer to execute the steps of: acquiring user identification information for identifying a user; transmitting the user identification information acquired in the acquiring step to the other information processing apparatus over the network; receiving a result of authentication performed by the other information processing apparatus on the basis of the user identification information transmitted in the transmitting step; and controlling a display arrangement so as to display an image corresponding to the user identification information read in the reading step, on the basis of the result of the authentication received in the receiving step.

According to a yet further embodiment of the invention, there is provided a first doll for use when an information processing apparatus is used, the first doll including a memory for storing user identification information for identifying a user who owns the doll; wherein the doll is so shaped as to be representative of an image displayed on a display unit of the information processing apparatus when the user identification information read from the memory by a reader associated with the information processing apparatus is authenticated.

According to another embodiment of the invention, there is provided an information providing system including a first information processing apparatus for providing content over a network; a second information processing apparatus for receiving the content over the network; and a third information processing apparatus for outputting a signal to the first information processing apparatus based on a request from the second information processing apparatus; wherein an object corresponding to the content is delivered to a user of the second information processing apparatus; wherein the second information processing apparatus reads object identification information for identifying the object from the object, before transmitting the retrieved object identification information to the third information processing apparatus over the network; wherein the third information processing apparatus searches for content identification information for identifying the content based on the object identification information received from the second information processing apparatus, before transmitting the detected content identification information to the first information processing apparatus; and wherein, upon receipt of the content identification information from the third information processing apparatus, the first information processing apparatus transmits the content corresponding to the content identification information to the second information processing apparatus over the network.

According to a further embodiment of the invention, there is provided an information providing method for use with an information providing system including: a first information processing apparatus for providing content over a network; a second information processing apparatus for receiving the content over the network; and a third information processing apparatus for outputting a signal to the first information processing apparatus based on a request from the second information processing apparatus; wherein the information providing method includes the steps of: delivering an object corresponding to the content to a user of the second information processing apparatus; causing the second information processing apparatus to read object identification information for identifying the object from the object, before transmitting the retrieved object identification information to the third information processing apparatus over the network; causing the third information processing apparatus to search for content identification information for identifying the content based on the object identification information received from the second information processing apparatus, before transmitting the detected content identification information to the first information processing apparatus; and upon receipt of the content identification information from the third information processing apparatus, causing the first information processing apparatus to transmit the content corresponding to the content identification information to the second information processing apparatus over the network.

According to an even further embodiment of the invention, there is provided a third information processing apparatus including receiving means for receiving object identification information read from an object by a second other information processing apparatus and transmitted thereby over a network, the object identification information being held in the object so as to identify the object; transmitting means for transmitting content identification information for identifying content to a first other information processing apparatus over the network, the content identification information corresponding to the object identification information received by the receiving means; and billing means for billing a user of the second other information processing apparatus.

According to a still further embodiment of the invention, there is provided a third information processing method including the steps of receiving object identification information read from an object by a second other information processing apparatus and transmitted thereby over a network, the object identification information being held in the object so as to identify the object; transmitting content identification information for identifying content to a first other information processing apparatus over the network, the content identification information corresponding to the object identification information received by the receiving means; and billing a user of the second other information processing apparatus.

According to a yet further embodiment of the invention, there is provided a third program storage medium which stores a program for use with a computer for controlling an information processing apparatus for managing ways in which content provided by a first other information processing apparatus over a network is used by a second other information processing apparatus, the program including the steps of: receiving object identification information read from an object by the second other information processing apparatus and transmitted thereby over the network, the object identification information being held in the object so as to identify the object; transmitting content identification information for identifying the content to the first other information processing apparatus over the network, the content identification information corresponding to the object identification information received by the receiving means; and billing a user of the second other information processing apparatus.

According to another embodiment of the invention, there is provided a third program for use with a computer for controlling an information processing apparatus for managing ways in which content provided by a first other information processing apparatus over a network is used by a second other information processing apparatus, the third program causing the computer to execute the steps of: receiving object identification information read from an object by the second other information processing apparatus and transmitted thereby over the network, the object identification information being held in the object so as to identify the object; transmitting content identification information for identifying the content to the first other information processing apparatus over the network, the content identification information corresponding to the object identification information received by the receiving means; and billing a user of the second other information processing apparatus.

According to a further embodiment of the invention, there is provided a fourth information processing apparatus for providing content to an other information processing apparatus over a network, the fourth information processing apparatus including identification information acquiring means for acquiring identification information read from an object by the other information processing apparatus and transmitted thereby over the network, the identification information identifying a type of content obtainable by the object; and initial data transmitting means for decrypting encrypted initial data read from the object by the other information processing apparatus and transmitted thereby over the network, before transmitting the decrypted initial data to the other information processing apparatus.

Preferably, the initial data may include information about content having been downloaded to the object, and information indicating the number of times the object is allowed to download content; and the initial data transmitting means may include decrypting means for decrypting the information about the content having been downloaded to the object and the information indicating the number of times the object is allowed to download the content.

Preferably, the fourth information processing apparatus may further include content list transmitting means for transmitting to the other information processing apparatus a list of content downloadable by the object on the basis of the identification information; and content transmitting means for transmitting content to the other information processing apparatus on the basis of a content acquisition request from the other information processing apparatus.

Preferably, the content transmitting means may include first transmitting means for transmitting the content to be downloaded by the other information processing apparatus; and second transmitting means for transmitting the content for a preview by the other information processing apparatus.

Preferably, the fourth information processing apparatus may further include license transmitting means for transmitting a license to the other information processing apparatus allowing the other information processing apparatus to reproduce the content once.

According to an even further embodiment of the invention, there is provided a fourth information processing method for use with an information processing apparatus for providing content to an other information processing apparatus over a network, the fourth information processing method including the steps of: acquiring identification information read from an object by the other information processing apparatus and transmitted thereby over the network, the identification information identifying a type of content obtainable by the object; and decrypting encrypted initial data read from the object by the other information processing apparatus and transmitted thereby over the network, before transmitting the decrypted initial data to the other information processing apparatus.

According to a still further embodiment of the invention, there is provided a fourth program storage medium which stores a program for use with a computer for controlling an information processing apparatus for providing content to an other information processing apparatus over a network, the program including the steps of: acquiring identification information read from an object by the other information processing apparatus and transmitted thereby over the network, the identification information identifying a type of content obtainable by the object; and decrypting encrypted initial data read from the object by the other information processing apparatus and transmitted thereby over the network, before transmitting the decrypted initial data to the other information processing apparatus.

According to a yet further embodiment of the invention, there is provided a fourth program for use with a computer for controlling an information processing apparatus for providing content to an other information processing apparatus over a network, the fourth program causing the computer to execute the steps of: acquiring identification information read from an object by the other information processing apparatus and transmitted thereby over the network, the identification information identifying a type of content obtainable by the object; and decrypting encrypted initial data read from the object by the other information processing apparatus and transmitted thereby over the network, before transmitting the decrypted initial data to the other information processing apparatus.

According to another embodiment of the invention, there is provided a fifth information processing apparatus for receiving content from a first other information processing apparatus over a network, the information processing apparatus including acquiring means for acquiring object identification information for identifying an object from the object; transmitting means for transmitting the object identification information acquired by the acquiring means to a second other information processing apparatus over the network; and receiving means for receiving the content transmitted over the network by the first other information processing apparatus on the basis of content identification information for identifying the content transmitted by the second other information processing apparatus to the first other information processing apparatus in accordance with the object identification information transmitted by the transmitting means.

Preferably, the acquiring means may further acquire a use condition regarding the content from the object in which the use condition is stored, and the fifth information processing apparatus may further include controlling means for controlling the transmission performed by the transmitting means on the basis of the use condition acquired by the acquiring means.

The object may preferably be a doll.

Preferably, the fifth information processing apparatus may further include reading means for reading the object identification information stored in the doll when the doll is mounted on the reading means; wherein the acquiring means may acquire the object identification information read by the reading means from the doll.

Preferably, the reading means may be provided independently of the information processing apparatus, may be connected to the information processing apparatus, and may read the object identification information from the doll when the doll is mounted on the reading means.

Preferably, the fifth information processing apparatus may further include acquisition request transmitting means for transmitting a content acquisition request to the first other information processing apparatus on the basis of a list of content downloadable by the object, the list of the content having been transmitted from the first other information processing apparatus.

Preferably, the acquisition request transmitting means may include displaying means for displaying the list of the content downloadable by the object and the number of times the object is allowed to download the content; download determining means for determining whether the download of the content is designated; and preview determining means for determining whether a preview of the content is designated.

Preferably, the fifth information processing apparatus may further include displaying means for displaying a list of content downloaded by use of the object; license requesting means for transmitting to the first other information processing apparatus a request to acquire a license for specific content to be reproduced from among the content in the list displayed by the displaying means; and reproducing means for reproducing the specific content upon receiving from the first other information processing apparatus the license requested for the acquisition by the license requesting means.

Preferably, the fifth information processing apparatus may further include content availability determining means for determining, upon receiving designation of the specific content to be reproduced from among the content in the list, whether the specific content is stored in the information processing apparatus; and reproduction-destined content acquisition request transmitting means which, if the specific content to be reproduced is found absent in the information processing apparatus by the content availability determining means, then transmits to the first other information processing apparatus a request to acquire the specific content to be reproduced.

According to a further embodiment of the invention, there is provided a fifth information processing method for use with an information processing apparatus for receiving content from a first other information processing apparatus over a network, the fifth information processing method including the steps of: acquiring object identification information for identifying an object from the object; transmitting the object identification information acquired in the acquiring step to a second other information processing apparatus over the network; and receiving the content transmitted over the network by the first other information processing apparatus on the basis of content identification information for identifying the content transmitted by the second other information processing apparatus to the first other information processing apparatus in accordance with the object identification information transmitted in the transmitting step.

According to an even further embodiment of the invention, there is provided a fifth program storage medium which stores a program for use with a computer for controlling an information processing apparatus for receiving content from a first other information processing apparatus over a network, the program including the steps of: acquiring object identification information for identifying an object from the object; transmitting the object identification information acquired in the acquiring step to a second other information processing apparatus over the network; and receiving the content transmitted over the network by the first other information processing apparatus on the basis of content identification information for identifying the content transmitted by the second other information processing apparatus to the first other information processing apparatus in accordance with the object identification information transmitted in the transmitting step.

According to a still further embodiment of the invention, there is provided a fifth program for use with a computer for controlling an information processing apparatus for receiving content from a first other information processing apparatus over a network, the fifth program causing the computer to execute the steps of: acquiring object identification information for identifying an object from the object; transmitting the object identification information acquired in the acquiring step to a second other information processing apparatus over the network; and receiving the content transmitted over the network by the first other information processing apparatus on the basis of content identification information for identifying the content transmitted by the second other information processing apparatus to the first other information processing apparatus in accordance with the object identification information transmitted in the transmitting step.

According to a yet further embodiment of the invention, there is provided a second doll for use when content is used by an information processing apparatus, the second doll including a memory for storing identification information necessary for identifying the doll; wherein the doll is so shaped as to be representative of an image associated with the content.

Preferably, the memory may further store information for denoting a type of content obtainable by the doll.

Preferably, the memory may further store a use condition regarding the content.

The use condition may preferably include billing information.

The use condition may preferably include a list of the content acquired by the doll and the number of times the doll is allowed to acquire the content.

The memory may preferably have the use condition updated when the content is used.

According to another embodiment of the invention, there is provided an object for use when content is used by an information processing apparatus, the object including a memory for storing identification information necessary for identifying the content; wherein the object is so characterized as to be representative of an image associated with the content.

Where the information processing system and information processing method of this invention are in use, the display unit of a first information processing apparatus displays an image corresponding to an object based on the user identification information read by a reader from the object and on the result of the authentication performed on the user identification information by a second information processing apparatus.

Where the first information processing apparatus, first information processing method, first program storage medium, and first program of this invention are in use, the user is authenticated on the basis of the user identification information transmitted by an other information processing apparatus. The display information needed by the other information processing apparatus for displaying the image corresponding to the user identification information is transmitted over the network on the basis of the result of the authentication.

Where the second information processing apparatus, second information processing method, second program storage medium, and second program of this invention are in use, acquired user identification information is transmitted to an other information processing apparatus for authentication. The image corresponding to the user identification information is displayed on the basis of the result of the authentication performed on the transmitted user identification information by the other information processing apparatus.

Where the first doll of this invention is in use, the memory of the doll retains user identification information. When the stored user identification information is authenticated, the image displayed on the display unit of the information processing apparatus corresponds to the shape of the doll.

Where the information providing system and information providing method of this invention are in use, an object retaining object identification information is delivered to the user of a second information processing apparatus. When the object identification information is transmitted from the second information processing apparatus over the network, a third information processing apparatus provides a first information processing apparatus with content identification information corresponding to the object identification information. In turn, the first information processing apparatus transmits the content corresponding to the content identification information to the second information processing apparatus over the network.

Where the third information processing apparatus, third information processing method, third program storage medium, and first program are in use, object identification information is received from a second other information processing apparatus. Content identification information based on the received object identification information is transmitted to a first other information processing apparatus, whereby the user of the second other information processing apparatus is billed.

Where the fourth information processing apparatus, fourth information processing method, fourth program storage medium, and fourth program are in use, an other information processing apparatus reads from an object the identification information for identifying a type of content obtainable by the object and transmits the retrieved identification information. The transmitted identification information is acquired, whereupon encrypted initial data also read from the object and transmitted by the other information processing apparatus over the network are decrypted. The decrypted initial data are sent to the other information processing apparatus.

Where the fifth information processing apparatus, fifth information processing method, fifth program storage medium, and fifth program are in use, object identification information stored in an object is acquired therefrom. The acquired object identification information is transmitted to a second other information processing apparatus over the network. In turn, the second other information processing apparatus transmits to a first other information processing apparatus the content identification information corresponding to the object identification information. On the basis of the content identification information, the corresponding content are sent from the first other information processing apparatus over the network and are received.

Where the second doll of this invention is in use, the memory of the doll retains identification information necessary for identifying the doll. The doll is shaped so as to be representative of an image associated with content.

Where the object of this invention is in use, the memory of the object retains identification information necessary for identifying content. The object is characterized so as to be representative of the image associated with the content thus identified.

Additional features and advantages are described herein, and will be apparent from the following Detailed Description and the figures.

BRIEF DESCRIPTION OF THE FIGURES

FIG. 1 is a block diagram showing a typical configuration of an information processing system according to an embodiment the invention.

FIG. 17 is a tabular view of briefcase information for the Pochara the Good Friend.

FIG. 18 is a tabular view of briefcase information for the On-sale Pochara.

FIG. 19 is a schematic view of a typical Pochara display.

FIG. 30 is a tabular view of typical user information stored in a Pochara database shown in FIG. 1.

FIG. 31 is a tabular view of typical Pochara information about a Pochara the Good Friend stored in the Pochara database in FIG. 1.

FIG. 32 is a tabular view of typical Pochara information about an On-sale Pochara stored in the Pochara database in FIG. 1.

FIG. 39 is a flowchart of steps constituting a process performed by a license server shown in FIG. 1.

FIG. 57 is a tabular view of typical information stored in an IC chip of an On-sale Pochara doll.

FIG. 62 is a tabular view of typical database content stored in the content server.

FIG. 63 is a tabular view of another typical database content stored in the content server.

FIG. 69 is a schematic view of typical data components making up content to be stored in the content server.

FIG. 72 is a flowchart of steps constituting a list displaying process.

FIG. 74 is a schematic view of a typical reproduction list screen.

FIG. 77 is a flowchart of steps constituting a license-based reproducing process; and FIG. 78 is a schematic view of a typical display screen that appears during the license-based reproducing process.

DETAILED DESCRIPTION

Figure 2:
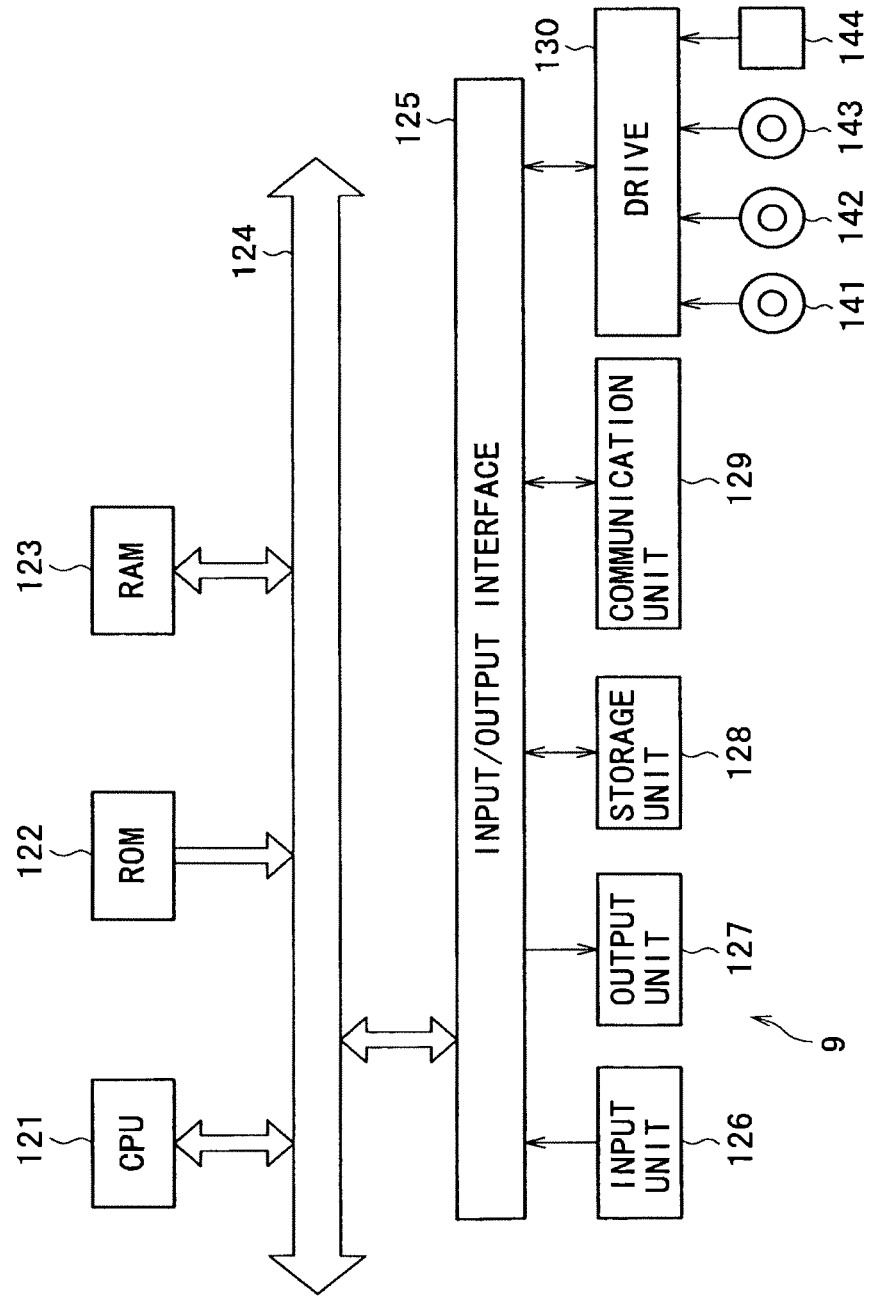
FIG. 2 is a block diagram depicting a typical structure of a Pochara service server shown in FIG. 1.

Embodiments of the present application will be described below in detail with reference to the drawings.

The present invention relates to an information processing system, an information processing method for use with the system, an information providing system, an information providing method for use with the system, an information processing apparatus, an information processing method for use with the apparatus, a doll, an object, a program storage medium, and a program. More particularly, the invention relates to an information processing system, an information processing method for use with the system, an information providing system, and information providing method for use with the system, an information processing apparatus, an information processing method for use with the apparatus, a doll, an object, a program storage medium, and a program for allowing users not familiar with computer operations to get authenticated easily and quickly.

FIG. 1 schematically shows a typical configuration of an information processing system according to the invention. In this configuration, a LAN (local area network) 21 of a household 3 is connected to the Internet 1 via an Internet service provider (ISP) 2. Apparatuses in rooms 31 through 33 are connected to the LAN 21. In the room 31 of this example, a personal computer (PC) 22 linked to the LAN 21 is connected to a stand 23 on which to mount a Pochara the Good Friend (trademark) doll 161 (FIG. 4), to be described later, or an On-sale Pochara (trademark) doll 181 (FIG. 10), to be discussed later.

The LAN 21 is constituted on a wired or a wireless basis. A wirelessly structured LAN 21 may adopt IEEE (Institute of Electrical and Electronic Engineers) 802.11a, b, or g, UWB (Ultra Wide Band), or Bluetooth standards. A wired LAN 21 may be based on USB (Universal Serial Bus) standards or the like.

In the room 32, a TV set 24 is connected to the LAN 21. A stand 25 is connected to the TV set 24. In the room 33, a personal computer 26 is connected to the LAN 21. A stand 27 is connected to the personal computer 26.

A LAN 51 of a workplace 5 is also connected to the Internet 1 via an ISP 4. A personal computer 52 is linked to the LAN 51. A stand 53 is connected to the personal computer 52.

Figure 4:
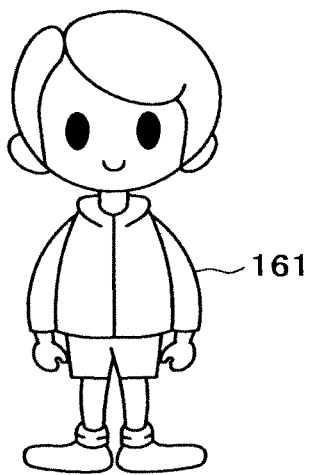
FIG. 4 is a schematic view of a typical Pochara the Good Friend doll.

A content server 6 providing content data corresponding to the On-sale Pochara doll 181 (FIG. 10) is connected to the Internet 1. A content server 7 also connected to the Internet 1 provides content data corresponding to the Pochara the Good Friend doll 161 (FIG. 4). A license server 8 connected to the Internet 1 provides licenses corresponding content data supplied by the content server 7.

A Pochara (trademark) service server 9 is connected to the Internet 1. The Pochara service server 9 provides diverse services corresponding to the Pochara the Good Friend doll 161 or On-sale Pochara doll 181.

The Pochara service server 9 is connected to a Pochara database 10 that stores various kinds of information about Pocharas. The Pochara service server 9 is further connected to a private authentication server 11 that performs authentication processes on the Pochara the Good Friend doll 161, a public authentication server 12 that carries out authentication processes on the On-sale Pochara doll 181, and a billing server 13 that effects various billing processes. Where necessary, the Pochara service server 9 may be built integrally into at least one of the Pochara database 10, private authentication server 11, public authentication server 12, and billing server 13.

In the system of FIG. 1, a mobile phone 61 is connected to the Internet 1 via a base station 15 located nearby.

The Pochara service server 9 is structured illustratively as shown in FIG. 2. Referring to FIG. 2, a CPU (central processing unit) 121 carries out diverse processes in accordance with programs stored in a ROM (read only memory) 122 or with programs loaded into a RAM (random access memory) 123 from a storage unit 128. The RAM 123 may further accommodate data that may be needed by the CPU 121 in executing various processes.

The CPU 121, ROM 122, and RAM 123 are interconnected via a bus 124. An input/output interface 125 is also connected to the bus 124.

The input/output interface 125 is connected to an input unit 126 comprising a keyboard and a mouse, a display unit such as a CRT (cathode ray tube) or an LCD (liquid crystal display), an output unit 127 including speakers, a storage unit 128 made of a hard disc drive or the like, and a communication unit 129 comprising a modem or a terminal adapter. The communication unit 129 performs communication processes over networks including the Internet 1.

A drive 130 is connected to the input/output interface 125 where necessary. The drive 130 accommodates a magnetic disc 141, an optical disc 142, a magneto-optical disc 143, a semiconductor memory 144, or other suitable recording medium. Computer programs read from the recording medium loaded in the drive 130 are installed into the storage unit 128 as needed.

Figure 3:
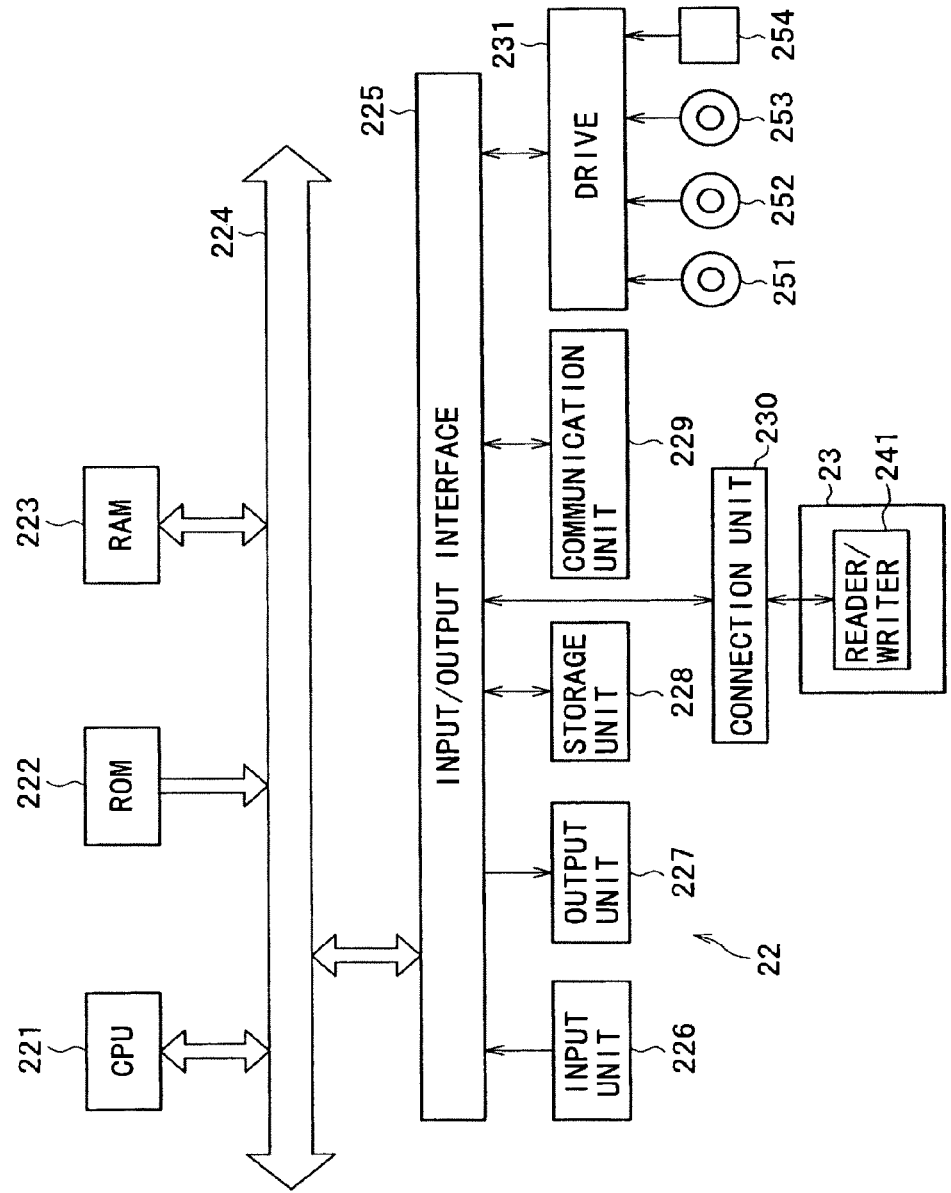
FIG. 3 is a block diagram illustrating a typical structure of a personal computer shown in FIG. 1.

The personal computer 22 is structured illustratively as shown in FIG. 3. The structure of the personal computer 22 is basically the same as that of the Pochara service server 9 in FIG. 2. That is, those components of the personal computer 22 which range from a CPU 221 to a communication unit 229 in FIG. 3 have basically the same functions as the components of the Pochara service server 9 ranging from the CPU 121 to the communication unit 129 in FIG. 2.

An input/output interface 225 of the personal computer 22 in FIG. 3 is connected to a connection unit 230 which in turn is linked to the stand 23. As shown in FIG. 3, the stand 23 incorporates a reader/writer 41. The reader/writer 41 reads information from the Pochara doll mounted on the stand 23 by electromagnetic induction and free of contact.

A drive 231 is connected to the input/output interface 225 where necessary. When a magnetic disc 251, an optical disc 252, a magneto-optical disc 253, or a semiconductor memory 254 is loaded into the drive 231, computer programs are read from the loaded recording medium and installed into a storage unit 228 as needed.

Figure 5:
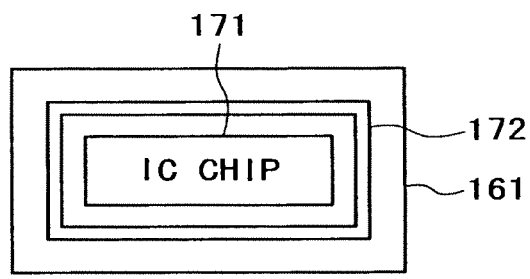
FIG. 5 is a block diagram indicating an internal structure of the Pochara the Good Friend doll.
Figure 6:
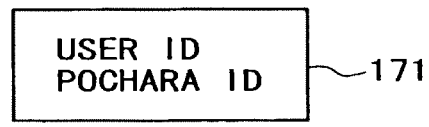
FIG. 6 is an explanatory view of information held in an IC chip shown in FIG. 5.

With this information processing system (i.e., information providing system), each user purchases beforehand the Pochara the Good Friend doll 161 such as one shown in FIG. 4 and utilizes the doll for user authentication purposes. As shown in FIG. 5, the Pochara the Good Friend doll 161 incorporates an IC chip 171 equipped with an antenna 172. As illustrated in FIG. 6, the IC chip 171 retains a user ID and a Pochara ID. The user ID serves as user identification information for identifying the user in possession of the Pochara the Good Friend doll 161 in question. The Pochara ID is used as Pochara doll identification information for identifying the Pochara the Good Friend doll 161. The user ID may double as the Pochara ID.

A process performed by the user to acquire the Pochara the Good Friend doll 161 will now be described with reference to the flowchart of FIG. 7. By operating an input unit 226, the user of the personal computer 22 enters a command for access to the Pochara service server 9. Given the access command from the input unit 226, the CPU 221 goes to step S1 and causes the communication unit 229 to access the Pochara service server 9 via the LAN 21, ISP 2, and the Internet 1. The Pochara service server 9 provides the accessing personal computer 22 on the Internet 1 with a GUI (graphical user interface) for inputting user information (step S21 of FIG. 9, to be discussed later). In turn, the user inputs his or her name, address, date of birth, gender, telephone number, fax number, e-mail address, credit card number, bank account number, and other relevant user information by operating the input unit 226. In step S2, the CPU 221 causes the communication unit 229 to transmit the input user information to the Pochara service server 9 over the Internet 1. Communications between the personal computer 22 (or any other terminal in use) and the Pochara service server 9 are encrypted as needed.

Figure 8:
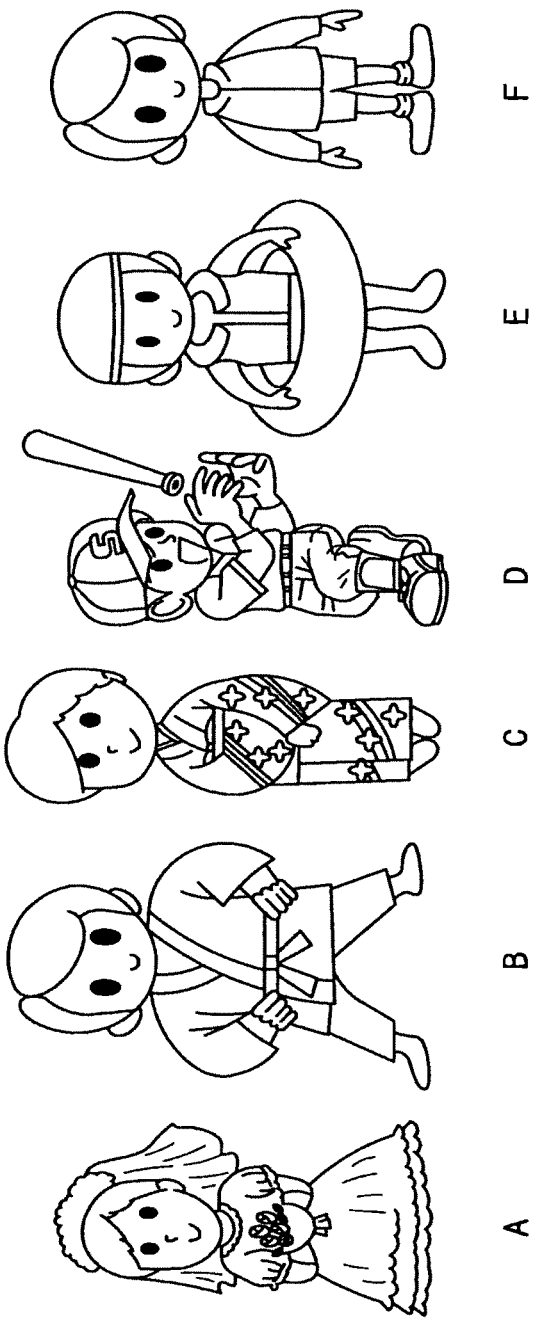
FIG. 8 is a schematic view of typical Pochara the Good Friend dolls.
Figure 9:
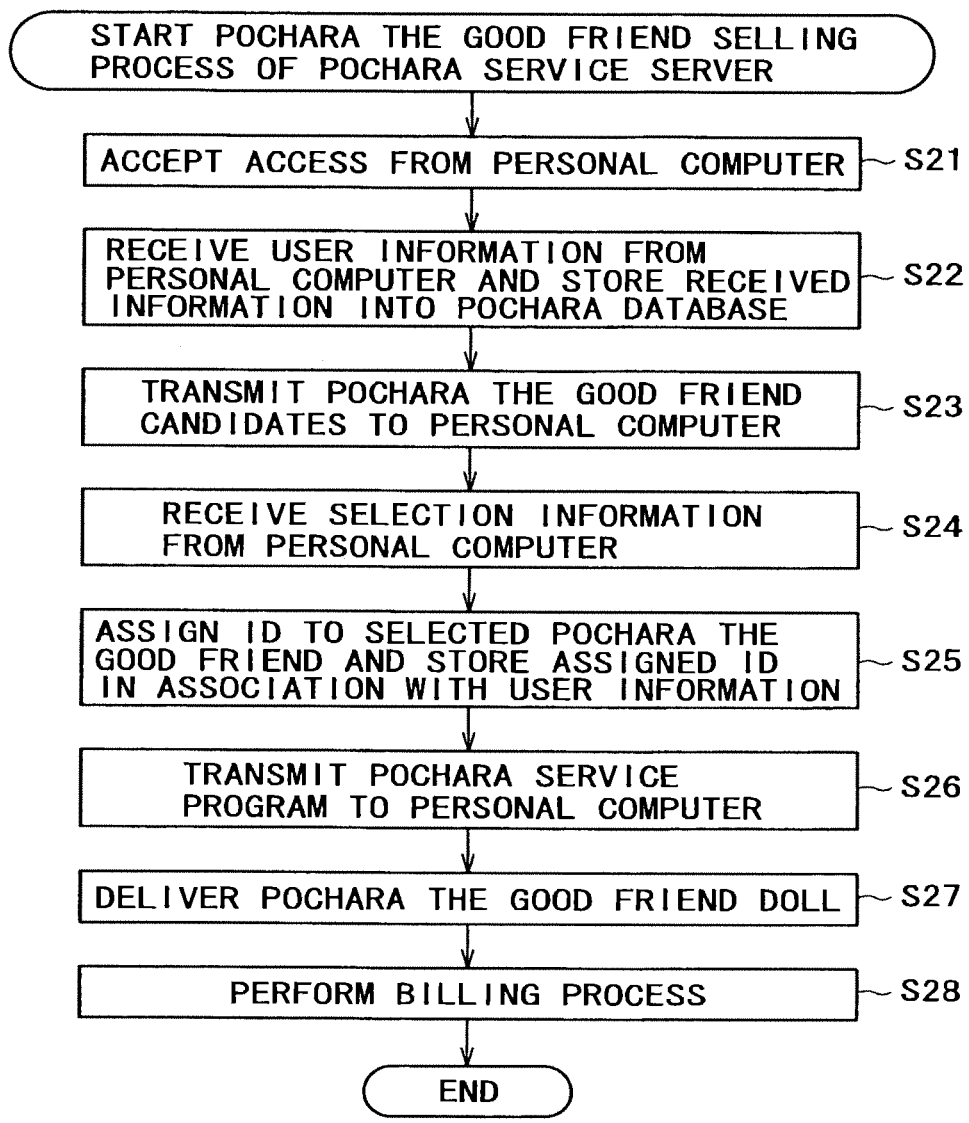
FIG. 9 is a flowchart of steps constituting a Pochara the Good Friend selling process performed by the Pochara service server in FIG. 1.

The Pochara service server 9 transmits images of Pochara the Good Friend doll candidates (in an at-a-glance form) to the personal computer 22 (step S23 of FIG. 9). In step S3, the CPU 221 receives the Pochara the Good Friend doll candidates from the Pochara service server 9 through the communication unit 229 and causes a display device of the output unit 227 to display the received candidates. The Pochara the Good Friend doll candidates are displayed illustratively as shown in FIGS. 8A through 8F. Of the six candidates in FIGS. 8A through 8F, the doll in FIG. 8F corresponds to the Pochara the Good Friend doll 161 depicted in FIG. 4.

From among the displayed Pochara the Good Friend doll candidates, the user designates one doll representative of himself or herself by operating the input unit 226. The CPU 221 accepts the selection of the Pochara the Good Friend doll in step S4.

In step S5, the CPU 221 transmits to the Pochara service server 9 information denoting the selection of the Pochara the Good Friend doll accepted in step S4.

On receiving the selection information from the personal computer 22, the Pochara service server 9 sends back a computer program for implementing Pochara services including the Pochara the Good Friend data corresponding to the selected Pochara the Good Friend doll (step S26 of FIG. 9).

In step S6, the CPU 221 of the personal computer 22 receives the computer program sent from the Pochara service server 9 and stores the received program into the storage unit 228. The program includes data (i.e., data constituting the Pochara the Good Friend doll) necessary for causing the display device of the output unit 227 to display an image representative of the Pochara the Good Friend doll in animated virtual form (the image is also called a character).

The Pochara the Good Friend character takes on the same image as that of the corresponding Pochara the Good Friend doll. In other words, the Pochara the Good Friend doll has the same shape (and colors) as the virtual doll displayed on the display device of the output unit 227.

For example, the Pochara the Good Friend doll 161 in FIG. 4 corresponds to the character of the Pochara the Good Friend shown in FIG. 8F.

The user installs the program, which was received in step S6, into other apparatuses that utilize the services provided by the Pochara service server 9. In the setup of FIG. 1, the program is installed into the TV set 24 and personal computer 26. The program is also installed into the personal computer 52 of the workplace 5.

The TV set 24 has a slot that accommodates a semiconductor memory such as a Memory Stick (trademark). Illustratively, the user stores the program into the Memory Stick through the personal computer 22 and inserts the program-loaded Memory Stick into the TV set 24. This causes the program to be installed into the TV set 24.

After installation of the program, the Pochara service server 9 delivers the Pochara the Good Friend doll (step S27 of FIG. 9) selected by the user in step S4. In step S8, the user receives the doll delivered by the Pochara service server 9.

Figure 7:
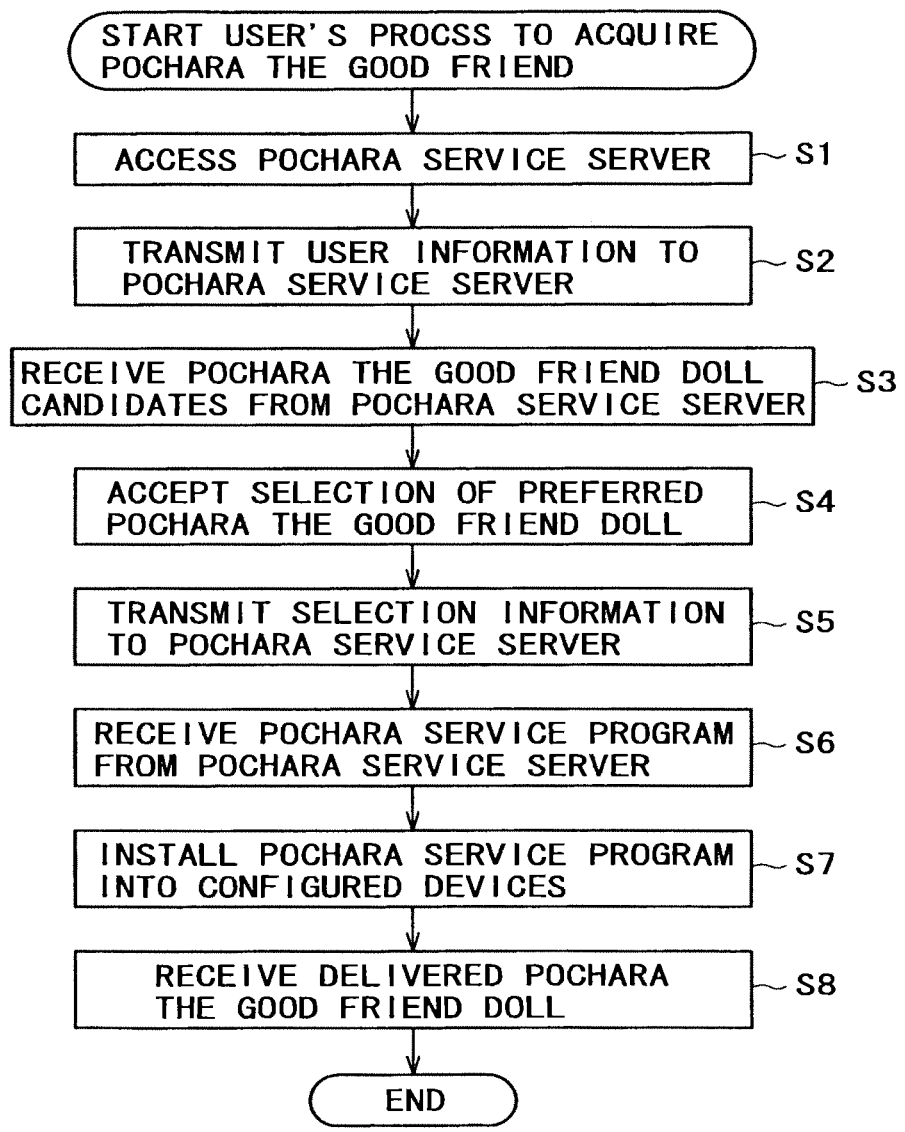
FIG. 7 is a flowchart of steps constituting a process performed by a user to acquire Pochara the Good Friend doll.

In conjunction with the steps performed by the personal computer 22 as shown in FIG. 7, the Pochara service server 9 carries out the process outlined in the flowchart of FIG. 9.

In step S21 of FIG. 9, the CPU 121 of the Pochara service server 9 causes the communication unit 129 to accept an attempt of access by the user who operates the personal computer 22 on the Internet 1. After accepting the access, the Pochara service server 9 provides a GUI to the personal computer 22 over the Internet to let the user input user information.

Based on the GUI, the user transmits user information as discussed above (step S2 of FIG. 7). In step S22, the CPU 121 of the Pochara service server 9 receives the user information from the personal computer 22 and forwards the received information through the communication unit 129 to the Pochara database 10 for user registration. This allows the user information to be stored into the Pochara database 10 (details of the registration will be discussed later with reference to FIG. 30).

In step S23, the CPU 121 reads Pochara the Good Friend doll candidates from the storage unit 128 and transmits the retrieved candidates to the personal computer 22. The candidates such as those shown in FIGS. 8A through 8F are sent to the personal computer 22 as described above.

From among the received Pochara the Good Friend doll candidates, the user selects one doll as mentioned above and transmits information about the selection (step S5 of FIG. 7).

In step S25, the CPU 121 assigns a user ID to the user as user identification information. The CPU 121 further assigns a Pochara ID to the Pochara the Good Friend doll selected by the user. The assigned Pochara ID is stored as part of Pochara information in the Pochara database 10 in association with the user information. In addition to the Pochara ID, the Pochara information includes a flag indicating whether the doll in question is a Pochara the Good Friend (Pochara the Good Friend flag), and/or parameters belonging to the Pochara doll. The parameters illustratively denote the costume worn by the Pochara the Good Friend doll in question or functions provided by the doll. The Pochara the Good Friend flag may be included alternatively in the Pochara ID assigned to the Pochara the Good Friend doll 161.

In step S26, the CPU 121 reads from the storage unit 128 the program for allowing the user to receive Pochara services, and transmits the retrieved program to the personal computer 22 over the Internet 1. At this point, the CPU 121 transmits the program together with the user ID and Pochara information necessary for displaying the character of the Pochara the Good Friend. The Pochara information contains the Pochara ID and Pochara-related data including various parameters serving as a basis for generating the image. The program is received by the personal computer 22 (step S6 of FIG. 7).

In step S27, the CPU 121 executes a process for delivering the Pochara the Good Friend doll corresponding to the selection information received in step S24. More specifically, the CPU 121 causes a printer of the output unit 127 to output information (Pochara ID) for identifying the Pochara the Good Friend doll selected by the user as well as the user's address and name. On the basis of the printout, the administrator of the Pochara service server 9 takes steps to have the appropriate Pochara the Good Friend doll delivered to the user.

In step S28, the CPU 121 performs a billing process to settle the payment for the Pochara the Good Friend doll delivered to the user.

More specifically, the CPU 121 requests the billing server 13 to settle the payment for the Pochara the Good Friend doll on the basis of the credit card number included in the user information. Alternatively, the CPU 121 requests the billing server 13 to charge the payment to the bank account number included in the user information. Given the request, the billing server 13 requests the credit card company or the bank to charge the payment for the Pochara the Good Friend doll to the use's account.

In the manner described, the user acquires the Pochara the Good Friend doll 161. It is also possible for the user to purchase the Pochara the Good Friend doll 161 by directly visiting a specific shop managed by the administrator of the Pochara service server 9. In this case, the user inputs the user information on the spot at the shop.

In the foregoing description, the personal computer 22 was shown accessing the Pochara service server 9 and transmitting necessary user information to the connected server 9 before having the Pochara the Good Friend doll delivered. In other words, the user takes delivery of the Pochara the Good Friend doll after completing user registration. As an alternative, the user may purchase a Pochara the Good Friend doll containing only a Pochara ID before carrying out the user registration over the network. The Pochara the Good Friend doll thus purchased serves as the user's agent thereafter.

Figure 10:
FIG. 10 is a schematic view of a typical On-sale Pochara doll.

The shop may also sell the On-sale Pochara doll 181 shown in FIG. 10 in addition to the Pochara the Good Friend doll 161. The user may purchase On-sale Pochara dolls 181 at various shops as needed. Each On-sale Pochara doll 181 also incorporates an IC chip 191 that has information corresponding to functions possessed by the On-sale Pochara doll 181 in question.

Figure 11:
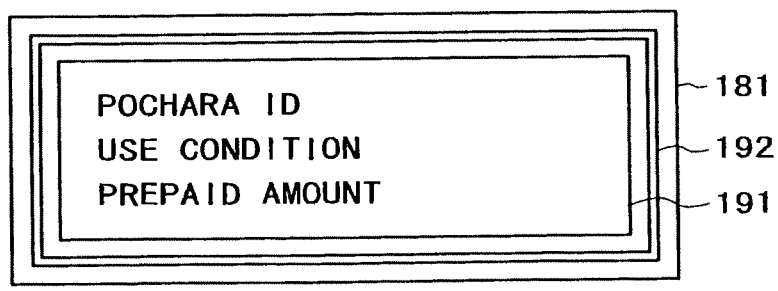
FIG. 11 is a schematic view showing typical information held in an IC chip of the On-sale Pochara doll.

FIG. 11 schematically shows typical information held in the IC chip 191 of an On-sale Pochara doll 181 which has the function of providing content data. In this example, the IC chip 191 equipped with an antenna 192 retains a Pochara ID and a use condition which stipulates the condition to be met when content is to be used. The use condition typically includes the number of times the content in question is allowed to be reproduced and a time limit on reproduction of the content.

The IC chip 191 further retains, as needed, a prepaid amount corresponding to the payment (purchase price) made by the user for the use of the content.

After acquiring the Pochara the Good Friend doll 161 or the On-sale Pochara doll 181 with a view to receiving content, the user mounts the acquired doll on a stand attached to the apparatus in use. For example, where the personal computer 22 is in use, the user mounts the Pochara the Good Friend doll 161 or the On-sale Pochara doll 181 on the connected stand 23. In this case, the personal computer 22 carries out the process indicated in the flowcharts of FIGS. 12 through 16.

Figure 12:
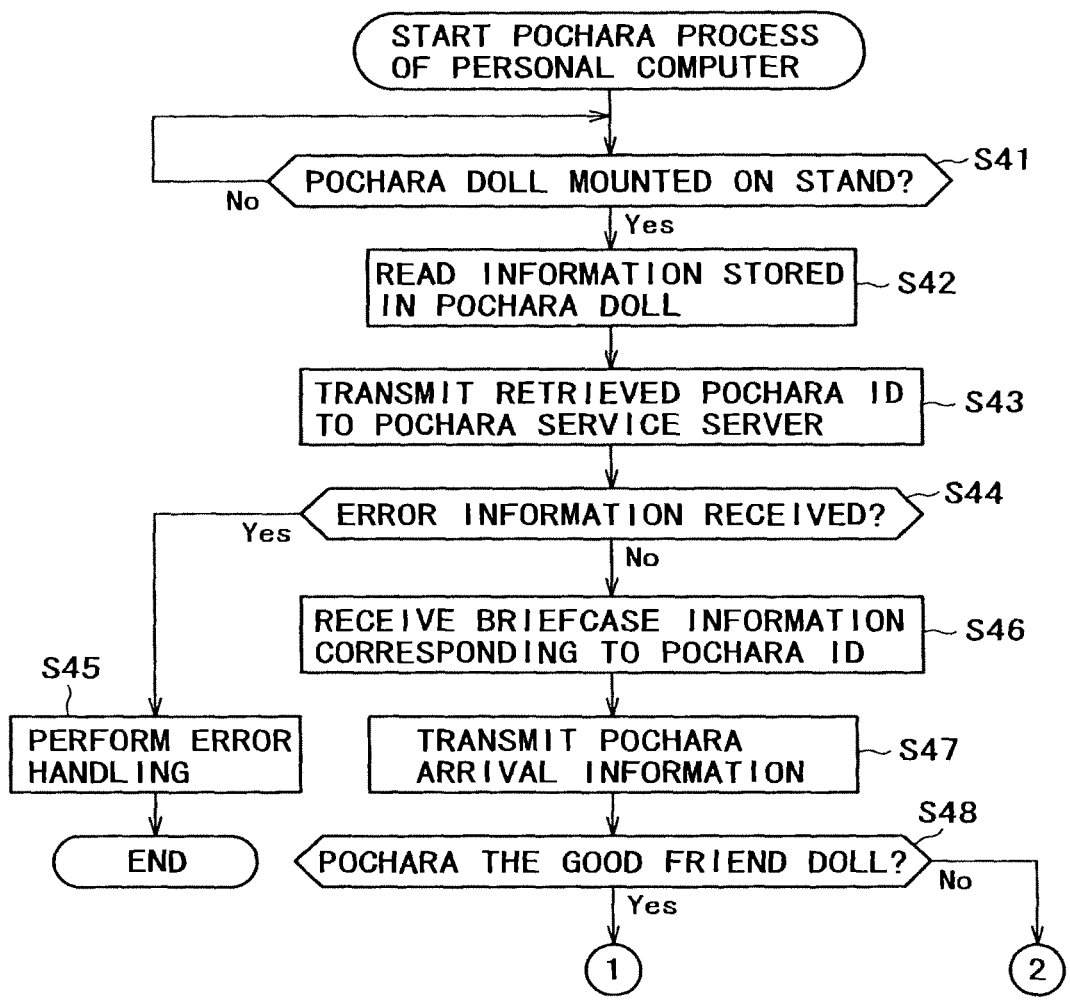
FIG. 12 is a flowchart of steps constituting part of a Pochara process performed by the personal computer in FIG. 1.

In step S41 of FIG. 12, the CPU 221 of the personal computer 22 determines whether a Pochara doll is mounted on the stand 23. If no Pochara doll is found to be placed on the stand 23, the CPU 221 waits until the doll is mounted.

When the Pochara doll is mounted on the stand 23, information held in the IC chip 171 (or 191) of the doll is read therefrom by a reader/writer 241. The retrieved information is forwarded to the CPU 221 through the connection unit 230. The CPU 221 repeats step S41 until the information has been read out and forwarded.

With the Pochara doll found mounted on the stand 23, step S42 is reached. In step S42, the CPU 221 reads the information from the IC chip 171 (or 191) of the mounted doll. Whether the mounted Pochara doll is a Pochara the Good Friend doll 161 or an On-sale Pochara doll 181, the IC chip 171 or 191 inside contains a Pochara ID (FIGS. 6 and 11). In step S43, the CPU 221 causes the communication unit 229 to transmit the retrieved Pochara ID to the Pochara service server 9. The transmitted ID is used by the Pochara service server 9 in identifying the user (i.e., Pochara doll). That is, the Pochara ID is used here as a user ID. By the same token, if a user ID is stored in the doll, that ID may be transmitted instead. It is also acceptable to transmit both the Pochara ID and the user ID.

The retrieved Pochara ID is transmitted to the Pochara service server 9 through the LAN 21, ISP 2, and the Internet 1. In other words, when the Pochara the Good Friend doll 161 is mounted on the stand 23, the CPU 21 executes a log-in process (connecting process) to the Pochara service server 9 in step S43.

Because there is no need for the user to input IDs by operating the keyboard or the like, it is easy to access the Pochara service server 9 with no typos committed. This allows the people not comfortable with keyboard operations such as children, women and elderly people to readily access the server 9.

Upon receipt of a Pochara ID, the Pochara service server 9 determines whether the received ID is stored in the Pochara database 10 (step S93 of FIG. 28, to be discussed later). Besides the IDs of Pochara the Good Friend dolls, the Pochara database 10 stores the IDs of On-sale Pochara dolls. If the retrieved Pochara ID is found in the Pochara database 10, the Pochara service server 9 reads corresponding briefcase information from the Pochara database 10 and sends back the briefcase information (step S98 or S107 of FIG. 28).

Figure 28:
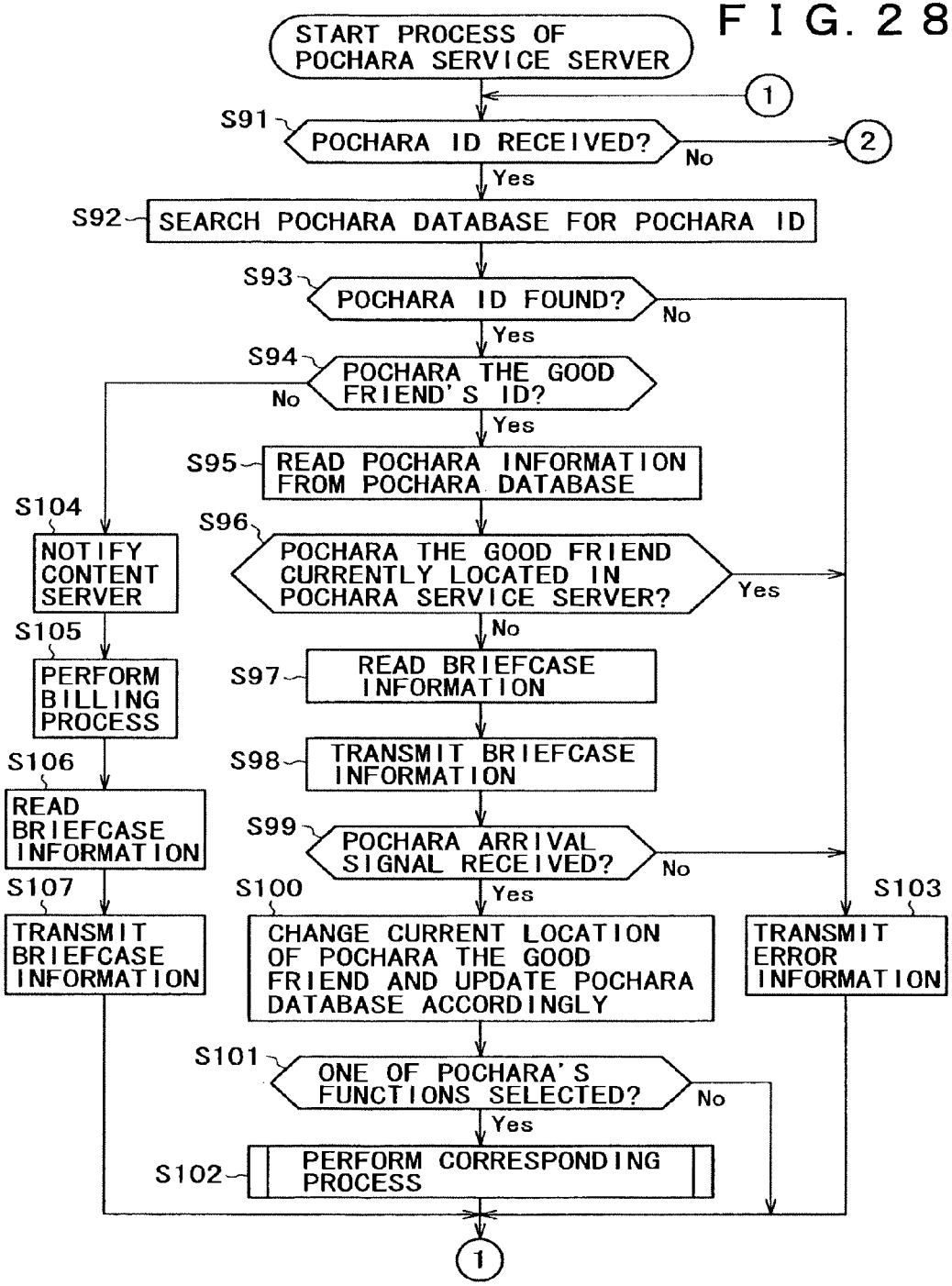
FIG. 28 is a flowchart of steps constituting part of a process performed by the Pochara service server in FIG. 1.

If the Pochara ID is not found in the Pochara database 10, the Pochara service server 9 transmits error information (step S103 of FIG. 28).

In step S44, the CPU 221 of the personal computer 22 determines whether error information is received from the Pochara service server 9. If in step S44 the error information (i.e., information transmitted in step S103 of FIG. 28) is found to be received, the CPU 221 goes to step S45. In step S45, the CPU 221 performs error handling. This is the case where the Pochara ID in question is not found in the Pochara database 10, so that the user is unable to receive Pochara services.

If in step S44 no error information is found to be received (i.e., if what is received turns out to be the briefcase information transmitted in step S98 or S107 of FIG. 28), step S46 is reached. In step S46, the CPU 221 receives the briefcase information sent from the Pochara service server 9. In step S47, the CPU 221 transmits Pochara arrival information to the Pochara service server 9. The Pochara arrival information is received by the Pochara service server 9 in step S99 of FIG. 28, to be described later.

In step S48, the CPU 221 determines whether the object mounted on the stand 23 is the appropriate Pochara the Good Friend doll 161. More specifically, the briefcase information sent from the Pochara service server 9 contains a Pochara the Good Friend flag indicating whether the Pochara ID transmitted to the Pochara service server 9 in step S43 corresponds to the Pochara the Good Friend ID in question. The CPU 221 performs the determining process of step S48 in accordance with this Pochara the Good Friend flag.

The briefcase information about a Pochara the Good Friend typically includes character information, mail information, schedule information, preference information, job information, recommended information, search information, content information, and a Pochara the Good Friend flag, as shown in FIG. 17. The briefcase information about an On-sale Pochara illustratively includes character information, content information, and a Pochara the Good Friend flag, as depicted in FIG. 18.

These items of information, contained in Pochara information about a Pochara the Good Friend in FIG. 31, to be discussed later, or in Pochara information about an On-sale Pochara in FIG. 32, to be described later, are transmitted as the briefcase information. Details of the information will be discussed later with reference to FIGS. 31 and 32.

As needed, the briefcase information about the Pochara the Good Friend or On-sale Pochara may further include license information comprising a server address, a license ID, and an encryption key.

It is possible to store character information and content image data in a suitable IC chip or in a terminal such as a personal computer so that the information or the data may be updated to reflect any subsequent changes made. This arrangement is utilized advantageously where the line involved is for narrow-band use or where the user is billed for the exact amount of data transferred over the line.

Figure 13:
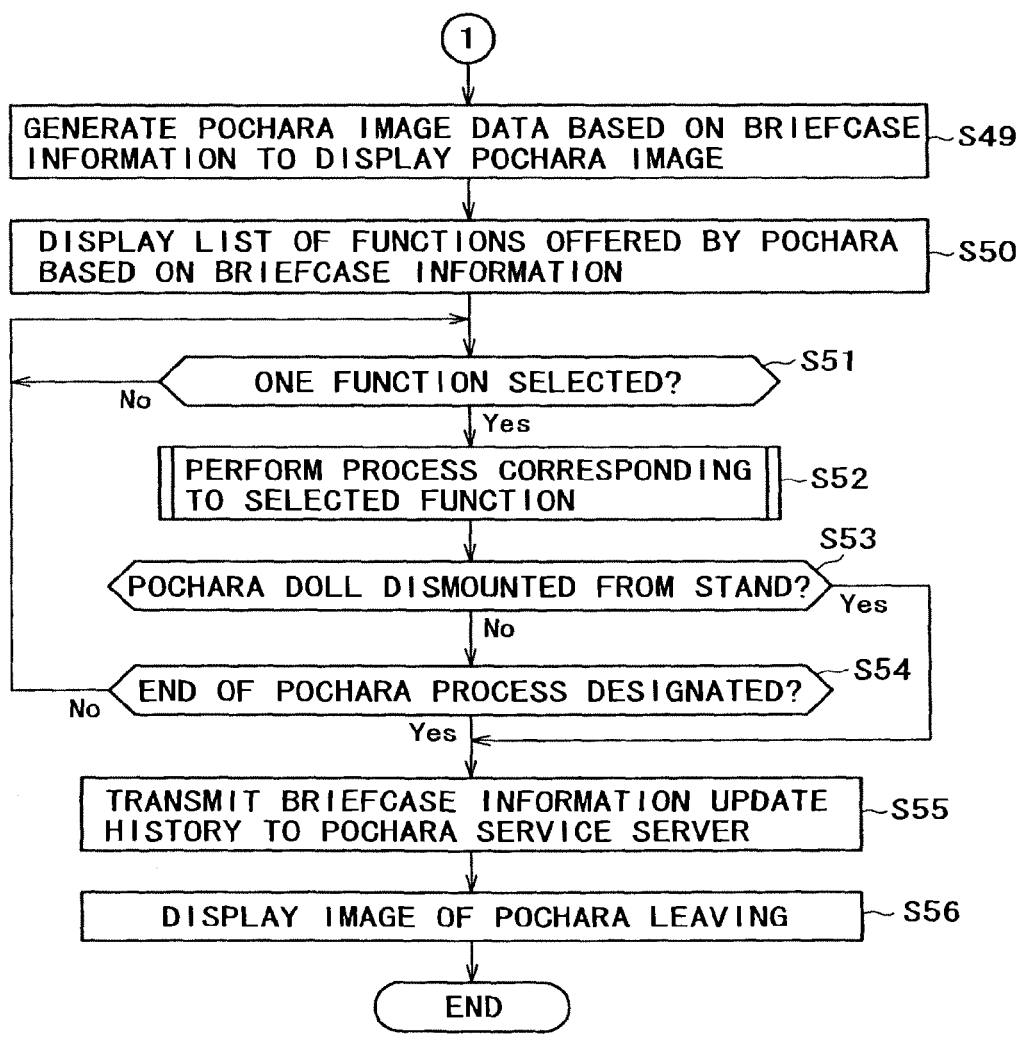
FIG. 13 is another flowchart of steps constituting part of the Pochara process performed by the personal computer in FIG. 1.

If what is placed on the stand 23 turns out to be the Pochara the Good Friend doll 161, then a process regarding the corresponding user is carried out. In this case, step S49 of FIG. 13 is reached in which the CPU 221 generates Pochara image data based on the briefcase information received in step S46 so as to display a Pochara character on the display device of the output unit 227.

More specifically, the storage unit 228 of the personal computer 22 retains the Pochara information received from the Pochara service server 9 in step S6 of FIG. 7. From the storage unit 228, the CPU 221 reads the character information about the Pochara the Good Friend from among the Pochara information corresponding to the Pochara ID included in the briefcase information. In the character information, the CPU 221 sets specific parameter values found in the briefcase information in order to generate image data about the Pochara the Good Friend. The generated image data are output to the display device of the output unit 227 where an image of the Pochara the Good Friend (i.e., a virtual Pochara the Good Friend character) is displayed. This Pochara the Good Friend character corresponds in shape to the Pochara the Good Friend doll 161 mounted on the stand 23.

In other words, the Pochara the Good Friend doll 161 is fabricated so as to correspond in shape to the image (character). When the user takes a look at the Pochara the Good Friend character appearing on the display device of the output unit 227, the user can intuitively recognize that the displayed character is representative of the Pochara the Good Friend doll 161 mounted on the stand 23.

As described, the Pochara character similar in shape to the actual doll is displayed. This allows the user to readily identify the service about to be received.

In the foregoing description, the Pochara information for displaying the virtual Pochara the Good Friend character was shown supplied by the Pochara service server 9 to the personal computer 22. Alternatively, the Pochara information may be stored in the Pochara the Good Friend doll 161. This will permit appreciably quicker display of the character.

The Pochara information received from the Pochara service server 9, particularly the Pochara image data containing the parameters necessary for displaying the character such as polygonal, textural and motional parameters may be stored in the Pochara the Good Friend doll 161 (or the personal computer 22) when received from the Pochara service server 9. In this case, a check is made to see if the Pochara image data are updated every time the Pochara service server 9 is accessed. If no updates are found to be made, the currently stored Pochara image data are utilized; if any updates are found, new Pochara image data are received from the Pochara service server 9 and stored.

Figure 22:
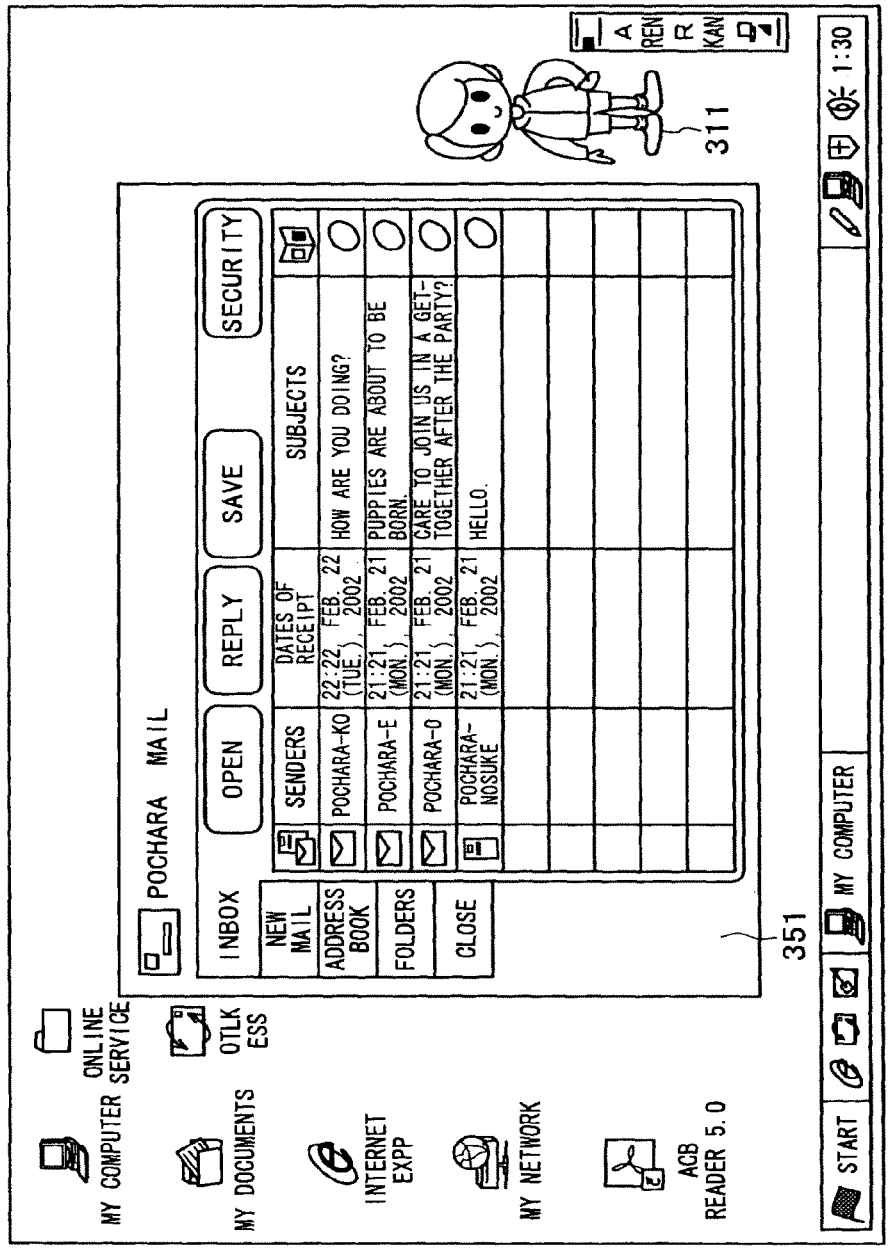
FIG. 22 is a schematic view of another typical Pochara display that appears when the mail function is selected.

The Pochara information may further include a header part of e-mail (i.e., e-mail senders, dates of receipt (dates and times), message subjects, and other information necessary for e-mail selection, as shown in FIG. 22, to be described later). In this case, the moment the user selects the e-mail function, the ISP 2 acting as a mail server is accessed and the text of e-mail messages is downloaded.

In step S50, based on the briefcase information about the Pochara the Good Friend in question, the CPU 221 displays the Pochara the Good Friend character surrounded by an assortment of functions possessed by the character in the form of icons.

Figure 20:
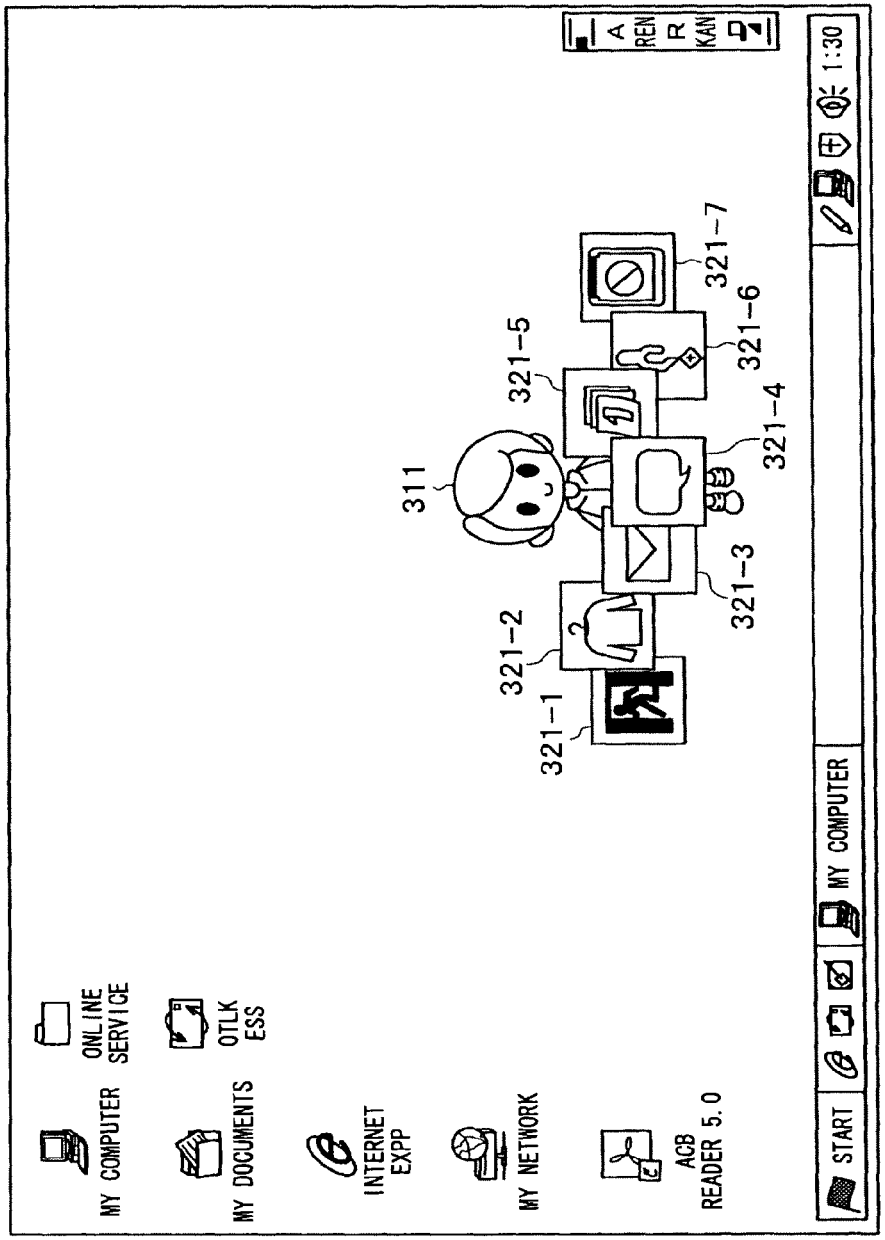
FIG. 20 is a schematic view of another typical Pochara display.

FIGS. 19 and 20 show typical displays resulting from the processes executed in steps S49 and S50.

First to be displayed is a stage entrance 301 through which a Pochara the Good Friend character makes its appearance, as shown in FIG. 19. Then through the stage entrance 301 appears an animated image of a Pochara the Good Friend character 311 corresponding to the Pochara the Good Friend doll 161, as illustrated in FIG. 20. As mentioned above, the Pochara the Good Friend character 311 displayed here corresponds in shape to the Pochara the Good Friend doll 161.

The Pochara the Good Friend character 311 on display is surrounded by icons 321-1 through 321-7 representing the functions possessed by the character 311 (i.e., by its user). Whereas the display example of FIG. 20 shows seven icons, the number of such icons may be raised or reduced as desired.

In another example, the character 311 may be shown carrying a briefcase on display. When the user clicks on the briefcase, the icons contained in the briefcase may be shown coming out of the briefcase and spreading out.

The user selects any one of the icons appearing as described in conjunction with the available functions. Typically, the user makes the selection by operating a mouse constituting part of the input unit 226.

In step S51 of FIG. 13, the CPU 221 waits until one of the functions on display is selected by the user. When any one function is found to be selected, the CPU 221 goes to step S52. In step S52, the CPU 221 carries out a process corresponding to the selected function.

For example, if the user selects among the seven icons an icon 321-3 representing the mail function, the CPU 221 carries out the process corresponding to the mail function. Specifically, the CPU 221 causes the communication unit 229 to send a mail information read request to the Pochara service server 9.

The Pochara service server 9 gains access through the Internet 1 to the ISP 2 (acting as the mail server) either periodically or upon receipt of a mail information acquisition command from the personal computer 22. When linked to the ISP 2, the Pochara service server 9 reads mail information about the user in question from the ISP 2 and stores the retrieved information into the Pochara database 10. The Pochara service server 9 then reads the mail information from the Pochara database 10 and transmits the retrieved information to the personal computer 22 through the Internet 1, ISP 2, and LAN 21.

Figure 21:
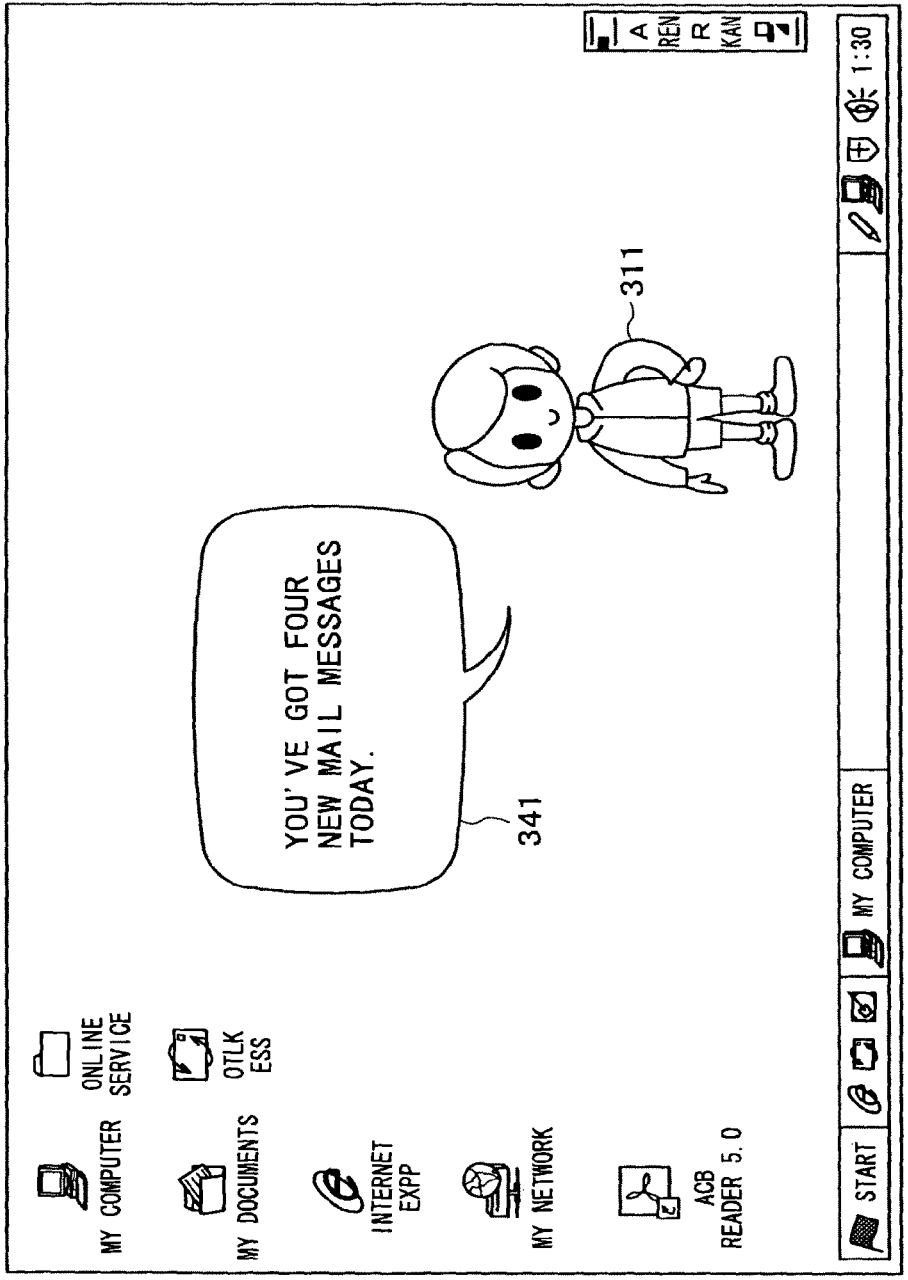
FIG. 21 is a schematic view of a typical Pochara display that appears when a mail function is selected.

The CPU 221 causes the display device of the output unit 227 to display images corresponding to the retrieved mail information. FIG. 21 shows one such typical display. In this example, a balloon 341 is shown in the top left area of the Pochara the Good Friend character 311. The balloon 341 contains the character's message which says, "You've got four new mail messages today." The display informs the user that four new mail messages addressed to the user have been received.

When the user designates mail message readout by operating the mouse of the input unit 226, the CPU 221 displays in a window 351 a list of mail subjects which was read from the ISP 2 and is now retained in the Pochara database 10, as shown in FIG. 22. When the user selects a specific mail message among the displayed message subjects, the text of the mail is displayed.

Suppose now that the user selects a scheduler icon 321-5 among the seven icons on display. In that case, the CPU 221 accesses the Pochara service server 9 to request that schedule information about the user of the Pochara the Good Friend in question be read from the Pochara database 10 and transmitted to the personal computer 22.

Figure 23:
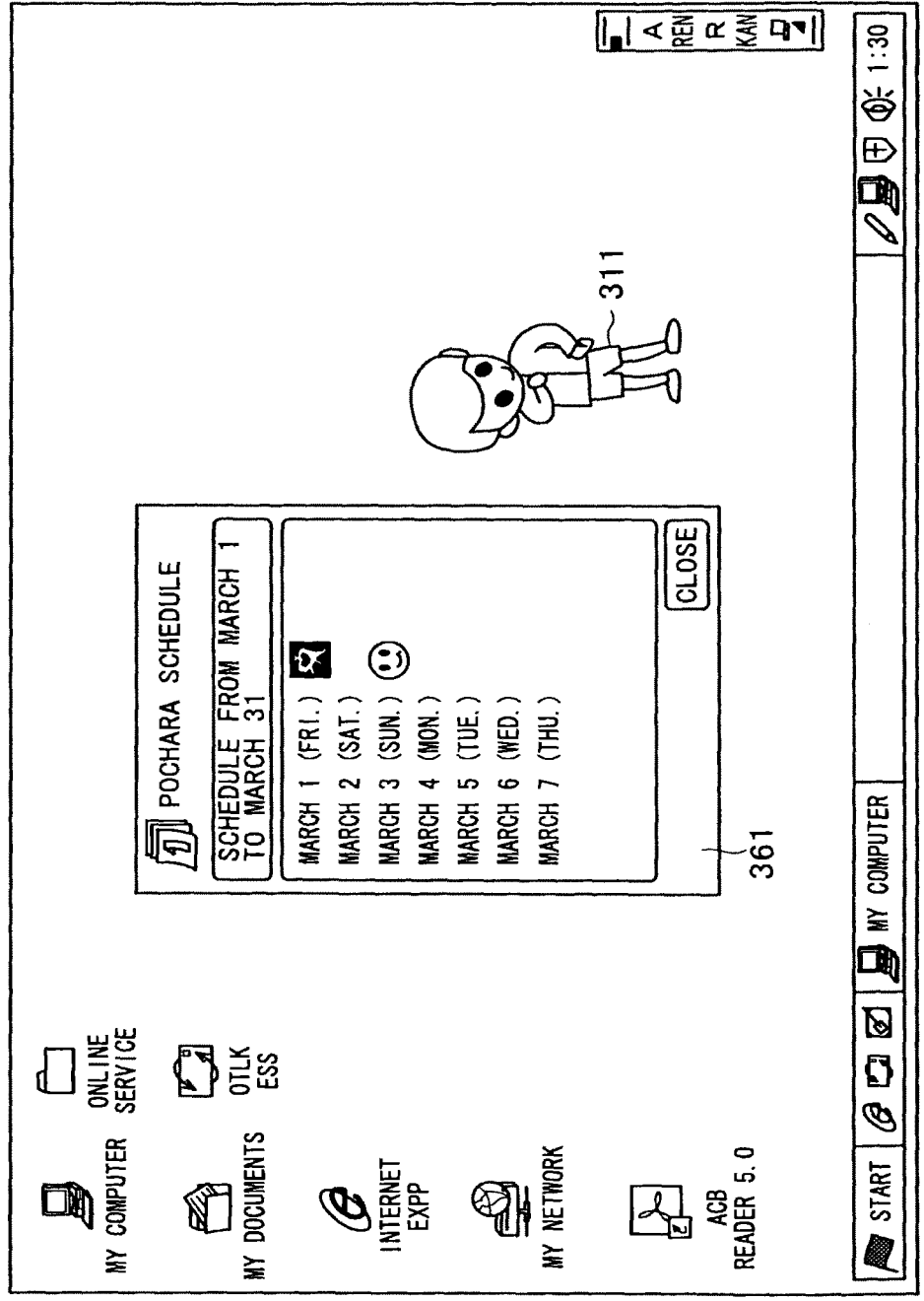
FIG. 23 is a schematic view of a typical Pochara display that appears when a schedule function is selected.

After acquiring the schedule information, the CPU 221 of the personal computer 22 outputs the acquired information to the display device of the output unit 227 for display. In turn, a window 361 appears as shown in FIG. 23 displaying a schedule of the user in possession of the Pochara the Good Friend character 311.

Figure 24:
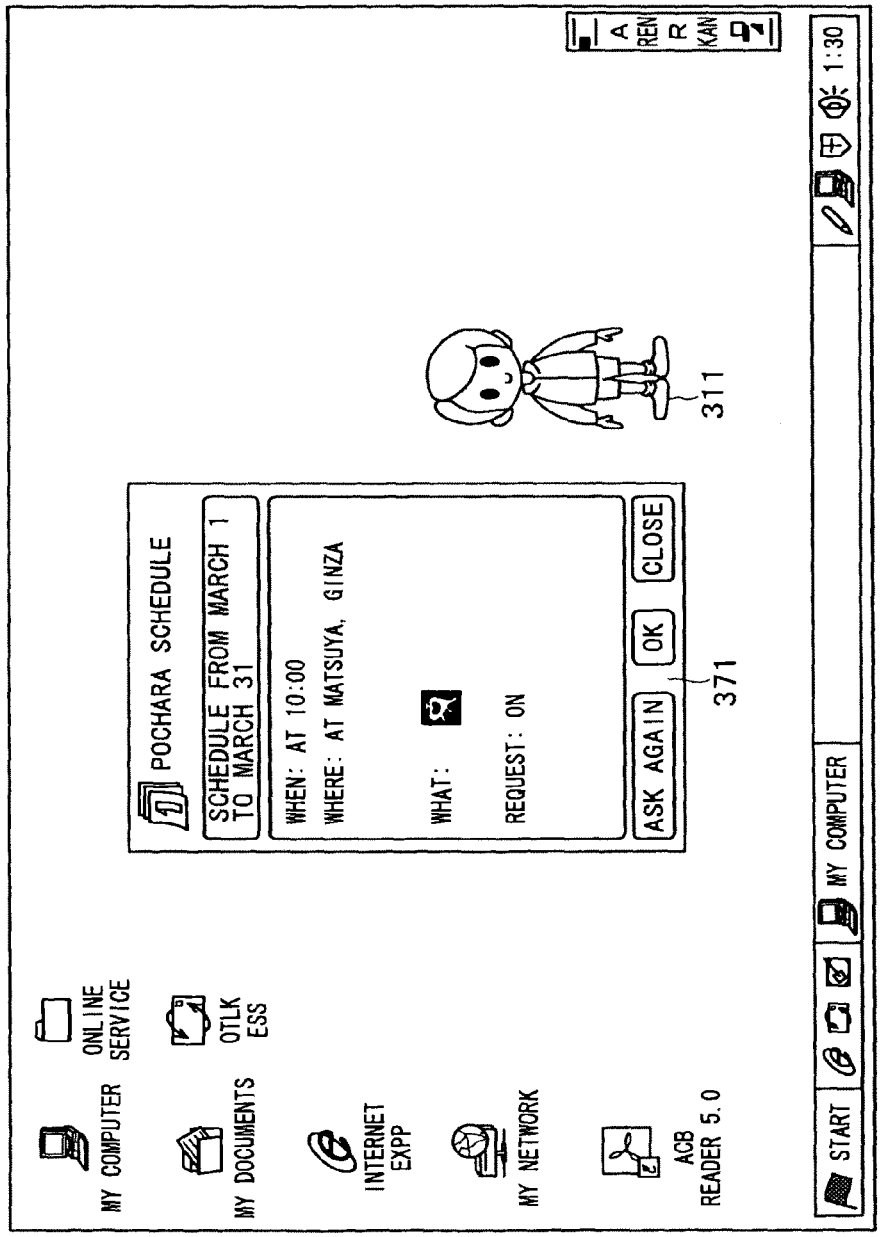
FIG. 24 is a schematic view of another typical Pochara display that appears when the schedule function is selected.

The user may click on a given date in the schedule shown inside the window 361 by operating the mouse. This causes a detailed schedule on that date to be displayed in a window 371 as illustrated in FIG. 24. In this example, the user's schedule on March 1 is displayed.

Figure 25:
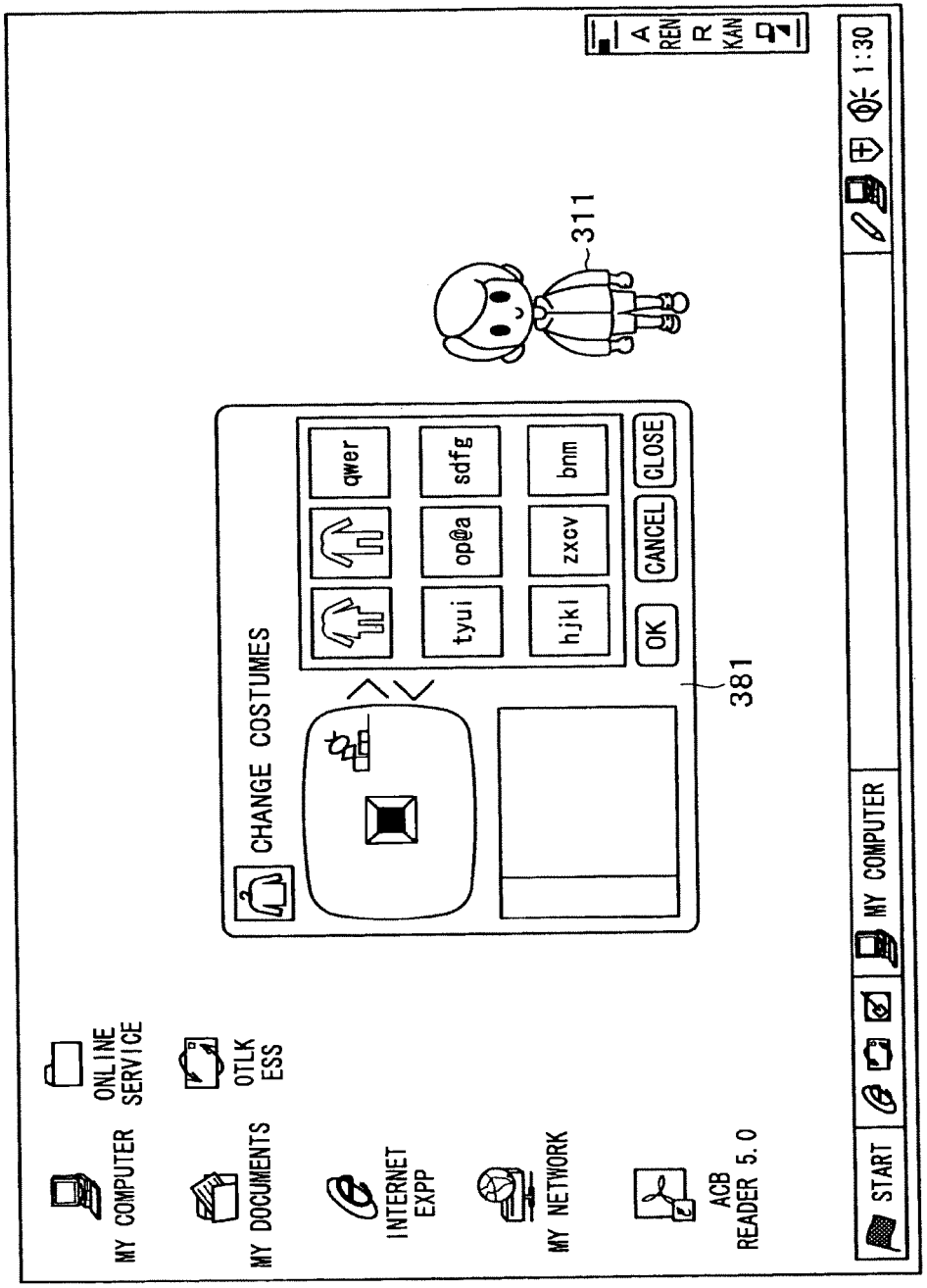
FIG. 25 is a schematic view of a typical Pochara display that appears when a costume-changing function is selected.

When the user selects a costume-changing icon 321-2 among the seven icons on display, the CPU 221 accesses the Pochara service server 9 to acquire a GUI necessary for changing costumes of the Pochara the Good Friend character 311. The GUI thus acquired is displayed in a window 381 as illustrated in FIG. 25. The user may click on a suitable button in the window 381 to change costumes (shirt, pants, etc.) of the Pochara the Good Friend character 311 as desired. The newly selected costume is preserved as parameters. Changing the costumes of the Pochara the Good Friend character 311 keeps the user from getting tired of his or her virtual alter ego.

As described, a variety of processes are performed in step S52 of FIG. 13 depending on the selected function. These processes will be discussed later in more detail.

In step S53, the CPU 221 determines whether the Pochara the Good Friend doll 161 is dismounted from the stand 23. If the doll 161 is not found dismounted, step S54 is reached in which the CPU 221 checks to see whether a command to end the Pochara-related process is received. When ending the Pochara-related process, the user either dismounts the Pochara the Good Friend doll 161 from the stand 23, or issues a process termination command by operating the input unit 226.

If in step S54 the command to end the Pochara process is not found to be designated, control is returned to step S51. The subsequent steps are then repeated.

Illustratively, the CPU 221 commands the reader/writer 241 to read data from the IC chip 171 in the Pochara the Good Friend doll 161 mounted on the stand 23, at relatively short intervals (e.g., once per second). If data cannot be read from the IC chip 171, that is interpreted to signify that the Pochara the Good Friend doll 161 is dismounted from the stand 23.

If the Pochara the Good Friend doll 161 is found dismounted from the stand 23, or if the user is found to have given the command to end the Pochara process in step S54, the CPU 221 transmits a briefcase information update history to the Pochara service server 9 in step S55. This history serves to notify the Pochara service server 9 that the Pochara the Good Friend doll 161 is dismounted from the stand 23 or that the user has specified an end to the Pochara process. The history is stored into the Pochara service server 9 (step S109 of FIG. 29).

The history includes an updated schedule, bookmarks, character information (hair style, costume, etc.), and information about user's inferred thoughts. If these items of history are written directly in the Pochara service server 9, their updates are carried out by the server 9 itself.

Figure 26:
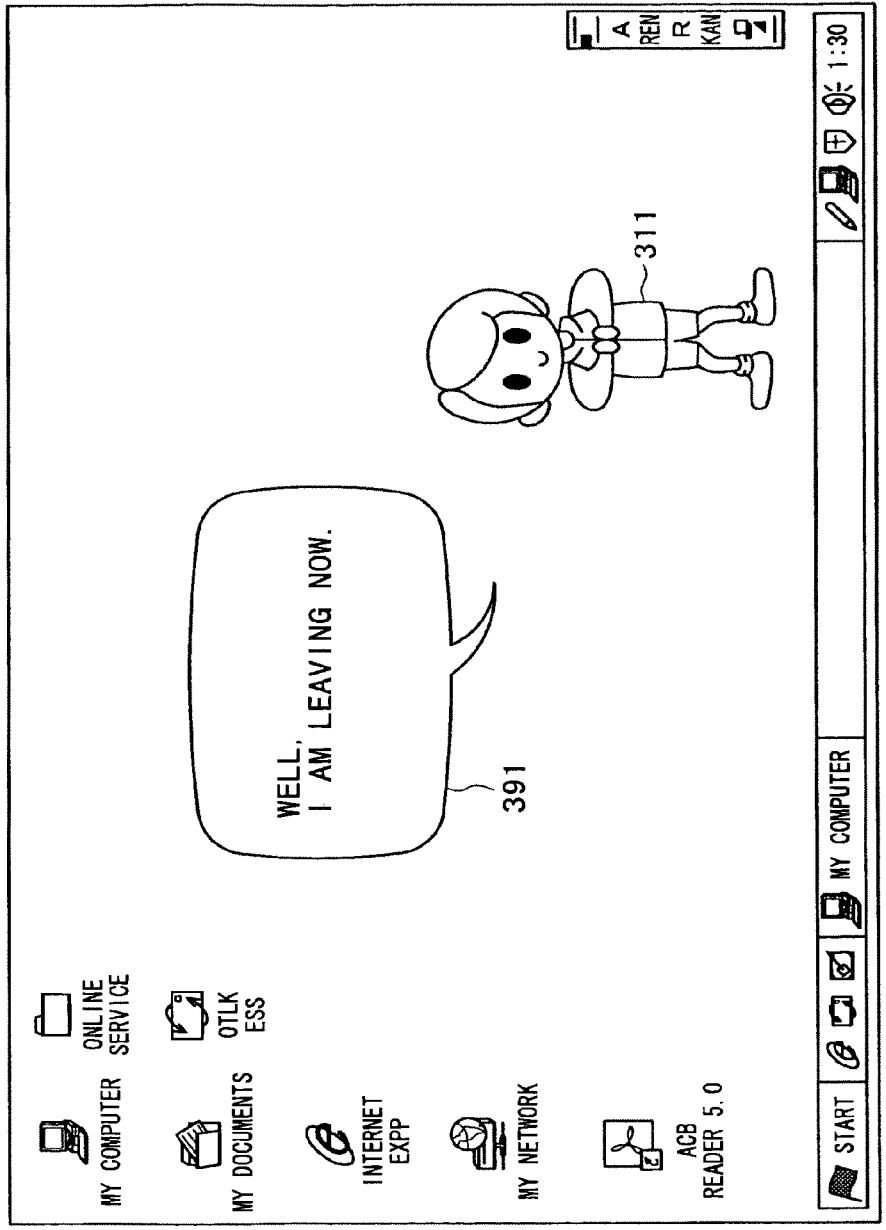
FIG. 26 is a schematic view of another typical Pochara display.
Figure 27:
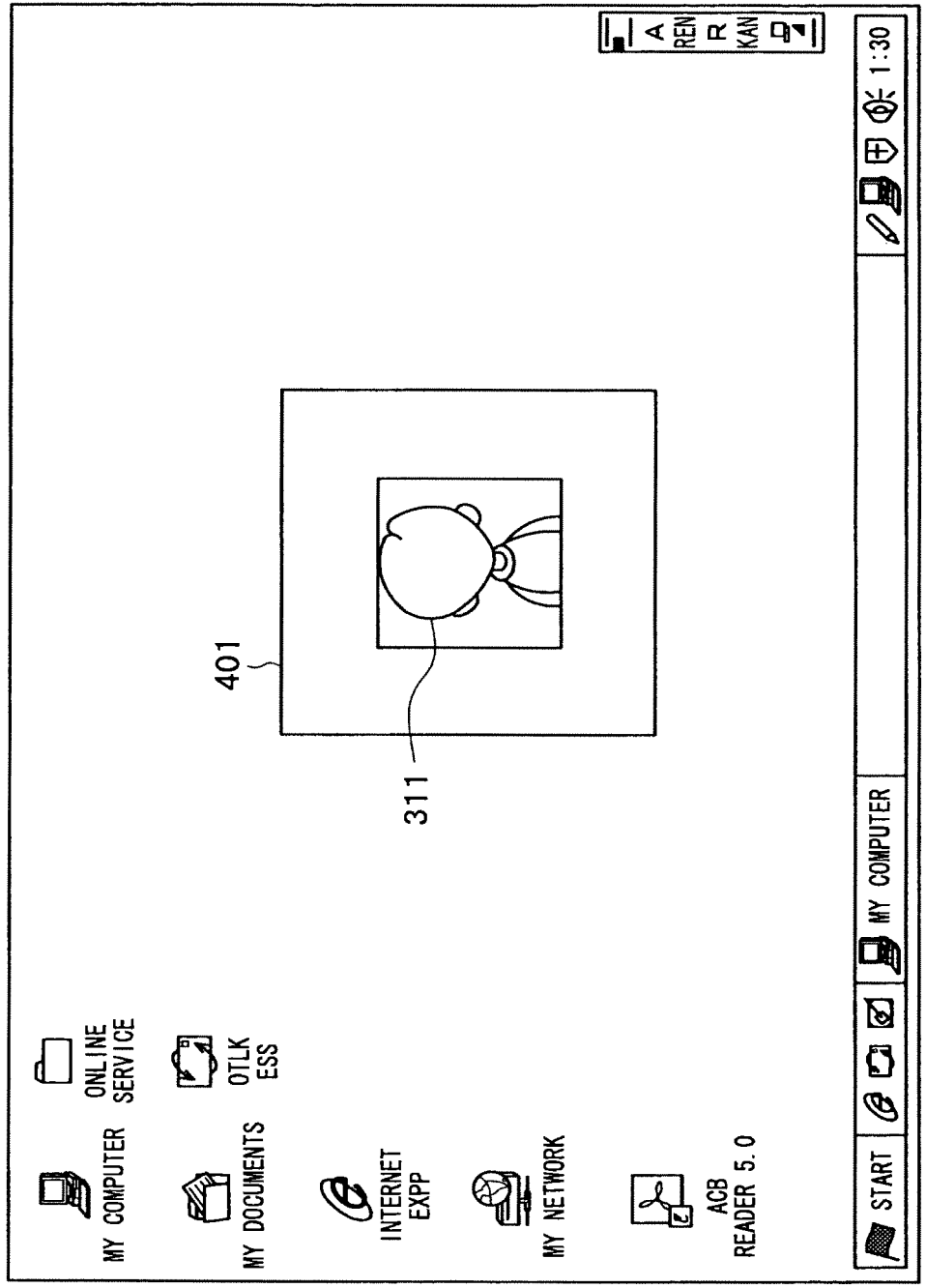
FIG. 27 is a schematic view of another typical Pochara display.

In step S56, the CPU 221 causes the display device of the output unit 227 to display an image of the Pochara the Good Friend character 311 leaving the screen. FIGS. 26 and 27 show how this leave-taking typically occurs. In the example of FIG. 26, a balloon 391 is shown in the top left area of the Pochara the Good Friend character 311. The balloon 391 contains the character's message which says, "Well, I am leaving now." Then the screen shows an exit 401 through which an animated image of the Pochara the Good Friend character 311 disappears, as indicated in FIG. 27.

These displays allow the user intuitively to recognize that the process related to the Pochara the Good Friend has ended. That is, when the Pochara the Good Friend doll 161 is dismounted from the stand 23, the CPU 221 carries out a log-out process in step S54 to sever its connection from the Pochara service server 9.

As described, a Pochara the Good Friend character identical in shape to the actual doll is displayed the moment the service is started, and the character disappears when the service is terminated. This makes it possible for the user to readily grasp log-in and log-out. Thus there is practically no possibility that the user would make computer operations for receiving the service at inopportune moments and jump to the conclusion that the apparatus is defective because the service is not forthcoming.

Figure 14:
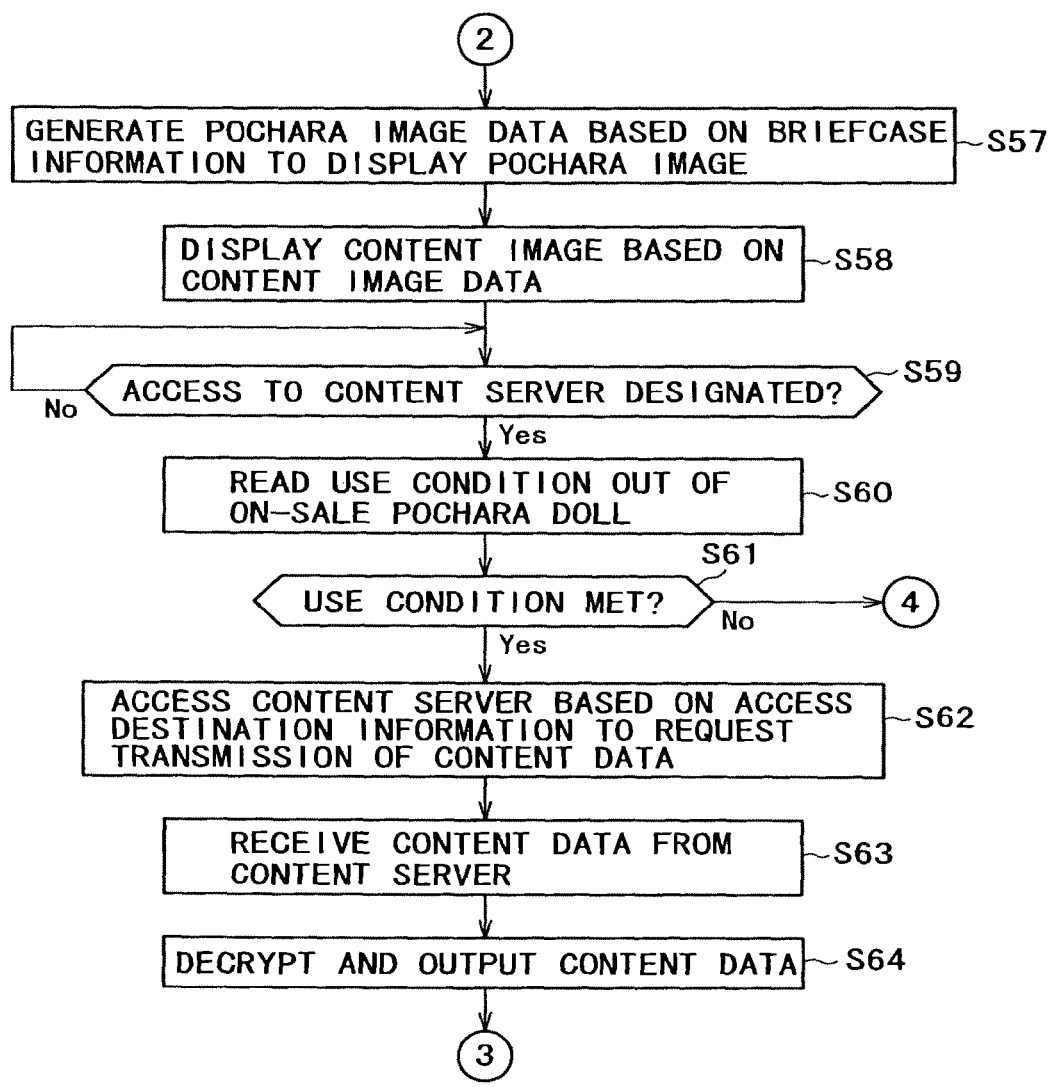
FIG. 14 is another flowchart of steps constituting part of the Pochara process performed by the personal computer in FIG. 1.

If what is placed on the stand 23 is not found to be the Pochara the Good Friend doll 161 (i.e., an On-sale Pochara doll 181 is mounted) back in step S48 of FIG. 12, then step S57 of FIG. 14 is reached. In step S57, the CPU 221 of the personal computer 22 generates Pochara image data based on that Pochara information about the On-sale Pochara which is included in the briefcase information received in step S46 earlier. Using the generated data, the CPU 221 displays an On-sale Pochara character (i.e., a virtual image of the On-sale Pochara doll 181) on the display device of the output unit 227. As shown in FIGS. 30 through 32, to be discussed later, the Pochara database 10 contains the Pochara information and content image data in conjunction with each On-sale Pochara. The applicable Pochara information and content image data are sent from the Pochara service server 9 as part of authentication information. An On-sale Pochara character also has approximately the same shape as the corresponding On-sale Pochara doll 181 (i.e., the character is shaped so as to let the user intuitively recognize it as a virtual equivalent of the On-sale Pochara doll 181).

In step S58, the CPU 221 extracts the content image data (content use information) from the briefcase information received in step S46, generates a content image based on the extracted content image data, and displays the generated image on the display device of the output unit 227. The process causes the output unit 227 to display a content image corresponding to the content related to the On-sale Pochara doll 181 purchased by the user. Illustratively, the content image includes an explanation of the related content such as a message, "If you want to download this song, please click on the ACCESS button."

When acquiring the content in question, the user clicks on an access button shown inside the displayed content image, by operating the mouse of the input unit 226 or other suitable equipment.

In step S59, the CPU 221 waits until access to the content server is designated (i.e., until the access button is clicked on). When access to the content server is found to be specified, step S60 is reached. In step S60, the CPU 221 reads a use condition (FIG. 11) from the IC chip 191. In step S61, the CPU 221 determines whether the retrieved use condition is complied with. The use condition illustratively includes a time limit on the use of content. The CPU 221 typically verifies whether the use condition is met by comparing the current time of its built-in timer with the use limit stipulated by the condition. If the use condition specifies a maximum usable count and/or a prepaid amount, a check is made to determine whether the value is zero.

If in step S61 the use condition is found to be complied with, e.g., if the time limit on content use has yet to be reached or if the maximum usable count and/or the prepaid amount is other than zero, then the CPU 221 goes to step S62. In step S62, the CPU 221 accesses the content server 6 based on access destination information held in the IC chip 191, to request transmission of content data. This generates illustratively a content data transmission request that is forwarded to the content server 6 shown in FIG. 1.

Given the request, the content server 6 transmits the content data over the Internet 1 (step S123 of FIG. 33, to be described later). In step S63, the CPU 221 of the personal computer 22 receives the content data sent by the content server 6 through the communication unit 229. The received content data are forwarded and written to the storage unit 228.

In step S64, the CPU 221 decrypts the content data that were received and stored in step S63 and outputs the decrypted data. The content data coming from the content server 6 are in encrypted form, so that the CPU 221 decrypts the received data using an encryption key included in the license information (FIG. 32) acquired from the Pochara service server 9. The CPU 221 outputs the decrypted content data through the output unit 227.

There is a possibility that encrypted content and an encryption key could be stolen for abuse when transmitted together over the Internet 1. That eventuality can be averted if a different encryption key is used every time encrypted content data are reproduced (or copied).

Figure 15:
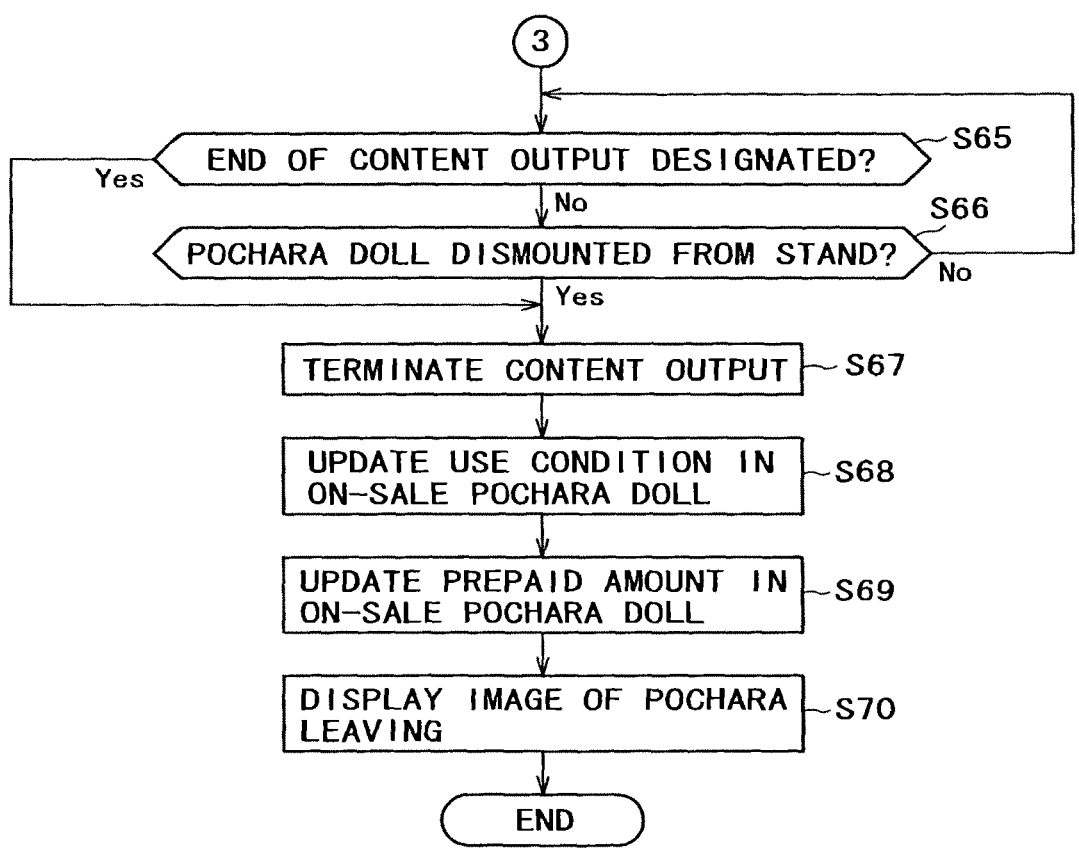
FIG. 15 is another flowchart of steps constituting part of the Pochara process performed by the personal computer in FIG. 1.

In step S65 of FIG. 15, the CPU 221 determines whether an end of content output is designated (i.e., whether an output end command is issued by the user) through the input unit 226. If the end of content output has yet to be designated, step S66 is reached. In step S66, the CPU 221 determines whether the On-sale Pochara doll 181 is dismounted from the stand 23. The determining process of step S66 is carried out in the same manner as in step S53 of FIG. 13.

If the On-sale Pochara doll 181 is not found to be dismounted from the stand 23 in step S66, step S65 is reached again. The subsequent steps are then repeated.

If in step S65 the end of content output is found designated, or if in step S66 the On-sale Pochara doll 181 is found dismounted from the stand 23, then the CPU 221 goes to step S67. In step S67, the CPU 221 terminates content output.

In step S68, the CPU 221 causes the reader/writer 241 to update the use condition held in the IC chip 191 of the On-sale Pochara doll 181. For example, if the use condition includes a maximum usable count (maximum reproducible count), that value is decremented by one. If the maximum usable count is, say, 20, the value is brought down to 19. When the value reaches zero, the content is no longer usable (not reproducible).

If the prepaid amount stored in the IC chip 191 of the On-sale Pochara doll 181 is arranged to be reduced every time the content is used, then the CPU 221 in step S69 decrements the amount by a predetermined value (i.e., equivalent to the payment for a single reproduction pass). Only either of steps S68 and S69 may be carried out where appropriate.

In step S70, as in step S56 of FIG. 13, the CPU 221 causes the display device of the output unit 227 to display the On-sale Pochara character leaving the screen. This allows the user intuitively to recognize the end of content output after dismounting the On-sale Pochara doll 181 from the stand 23 or following the issue of the content output end command.

Figure 16:
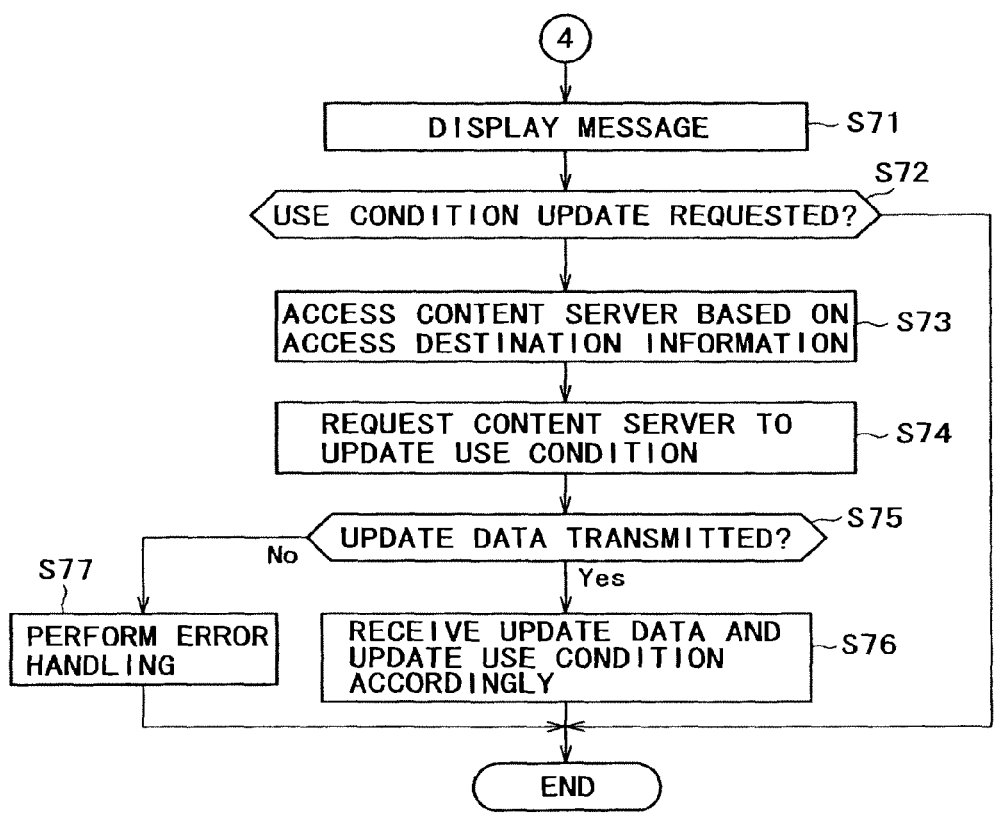
FIG. 16 is another flowchart of steps constituting part of the Pochara process performed by the personal computer in FIG. 1.

If in step S61 the use condition is not found to be complied with (i.e., if the time limit is exceeded, if the maximum usable count is exhausted, or if the prepaid amount has reached zero), then step S71 of FIG. 16 is reached. In step S71, the CPU 221 generates a message and displays it on the display device of the output unit 227. Illustratively, if the maximum reproducible count is exhausted, the output unit 227 displays a message saying, "The content has been reproduced N times. If you want to use the content more, you need to make a new payment." If the user wants to use the content further after viewing the message display, the user designates a use condition update by operating the input unit 226.

In step S72, the CPU 221 determines whether a use condition update request is made by the user. If the request is found to be made, step S73 is reached. In step S73, the CPU 221 accesses the content server 6 through the Internet 1 based on the access destination information (FIG. 18) included in the content information as part of the briefcase information. In step S74, the CPU 221 requests the content server 6 to update the maximum usable count and prepaid amount in the use condition. When informed by the Pochara service server 9 of the user's capability to settle the payment, the content server 6 transmits update data to the personal computer 22 in response to the latter's request (step S127 of FIG. 33).

In step S75, the CPU 221 determines whether the update data are sent from the content server 6. If the update data are found to be transmitted, step S76 is reached. In step S76, the CPU 221 receives the update data from the content server 6 and causes the reader/writer 241 to feed the received data to the IC chip 191 wherein the maximum usable count and prepaid amount are updated accordingly.

In the manner described, the user may request updates of the maximum usable count and prepaid amount as needed. Utilizing the On-sale Pochara doll 181 thus allows the user to make use of the content as many times as desired.

When the prepaid amount is updated, the Pochara service server 9 performs a billing process about the user in question (step S105 of FIG. 28) on the basis of the request from the content server 6 (step S125 of FIG. 33), as will be discussed later.

If in step S75 no update data are found to be sent, step S77 is reached. In step S77, the CPU 221 performs error handling.

Figure 33:
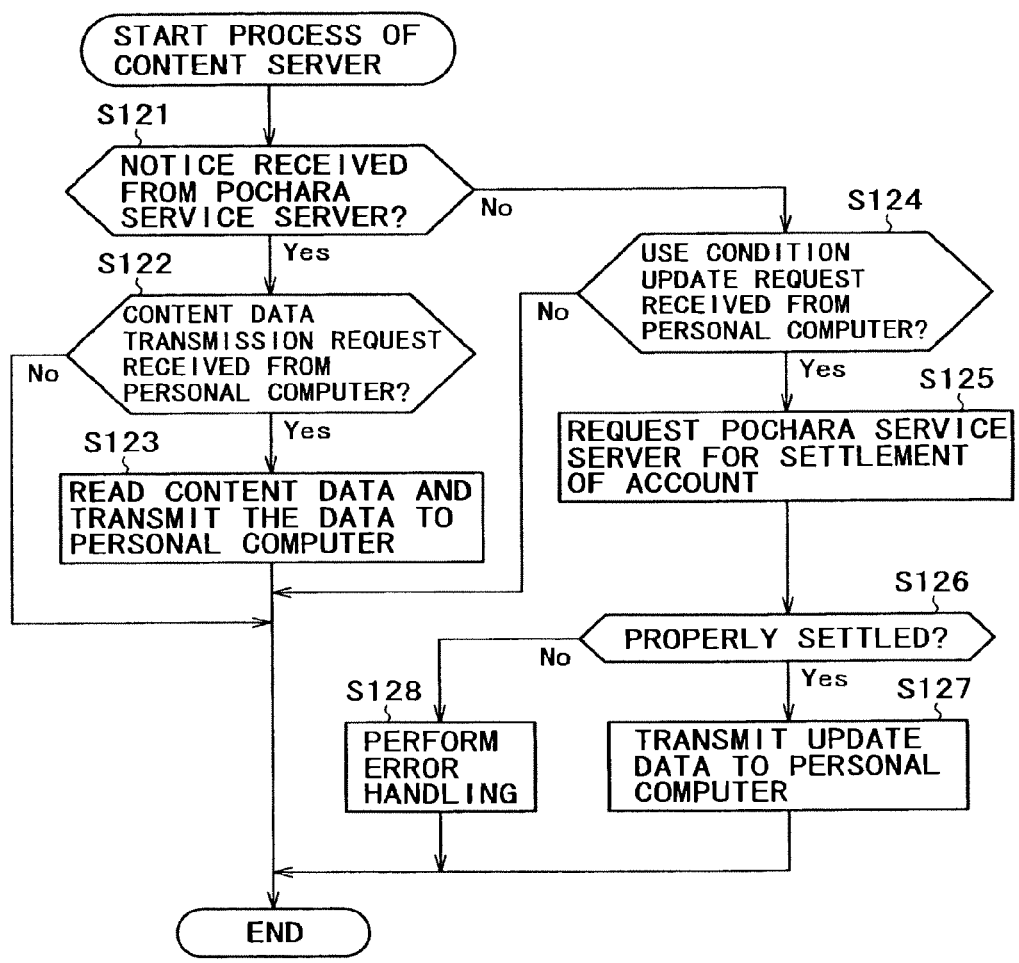
FIG. 33 is a flowchart of steps constituting a process performed by a content server shown in FIG. 1.

More specifically, if the user of the On-sale Pochara doll 181 is found by the Pochara service server 9 to be incapable of settling the prepaid amount typically because of an insufficient balance of his or her bank account, the content server 6 sends an error message to the personal computer 22 (step S118 of FIG. 33). In this case, the CPU performs error handling because no update data are received. Illustratively, the CPU 221 causes the display device of the output unit 227 to display a message saying, "The content cannot be used."

If in step S72 the user is not found to have made a request to update the use condition, steps S73 through S77 are skipped.

Alternatively, a credit card containing an IC chip may be placed on the stand so that the prepaid amount will be charged to the credit card.

Figure 29:
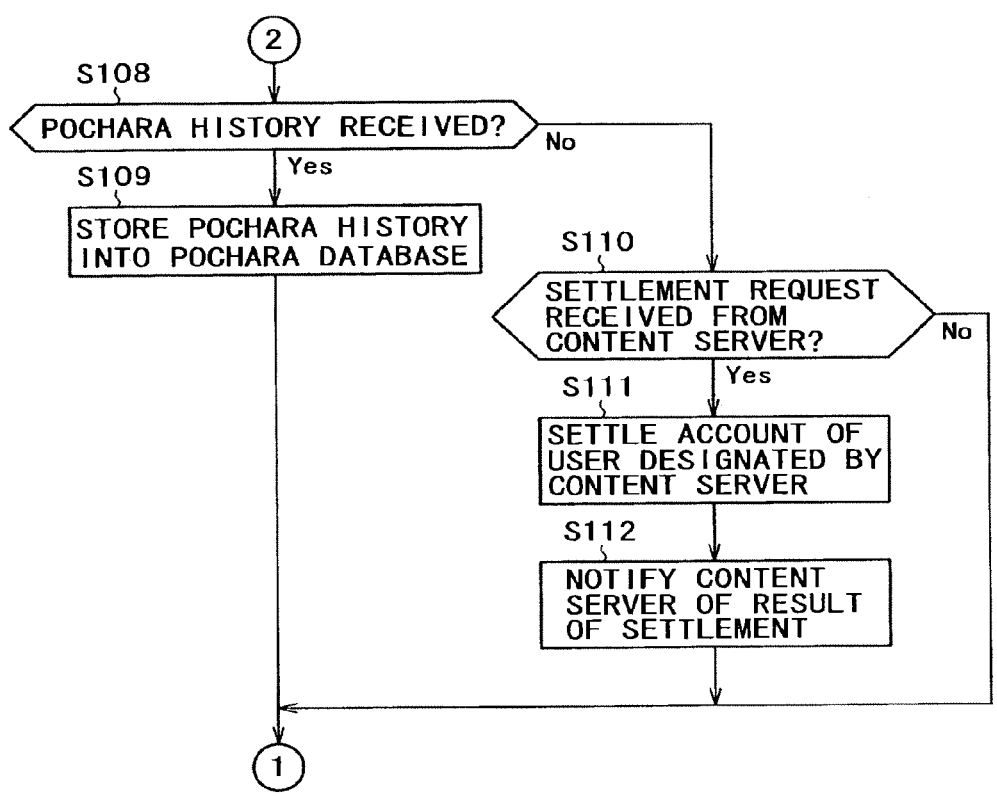
FIG. 29 is a flowchart of steps constituting part of the process performed by the Pochara service server in FIG. 1.

Described below with reference to the flowcharts of FIGS. 28 and 29 is the process performed by the Pochara service server 9 in conjunction with the process carried out by the personal computer 22 as described in the flowcharts of FIGS. 12 through 16 above.

In step S91 of FIG. 28, the CPU 191 of the Pochara service server 9 determines whether a Pochara ID is received from the personal computer 22. If no Pochara ID is found to be received, step S108 of FIG. 29 is reached. In step S108, the CPU 121 determines whether a Pochara history is received. If in step S108 no Pochara history is found to be received, step S110 is reached. In step S110, the CPU 121 determines whether a settlement request is received from the content server 6. If no settlement request is found to be received, step S91 is reached again and the subsequent steps are repeated.

If in step S91 the Pochara ID is found to be received, the CPU 121 goes to step S92. In step S92, the CPU 121 searches the Pochara database 10 for the Pochara ID received from the personal computer 22 (i.e., sent by the PC 22 in step S43 of FIG. 12).

Illustratively, the Pochara database 10 retains user information and Pochara information as shown in FIGS. 30 through 32. The user information (FIG. 30) includes each user's user ID, name, address, date of birth, gender, telephone number, fax number, e-mail address, date of user registration, credit card number, and bank account number.

The Pochara information is provided in two kinds: information about Pochara the Good Friends (FIG. 31) and information about On-sale Pocharas (FIG. 32).

The Pochara information about each Pochara the Good Friend includes the Pochara ID of the doll possessed by a user, that user's user ID, a Pochara the Good Friend flag indicating whether the Pochara in question is a Pochara the Good Friend or an On-sale Pochara, and character data necessary for displaying the doll character, in particular the parameters regarding the Pochara's costume.

The Pochara information further includes information about diverse functions possessed by each Pochara the Good Friend. In the example of FIG. 31, the Pochara information retains mail information, schedule information, preference information, job information, recommended information, and search information. The mail information comprises e-mail messages sent so far to the user in question as well as e-mail messages previously transmitted by that user.

The schedule information includes the user's present and past schedules as well as memos entered by the user. Also included in the schedule information is information about various events that may be implemented by the Pochara.

The preference information includes the URL's of websites to which the user has attached bookmarks.

The job information retains information about the services that may be received by the user following prior registration of the user's own terminal (hardware) with the system. The job information further includes data that are temporarily deposited by the user.

The recommended information includes contents recommended by the Pochara the Good Friend after analyzing the user's inferred thoughts.

The search information contains information about the On-sale Pochara for which searches were designated beforehand by search engines or by the user.

The Pochara information comprises the current location of the Pochara the Good Friend, i.e., the location where the character is actually displayed on an apparatus over the network. The storage of this information is intended to prevent each Pochara the Good Friend character from getting displayed simultaneously at two or more locations (i.e., the exclusivity of character display is ensured). In other words, any unscrupulous party is barred from stealing the legitimate user's information by having another Pochara the Good Friend doll impersonate the true user's Pochara the Good Friend doll 161. If the Pochara the Good Friend ID is found transmitted from any location other than the current location duly designated, the Pochara service server 9 performs error handling. As a result, each Pochara the Good Friend character is uniquely displayed at any given moment on a single apparatus over the network.

It is possible to prevent data inconsistencies resulting from simultaneous access to the Pochara service server 9 by two or more apparatuses. When a single Pochara character is transferred from one apparatus to another over time, its user is able to understand intuitively the exclusivity of the character-based access to the server.

The Pochara information also comprises information about content acquired by the user in question as well as information about a license for using the content. The content information includes a content ID for identifying the content in question, and access information necessary for gaining access to the applicable content. The license information contains a license ID for identifying the license, an encryption key used to decrypt the encrypted content, and the address of a license server to be accessed for acquisition of the license.

The Pochara information about On-sale Pocharas (FIG. 32) includes each On-sale Pochara's Pochara ID, Pochara the Good Friend flag, character information, content information, license information, and content use information.

In step S93, the CPU 121 determines whether the Pochara ID is found in the Pochara database 10 as a result of the search in step S92. If the Pochara ID is detected in the Pochara database 10, the CPU 121 goes to step S94 and checks to see whether the received Pochara ID is that of a Pochara the Good Friend. The check in step S94 is carried out on the basis of the Pochara the Good Friend flag as mentioned above.

If the Pochara ID is found to be a Pochara the Good Friend ID, step S95 is reached. In step S95, the CPU 121 reads the relevant Pochara information (FIG. 31) from the Pochara database 10.

In step S96, the CPU 121 determines whether the current location of the Pochara the Good Friend is inside the Pochara service server 9 on the basis of the current location of the Pochara the Good Friend found in the retrieved Pochara information. If the Pochara the Good Friend is found to be within the Pochara service server 9 at present, step S103 is reached. In step S103, the CPU 121 transmits error information to the personal computer 22.

What happened here is that the CPU 121 was accessed by a certain apparatus based on the Pochara the Good Friend doll 161 despite the fact that the Pochara the Good Friend is currently located inside the Pochara service server 9. It follows that there is a high possibility that the attempt to access was based on impersonation. In this case, error handling is carried out.

If in step S96 the current location of the Pochara the Good Friend is not found inside the Pochara service server 9, then step S97 is reached. In step S97, the CPU 121 reads the relevant briefcase information from the Pochara database 10. In step S98, the CPU 121 transmits the retrieved briefcase information to the personal computer 22.

In step S99, the CPU 121 determines whether Pochara arrival information has been received. As described above, the personal computer 22 sends Pochara arrival information upon receipt of the briefcase information (step S47 of FIG. 12). If the Pochara arrival signal is not found to be received in step S99 despite transmission of the briefcase information in step S98, that is apparently indicative of an irregular state taking place. In that case, the CPU 121 goes to step S103 and transmits error information to the personal computer 22.

If in step S99 the Pochara arrival signal is found received, then step S100 is reached. In step S100, the CPU 121 considers the current location of the Pochara the Good Friend to be in the personal computer 22 and updates the Pochara database 10 to reflect the location. Now that the Pochara the Good Friend has arrived at the personal computer 22, the current location of the Pochara the Good Friend is recorded as the personal computer 22.

As described, when the user of the personal computer 22 selects one of the functions possessed by the Pochara the Good Friend character 311, the information about the selected Pochara function is sent from the personal computer 22 (step S52 of FIG. 13).

In step S101, the CPU 121 of the Pochara service server 9 determines whether one of the functions of the Pochara the Good Friend character 311 has been selected. When one such function is found to be selected, step S102 is reached. In step S102, the CPU 121 carries out a process corresponding to the selected function. Illustratively, if the mail function is selected, information stored as the mail information is transmitted to the personal computer 22. If the schedule function is selected, the stored information about schedules is transmitted to the personal computer 22.

If in step S101 none of the Pochara functions is found selected, step S102 is skipped and step S91 is reached again. The subsequent steps are then repeated.

If in step S94 the acquired Pochara ID is not found to be that of the Pochara the Good Friend doll 161 (i.e., the ID is found to be that of an On-sale Pochara doll), then step S104 is reached. In step S104, the CPU 121 gives notice to a server corresponding to that On-sale Pochara doll (i.e. to the content server 6 if the ID is that of the On-sale Pochara doll 181). Upon receipt of the notice and of a content data transmission request from the personal computer 22, the content server 6 reads the applicable content data and transmits the retrieved data to the personal computer 22 (steps S121 through S123 of FIG. 33, to be described later).

The Pochara service server 9 performs administrative tasks regarding On-sale Pochara dolls associated with contents or services offered by various content providers or service providers. As shown in FIG. 32, the Pochara database 10 contains Pochara information necessary for displaying virtual On-sale Pochara doll characters corresponding to all On-sale Pochara dolls 181. The Pochara information includes each doll's Pochara ID, content image data (content use information) needed to display content images (e.g., if the content is made up of audio data about a singer's song, then the images may comprise a song title, lyrics, and the singer's image) attached to the content identified by each content ID, and content information. The content information includes an access destination (i.e., a network address) to be notified of a user's access when that user has sent his or her On-sale Pochara ID. The CPU 121 gives notice to that access destination in the event of access.

In step S105, the CPU 121 performs a billing process. That is, every time the user mounts the On-sale Pochara doll 181 on the stand 23 to receive a specific service from the system, the user is expected to make a payment for the service.

More specifically, the CPU 121 of the Pochara service server 9 accesses the billing server 13 through the communication unit 129 to request that a payment be charged to the user's credit card number or bank account number. In accordance with the request, the billing server 13 bills the user for the amount of the payment.

In this manner, the administrator of the Pochara service server 9 makes a profit every time a user makes use of his or her On-sale Pochara doll 181.

Alternatively, the billing process may be carried out not on users but on administrators who sold On-sale Pochara dolls 181.

In step S106, the CPU 121 reads the briefcase information (FIG. 18) about the On-sale Pochara in question from the Pochara database 10. In step S107, the CPU 121 transmits the retrieved briefcase information to the personal computer 22.

Following step S107, control is returned to step S91. The subsequent steps are then repeated.

For example, if the On-sale Pochara doll is arranged to offer fortune-telling content and if the amount of data constituting the content is fairly small, the briefcase information in FIG. 18 may include fortune-telling content data. When the Pochara character is called up on display, the content data may be displayed simultaneously alongside the character image.

If in step S108 a Pochara history is found to be received, the CPU 121 goes to step S109. In step S109, the CPU 121 stores the Pochara history into the Pochara database 10 (i.e., updates the database). Control is then returned to step S91 and the subsequent steps are repeated.

In the manner described, if the Pochara history is sent from the personal computer 22 illustratively in step S55 of FIG. 13, the Pochara database 10 is updated to reflect the received history.

If in step S110 a settlement request is found to be received (i.e., process in step S125 of FIG. 33, to be discussed later) from the content server 6, the CPU 121 goes to step S111. In step S111, the CPU 121 settles the account of the user as requested by the content server 6. More specifically, the CPU 121 checks the Pochara database 10 to determine whether the applicable user information (FIG. 30) contains any records of the user in question having been incapable of settling payments with his or her credit card number or bank account number in the past. In step S112, the CPU 121 notifies the content server 6 of the results of the check (i.e., results of past settlements). Control is then returned to step S91 and the subsequent steps are repeated.

Described below with reference to the flowchart of FIG. 33 is the process performed by the content server 6 when the user mounts the On-sale Pochara doll 181 on the stand 23 to receive the relevant service.

In step S121, the CPU 121 of the content server 6 determines whether it has received notice (sent in step S104 of FIG. 28) through the communication unit 129 from the Pochara service server 9 saying that the server 9 was accessed by the personal computer 22. If the notice is not found to be received from the Pochara service server 9, step S124 is reached. In step S124, the CPU 121 determines whether a prepaid amount (or maximum usable count) update request (step S74 of FIG. 16) is received from the personal computer 22. If the prepaid amount (or maximum usable count) update request is not found to be received, the CPU 121 terminates the process.

If in step S121 the notice is found received from the Pochara service server 9, the CPU 121 goes to step S122. In step S122, the CPU 121 determines whether a content data transmission request (step S62 of FIG. 14) is received from the personal computer 22 described in the notice. If the content data transmission request is found received from the personal computer 22, the CPU 121 goes to step S123. In step S123, the CPU 123 reads encrypted content data from the storage unit 128 and sends the retrieved data to the personal computer 22 through the communication unit 129.

The content data may be kept in encrypted form beforehand in the storage unit 128. Alternatively, unencrypted content data may be encrypted every time they are retrieved from storage and transmitted.

The notice acquired from the Pochara service server 9 in step S121 should include information for specifying content data. That information may be a content ID. If the items of content data correspond to the On-sale Pochara dolls 181 on a one-to-one basis, the information in the notice may be a Pochara ID.

If in step S122 the content data transmission request is not found received from the personal computer 22, then step S123 is skipped. That is, following receipt of the notice from the Pochara service server 9, the user of the personal computer 22 described in the notice may ultimately fail to request transmission of the content data. In such a case, the content data will not be transmitted.

If in step S124 the prepaid amount (or maximum usable count) update request is found to be received from the personal computer 22, the CPU 121 goes to step S125. In step S125, the CPU 121 requests the Pochara service server 9 to settle the payment involved. Given the request, the Pochara service server 9 performs a settling process regarding the user who is making use of the On-sale Pochara doll 181, and notifies the content server 6 of the result of the settlement (steps S111 and S112 of FIG. 29 described above).

In step S126, the CPU 121 of the content server 6 checks the notice from the Pochara service server 9 to determine whether the settlement has been successful. If the settlement is found successful, step S127 is reached. In step S127, the CPU 121 transmits to the personal computer 22 update data for updating the prepaid amount (or maximum usable count). As discussed above, the personal computer 22 updates the prepaid amount (or maximum usable count) in the IC chip 191 of the On-sale Pochara doll 181 (step S76 of FIG. 16) in accordance with the update data. This allows the user to use the content again.

If in step S126 the notice from the Pochara service server 9 indicates that the settlement was unsuccessful, then step S128 is reached. In step S128, the CPU 121 performs error handling. More specifically, the CPU 121 outputs to the personal computer 22 a message saying that the content cannot be made available to the PC 22. The message informs the user that the prepaid amount (or maximum usable count) could not be updated. The message is displayed by the personal computer 22 in step S76 of FIG. 16.

What follows is a description of how the user mounts the Pochara the Good Friend doll 161 on the stand 23 to acquire content from the content server 7, before acquiring from the license server 8 a license necessary for using the content in question. This process is executed as one which corresponds to the function selected in step S52 of FIG. 13. That is, the process is started upon selection by the user of a content acquisition function, one of the functions possessed by the Pochara the Good Friend doll character 311.

In step S131, the CPU 221 of the personal computer 22 accesses the content server 7 to request content transmission. The address of the destination to be accessed is looked up by the user as needed.

As will be discussed later, the content server 7 transmits to the accessing personal computer 22 the requested content data together with a content ID and a license ID (step S142 of FIG. 35, to be described below). In step S132, the CPU 221 of the personal computer 22 receives the content data sent by the content server 7 over the Internet 1. In step S133, the CPU 221 stores the received content data into the storage unit 228.

In step S134, the CPU 221 transmits to the Pochara service server 9 the content ID for identifying the acquired content, access information for accessing the stored content data (i.e., information necessary for reading the content data from the storage unit 228), and a network address (transmitted from the content server 7 as an attachment to the content data) of the license server (license server 8 in the system of FIG. 1) which issues a license for the acquired content.

Figure 35:
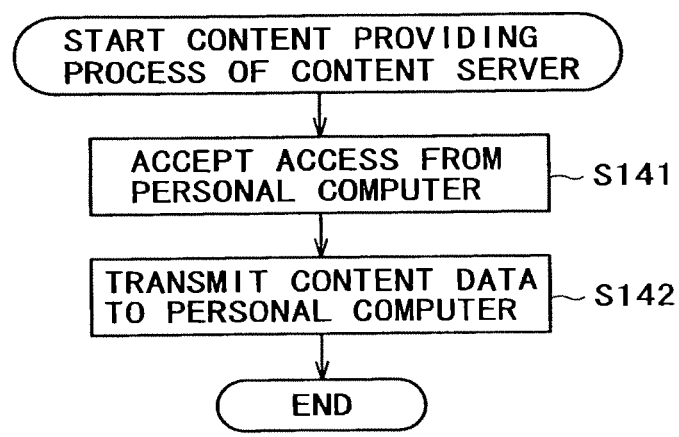
FIG. 35 is a flowchart of steps constituting a content providing process performed by the content server in FIG. 1.

In conjunction with the accessing process performed by the personal computer 22, the content server 7 carries out the process in the flowchart of FIG. 35.

In step S141, the CPU 121 of the content server 7 accepts access by the personal computer 22. In step S142, the CPU 121 reads the relevant content data from the storage unit 128 and transmits the retrieved data to the personal computer 22. At this point, the CPU 121 also transmits the content ID and the license ID for identifying the license needed to use the content, simultaneously with the content data. The content data are sent in encrypted form.

Figure 34:
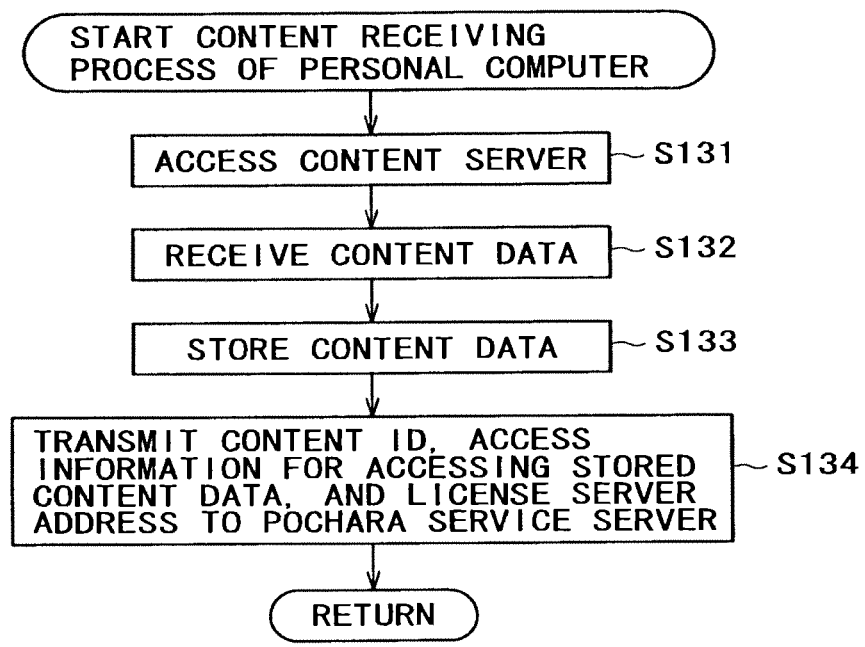
FIG. 34 is a flowchart of steps constituting a content receiving process performed by the personal computer in FIG. 1.
Figure 36:
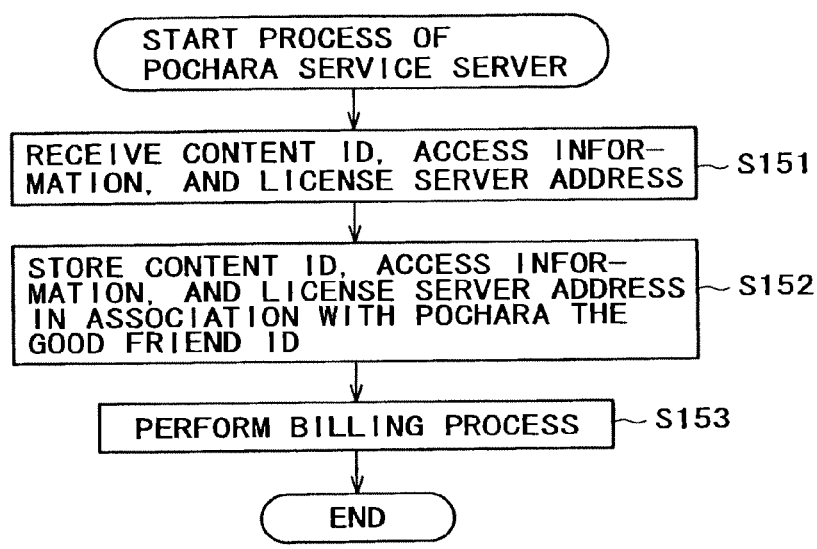
FIG. 36 is a flowchart of steps constituting another process performed by the Pochara service server in FIG. 1.

In conjunction with the process performed by the personal computer 22 in step S134 of FIG. 34, the Pochara service server 9 executes the process in the flowchart of FIG. 36.

First in step S151, the CPU 121 of the Pochara service server 9 receives the content ID, access information, and license server address sent by the personal computer 22 in step S134. In step S152, the CPU 121 stores into the Pochara database 10 the content ID, access information, and license server address received in step S151, in correspondence with the Pochara the Good Friend ID transmitted simultaneously.

In step S153, the CPU 121 performs a billing process with regard to the user having acquired the content. More specifically, the CPU 121 requests the billing server 13 to settle the amount of the payment for the content in question. Based on the request, the billing server 13 carries out a billing process regarding the user.

The billing process performed at the time of content provision may be omitted if the user is billed upon receipt of a license. When the user is charged not for content but for the license for using the content, the user might want to receive the content and store it into any desired terminal a plurality of times without worrying about the payment. This arrangement promotes efficient distribution of content data.

Where content data are stored in advance in apparatuses in which the user might want to reproduce the data, the user can utilize high-quality content in any apparatus even if the capacity of the line connected to the apparatus is relatively low.

Merely acquiring content data does not enable the user to make use of the content. To use the obtained content requires gaining a license necessary for using the content in question. In order to acquire such a license, the personal computer 22 carries out the process in the flowchart of FIG. 37. This process is also executed as one which corresponds to the function selected in step S52 of FIG. 13.

In step S171, the CPU 221 of the personal computer 22 accesses the Pochara service server 9. In step S172, the CPU 221 requests the Pochara service server 9 to acquire the license corresponding to the content ID. This content ID is included in the content data received in step S132 of FIG. 34.

Given the license acquisition request, the Pochara service server 9 accesses the license server to acquire the relevant license, as will be discussed later. After acquiring the license, the Pochara service server 9 notifies the personal computer 22 of acquisition of the license (steps S194 and S195 of FIG. 38, to be described below).

In step S173, the CPU 221 receives a license acquisition notice from the Pochara service server 9. The CPU 221 outputs the result of the notice to the display device of the output unit 227 for display. The display informs the user that the desired license has been obtained.

Figure 37:
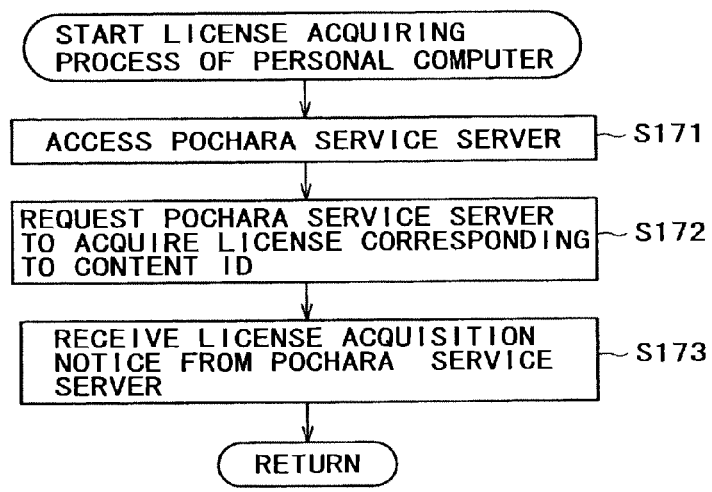
FIG. 37 is a flowchart of steps constituting a license acquiring process performed by the personal computer in FIG. 1.
Figure 38:
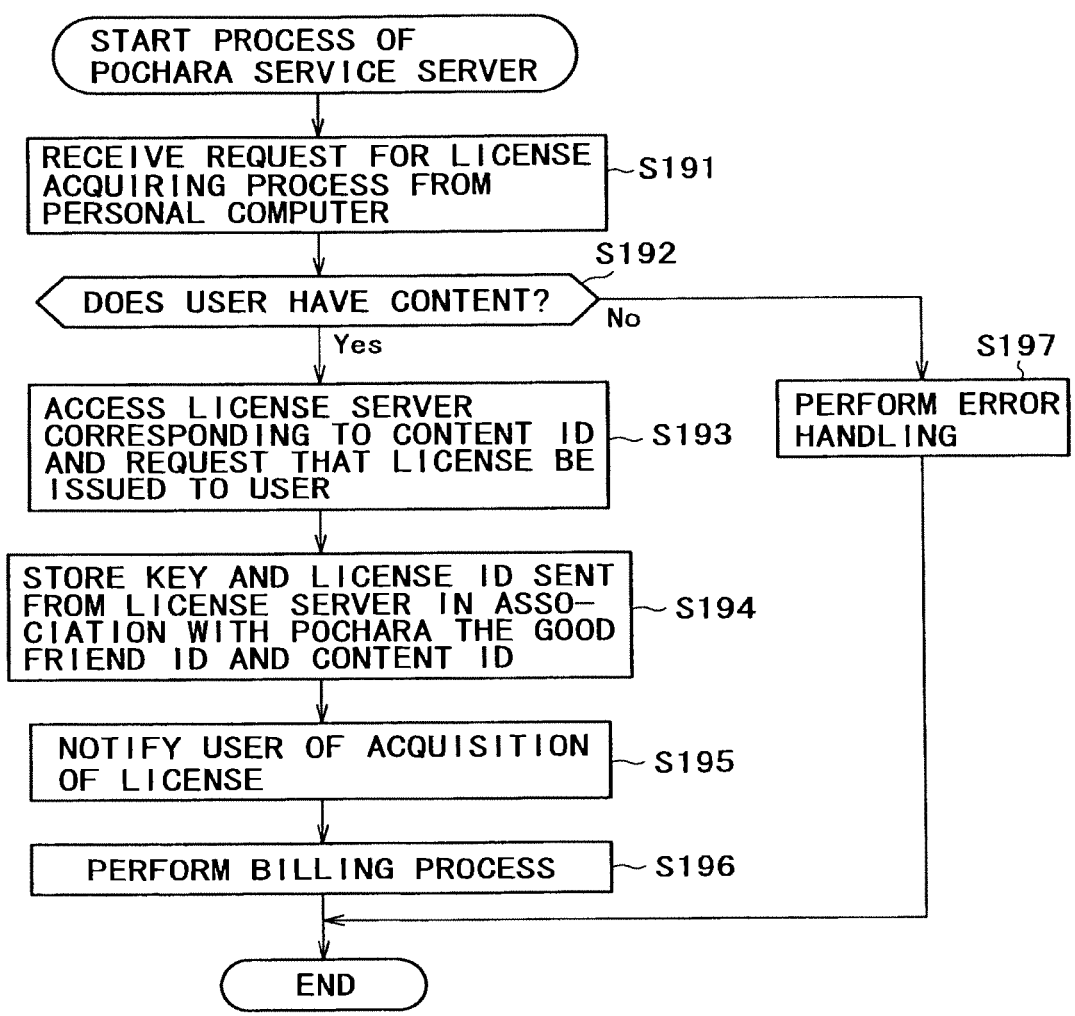
FIG. 38 is a flowchart of steps constituting another process performed by the Pochara service server in FIG. 1.

Described below with reference to the flowchart of FIG. 38 is the process performed by the Pochara service server 9 in conjunction with the license acquiring process carried out by the personal computer 22 as outlined in FIG. 37.

In step S191, the CPU 121 of the Pochara service server 9 receives a license acquisition request (i.e., request made in step S172 of FIG. 37) from the personal computer 22. In step S192, the CPU 121 determines whether the user has the relevant content. Where the user has already acquired the content, the Pochara database 10 should contain the access information for accessing the content in question (step S152 of FIG. 36). Based on that access information, the CPU 121 determines whether the user is in possession of the content.

If in step S192 the user is found to have acquired the content, step s193 is reached. In step S193, the CPU 121 accesses the license server corresponding to the content ID to request the issue of the applicable license to the user. Where the user acquired the content in step S152 of FIG. 36, the Pochara database 10 should have the address of the content server from which the content was obtained, as well as the address of the license server that will issue the license necessary for using the content.

When requested to issue the license by the Pochara service server 9, the license server 8 issues the license and sends it to the Pochara service server 9 (step S212 of FIG. 39, to be described later).

In step S194, the CPU 121 stores into the Pochara database 10 an encryption key (i.e., key for decrypting the encrypted content) and a license ID sent from the license server 8, in correspondence with the Pochara the Good Friend ID and content ID.

In step S195, the CPU 121 notifies the user (i.e., personal computer 22) that the license is acquired.

In step S196, the CPU 121 performs a billing process in connection with the license acquiring process. Specifically, the CPU 121 requests the billing server 13 to settle the payment for the license. Given the request, the billing server 13 carries out its billing process.

If in step S192 the user is not found in possession of the content, step S197 is reached and error handling is carried out. In this case, the user does not have the content and is thus in no need to acquire the license. This triggers the error handling. More specifically, the CPU 121 transmits an error message to the personal computer 22. The personal computer 22, in step S173, receives the error message instead of a license acquisition notice.

When accessed by the Pochara service server 9, the license server 8 carries out the process in the flowchart of FIG. 39.

In step S211, the CPU 121 of the license server 8 determines whether a license issuance request is received from the Pochara service server 9. If the license issuance request is found to be received, step S212 is reached. In step S212, the CPU 121 reads from the storage unit 128 the license corresponding to the content ID included in the request (i.e., an encryption key and a license ID for decrypting the encrypted content) and transmits the retrieved license to the Pochara service server 9.

If in step S211 the license issuance request is not found to be received from the Pochara service server 9, step S212 is skipped.

When the user has acquired the content and the corresponding license in the manner described above, the user is able to use (i.e., reproduce) the content. The content reproducing process will now be described with reference to the flowchart of FIG. 40.

This process, too, is executed as one which corresponds to the function selected in step S52 of FIG. 13 when the user has mounted the Pochara the Good Friend doll 161 on the stand 23.

In step S231, the CPU 211 of the personal computer 22 accesses the Pochara service server 9. In step S232, the CPU 221 designates a content ID to the Pochara service server 9 to request reproduction of the relevant content. In response to the request, with the user having previously acquired the content and its license, the Pochara service server 9 accesses the destination where the content data are retained, in order to acquire the data. In this case, the content data are kept in the personal computer 22, so that the Pochara service server 9 requests the personal computer 22 to transmit the content data (step S27 of FIG. 41, to be described later). Upon receipt of the request in step S233, the CPU 221 reads the content data from the designated access destination and sends the retrieved content data to the Pochara service server 9.

Using the encryption key, the Pochara service server 9 decrypts the encrypted content data and sends back the decrypted content data (steps S275 and S276 of FIG. 41, to be discussed later).

In step S234, the CPU 221 receives the content data from the Pochara service server 9. The received content data are already decrypted as mentioned above. Thus there is no need for the personal computer 22 to retain any encryption key or to perform a decrypting process based on that encryption key. This makes it possible for portable apparatuses such as mobile phones and PDA's (personal digital assistants), which are incapable of handling complex processes because of their priority on being portable, to reproduce desired content easily.

In step S235, the CPU 211 causes the display device and speakers of the output unit 227 to output the content received in step S234. The user is then able to enjoy the reproduced content.

In step S236, the CPU 221 decrements the prepaid amount. This process is performed on the IC chip 171 of the Pochara the Good Friend doll 161 in the same manner as on the IC chip 191 of the On-sale Pochara doll 181 as discussed above.

If the IC chip 171 does not contain any prepaid amount, step S236 is skipped.

In step S237, the CPU 221 transmits to the Pochara service server 9 a history containing the prepaid amount and reproducible count minus their reductions. The Pochara service server 9 updates the Pochara database 10 on the basis of the received history (step S109 of FIG. 29 described above).

Figure 40:
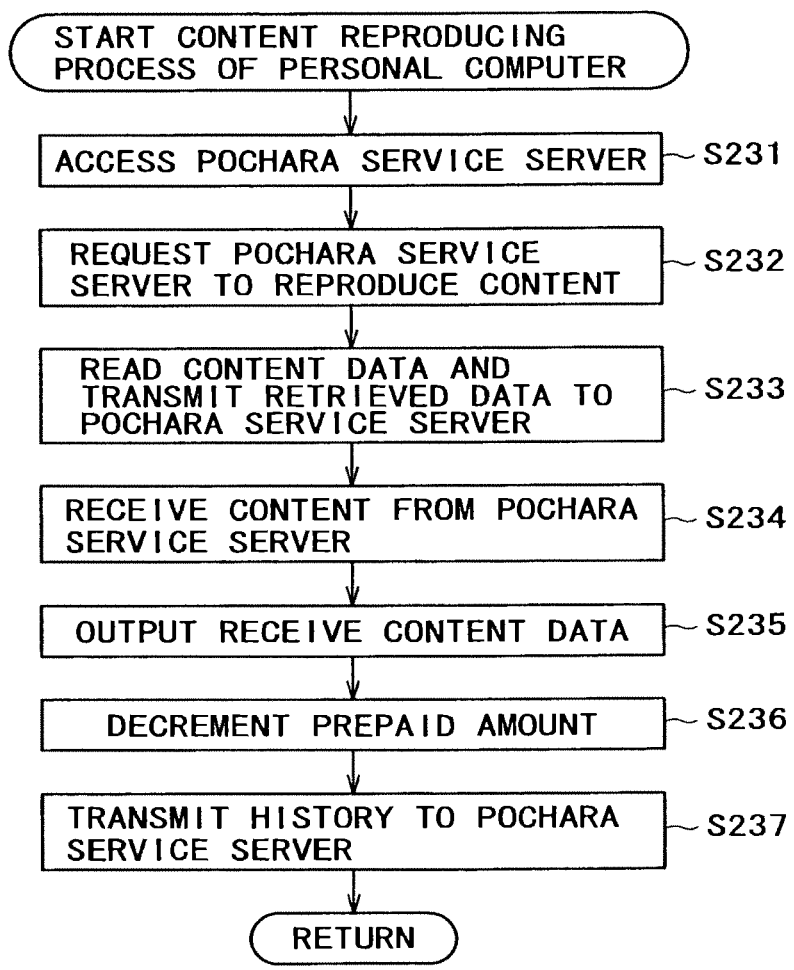
FIG. 40 is a flowchart of steps constituting a content reproducing process performed by the personal computer in FIG. 1.
Figure 41:
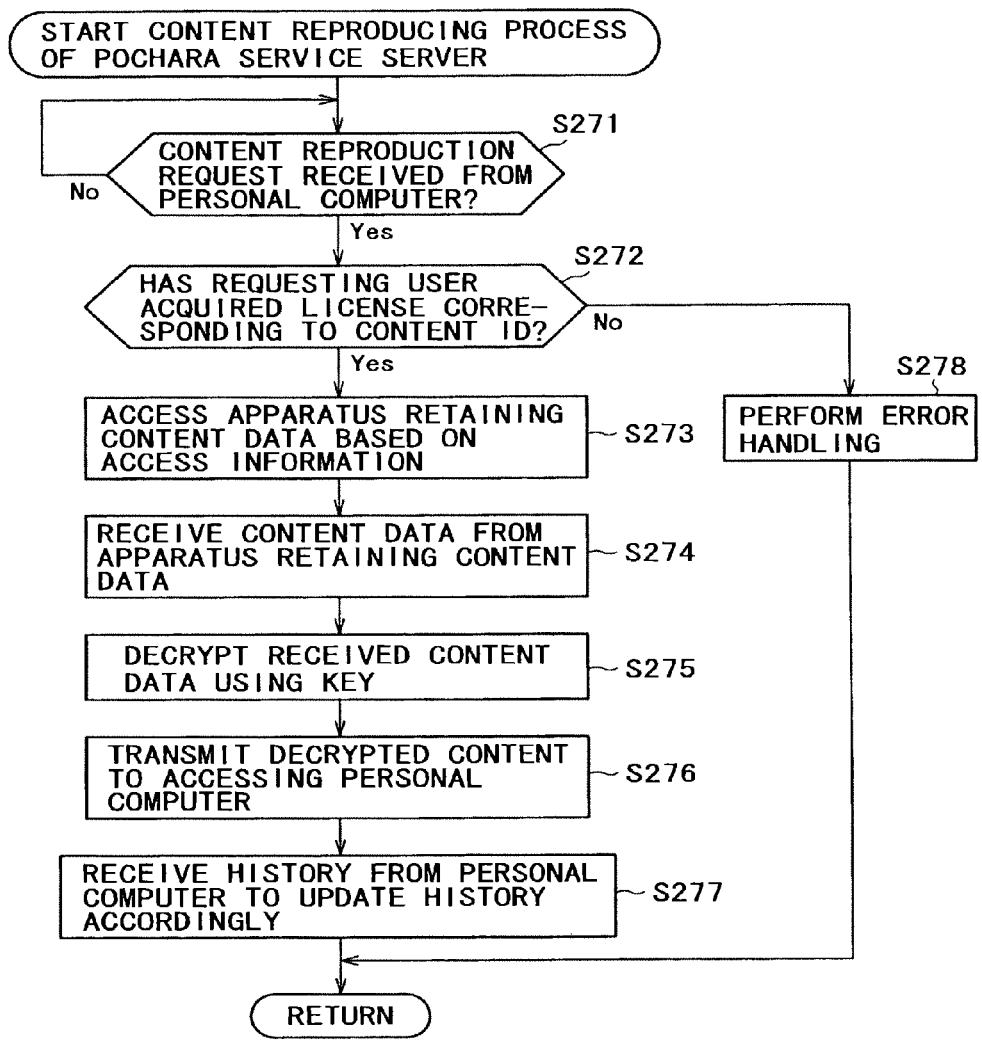
FIG. 41 is a flowchart of steps constituting a content reproducing process performed by the Pochara service server in FIG. 1.

In conjunction with the process in the flowchart of FIG. 40 performed by the personal computer 22, the Pochara service server 9 executes the process in the flowchart of FIG. 41 as a process corresponding to the Pochara function selected in step S102 of FIG. 28.

In step S271, the CPU 121 of the Pochara service server 9 waits until a content reproduction request (including a content ID) is received from the personal computer 22. Upon receipt of the request, the CPU 121 goes to step S272 and checks to determine whether the requesting user has already acquired a license corresponding to the content ID. The check is made by verifying whether the Pochara database 10 contains the license ID corresponding to the content ID included in the request sent from the personal computer 22. Obviously, it is assumed that at least one of the Pochara ID and user ID was transmitted from the personal computer 22 in step S43 of FIG. 12 and that the transmitted ID was received by the Pochara service server 9 in step S91 of FIG. 28.

Where the user is found in possession of the license corresponding to the content ID, step S273 is reached. In step S273, the CPU 121 gains access to the source that retains the relevant content data on the basis of access information. As discussed above with reference to FIG. 34, after acquiring the content data by use of the Pochara the Good Friend and after recording the obtained content data to an internal storage unit, the apparatus in question (i.e., personal computer 22 in this case) transmits to the Pochara service server 9 the access information for accessing the content data (step S134 of FIG. 34). In turn, the Pochara service server 9 records the access information to the Pochara database 10 (step S152 of FIG. 36). The access information allows the CPU 121 to acquire the content data. More specifically, the CPU 121 accesses the personal computer 22 to request that the content data be read from the storage unit 228.

Given the request, the personal computer 22 reads the content data from the location designated by the Pochara service server 9 (i.e., storage unit 228 designated by access destination information), and transmits the retrieved content data (step S233 of FIG. 40). In step S274, the CPU 121 receives the content data from the apparatus where they were stored. In this case, the CPU 121 receives the content data from the personal computer 22 (naturally, if the content data are stored in an apparatus other than the accessing personal computer 22, the CPU 121 accesses that apparatus to receive the content data therefrom).

In step S275, the CPU 121 decrypts the content data coming from the personal computer 22 using the encryption key. The encryption key was acquired as part of the license necessary for reproducing the content in question, and is kept in the Pochara database 10 (step S194 of FIG. 38).

In step S276, the CPU 121 transmits the content decrypted in step S275 to the accessing personal computer 22 (i.e., apparatus where the Pochara the Good Friend character 311 is currently located). As mentioned above, the content data are received by the personal computer 22 and output therefrom (steps S234 and S235 of FIG. 40).

Where encryption keys are kept in the Pochara service server 9, there is little possibility that they will leak out and be stolen. With no encryption key abused by unscrupulous parties to decrypt the encrypted content, the security of the system is enhanced.

Thereafter, the personal computer 22 transmits history information at the end of content reproduction (step S237 of FIG. 40). In step S278, the CPU 128 receives the history from the personal computer 22 and updates the information in the Pochara database 10 to reflect the received history. The history includes the number of times the content has been reproduced and a decremented prepaid amount.

If in step S272 the requesting user is not found to have acquired the license corresponding to the content ID, the CPU 121 goes to step S278 and performs error handling (i.e., transmits an error message to the personal computer 22). The personal computer 22, in step S234, receives the error message instead of the content and outputs the received message to the output unit 227 for display.

In the foregoing description, the Pochara service server 9 was shown decrypting the encrypted content data. Alternatively, the Pochara service server 9 may transmit a key to the personal computer 22 to let the latter decrypt the content data.

As described, the Pochara the Good Friend acting as the user's agent allows the user to download encrypted content data from the content server as desired. The Pochara the Good Friend further allows the user to copy the encrypted content at his or her discretion. Whenever content data are copied, the location where the data are copied is recorded to the Pochara database 10. When reproduction of content data is designated, the Pochara the Good Friend checks the Pochara database 10 for the location where the content data are stored so as to let the user obtain the desired content. The user may preview the content data, copy them to another apparatus, or reproduce them in streaming fashion. It should be noted that reproduction of content data always requires the intervention of the Pochara the Good Friend.

Where content data are encrypted using a different key every time they are copied or reproduced, potential abuse of the data is minimized even if the key is stolen at a certain point in time. This helps enhance the security of the system significantly.

Instead of mounting the Pochara the Good Friend doll 161 on the stand, the user may manually input a user ID and a password to log in to the Pochara service server 9. This, however, might lead an unscrupulous third party to steal the user ID and password to impersonate the legitimate user and access the Pochara service server 9 fraudulently. In such a case, if the legitimate user (i.e., the user in possession of the Pochara the Good Friend doll 161) has already logged in to the Pochara service server 9 from a certain apparatus on the network using the Pochara doll 161, any other impersonating user who logged in fraudulently thereafter is presented with only a silhouette of the Pochara doll character by the Pochara service server 9. The silhouette display informs the impersonating user that the Pochara the Good Friend character is being used by another apparatus and that access to the Pochara service server 9 is exclusive in nature.

Consequently, reproduction of content data by use of the Pochara the Good Friend is limited to a single apparatus on the network at any given point in time. The legitimate user is thus able to protect the copyrights of content data without becoming aware of DRM (Digital Right Management).

Suppose now that a prepaid amount (or maximum usable count) is stored in the IC chip 171 of the Pochara the Good Friend doll 161 and that the prepaid amount (or maximum usable count) is decremented every time the content in question is reproduced. That means once the prepaid amount (or maximum usable count) has reached zero, the user can no longer reproduce (i.e., use) the content. In that case, the user can make an additional payment to renew the prepaid amount thereby reproducing the content again. How the prepaid amount is renewed will now be described with reference to the flowcharts of FIGS. 42 and 43.

Figure 42:
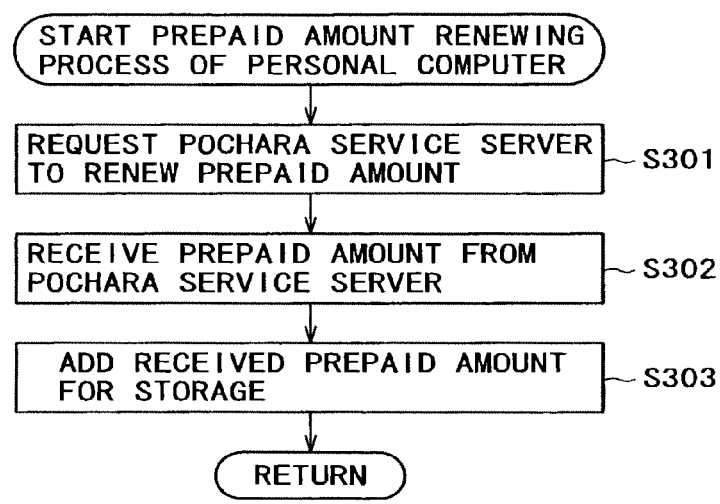
FIG. 42 is a flowchart of steps constituting a prepaid amount renewing process performed by the personal computer in FIG. 1.

The process in the flowchart of FIG. 42 is carried out as a process corresponding to the function selected in step S52 of FIG. 13 when the user mounts the Pochara the Good Friend doll 161 on the stand 23.

In step S301, the CPU 221 of the personal computer 22 requests the Pochara service server 9 to renew the prepaid amount (or maximum usable count). Given the request, the Pochara service server 9 performs a billing process with regard to the prepaid amount (or maximum usable count), and transmits the resulting prepaid amount (or maximum usable count) to the personal computer 22 (steps S322 through S326 of FIG. 43, to be discussed later). In step S302, the CPU 221 receives the prepaid amount (or maximum usable count) from the Pochara service server 9. In step S303, the CPU 221 adds the received prepaid amount (or maximum usable count) to the prepaid amount (or maximum usable count) held in the IC chip 171 through the reader/writer 241.

In the manner described, the user can reproduce the content again as permitted by the renewed prepaid amount (or maximum usable count).

Figure 43:
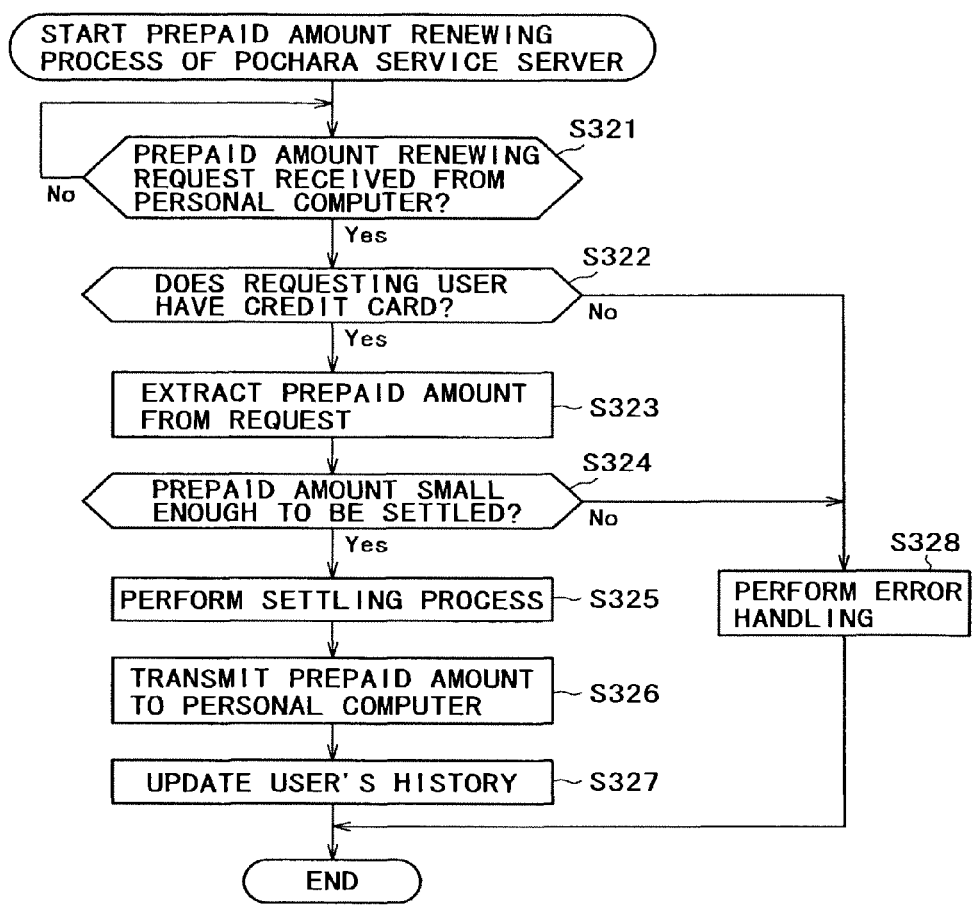
FIG. 43 is a flowchart of steps constituting a prepaid amount renewing process performed by the Pochara service server in FIG. 1.

In conjunction with the process in the flowchart of FIG. 42 performed by the personal computer 22, the Pochara service server 9 carries out the process in the flowchart of FIG. 43. The process of FIG. 43 is executed as a process corresponding to the Pochara function selected in step S102 of FIG. 28.

In step S321, the CPU 121 of the Pochara service server 9 waits until a prepaid amount (or maximum usable count) renewal request is received from the personal computer 22. Upon receipt of the request, the CPU 121 goes to step S322. In step S322, the CPU 121 checks to determine whether the requesting user (i.e., the user corresponding to the Pochara the Good Friend character 311) has a credit card. This check is made on the basis of the user information stored in the Pochara database 10.

If the user is found to have the credit card, step S323 is reached. In step S323, the CPU 121 extracts a prepaid amount (or maximum usable count) from the user's request. In step S325, the CPU 121 determines whether the prepaid amount (or maximum usable count) extracted in step S323 is small enough to be settled with the credit card. If the amount is in excess of a predetermined credit limit, the CPU 121 determines that the amount is unpayable.

If the prepaid amount is found to be payable, step S325 is reached. In step S325, the CPU 121 settles the payment of the amount. Specifically, the CPU 121 requests the billing server 13 to perform a billing process with regard to the prepaid amount. In response to the request, the billing server 13 charges the prepaid amount to the user's credit card number.

The billing process is not limited to charging the amount to the credit card; it can also be done by charging the amount to the user's bank account.

In step S326, the CPU 121 transmits the prepaid amount (or maximum usable count) to the personal computer 22. As described above, the personal computer 22 updates the prepaid amount in the IC chip 171 of the Pochara the Good Friend doll 161 (step S303 of FIG. 42) in accordance with the received prepaid amount (or maximum usable count).

In step S327, the CPU 121 updates the user's history. More specifically, the CPU 121 records the prepaid amount (or maximum usable count) due the user to the Pochara database 10.

If in step S322 the user is not found to have a credit card, or if in step S324 the prepaid amount is found unpayable, then step S328 is reached. In step S328, the CPU 128 performs error handling. Specifically, the CPU 121 sends to the personal computer 22 a message saying that the prepaid amount cannot be updated.

In step S302 of FIG. 42, the personal computer 22 receives the error message instead of the prepaid amount. The received message is displayed on the display device of the output unit 227. The message display informs the user that update of the prepaid amount is denied.

Alternatively, the prepaid amount may be raised (i.e. updated) with regard to the amount stored in the IC chip 191 of the On-sale Pochara doll 181.

If the prepaid amount in the IC chip 191 of the On-sale Pochara doll 181 is to be updated, it is possible for the user to make the necessary payment through the Pochara the Good Friend. Integrating all billing processes into a single Pochara the Good Friend in such a manner is convenient for the user.

In the case above, the user illustratively places the On-sale Pochara doll 161 on the stand 23 to access the Pochara service server 9. After displaying a menu, the Pochara service server 9 prompts the user to select, say, a "Make a payment (buy a coupon) using an On-sale Pochara doll" item from the menu. When the selection is made by the user, the Pochara service server 9 causes the personal computer 22 to display a message such as, "Place a paying Pochara doll on the stand." In response to the message, the user removes the currently mounted Pochara the Good Friend doll 161 from the stand and mounts the On-sale Pochara doll 181 in its place. At this time, the Pochara service server 9 maintains access (i.e., connection) to the currently linked apparatus.

The Pochara service server 9 (or content server 6) updates the prepaid amount in the IC chip 191 of the On-sale Pochara doll 181. Thereafter, the service server 9 causes the personal computer 22 to display a message such as, "Place the Pochara the Good Friend doll on the stand." When the user mounts the Pochara the Good Friend doll 161 on the stand 23 in response to the message, the Pochara service server 9 performs a billing process on the Pochara the Good Friend doll 161 in a manner corresponding to the update of the prepaid amount in the IC chip 191 of the On-sale Pochara doll 181.

Suppose now that content could not be reproduced using the On-sale Pochara doll 181, that the Pochara service server 9 thus caused the personal computer 22 to display a message such as, "Will you make a payment (buy a coupon)?" and that the user has operated on an "OK" button in response. In such a case, the Pochara service server 9 further causes the personal computer 22 to display another message prompting the user to substitute the Pochara the Good Friend doll 161 for the On-sale Pochara doll 181. When the Pochara the Good Friend doll 161 is mounted on the stand 23 in place of the On-sale Pochara doll 181, the Pochara service server 9 performs the billing process. Then another message is displayed, prompting the user to replace the Pochara the Good Friend doll 161 with the On-sale Pochara doll 181 on the stand 23. Viewing the message, the user mounts the On-sale Pochara doll 181 on the stand 23. At this point, the prepaid amount is updated and the content becomes reproducible again.

Figure 44:
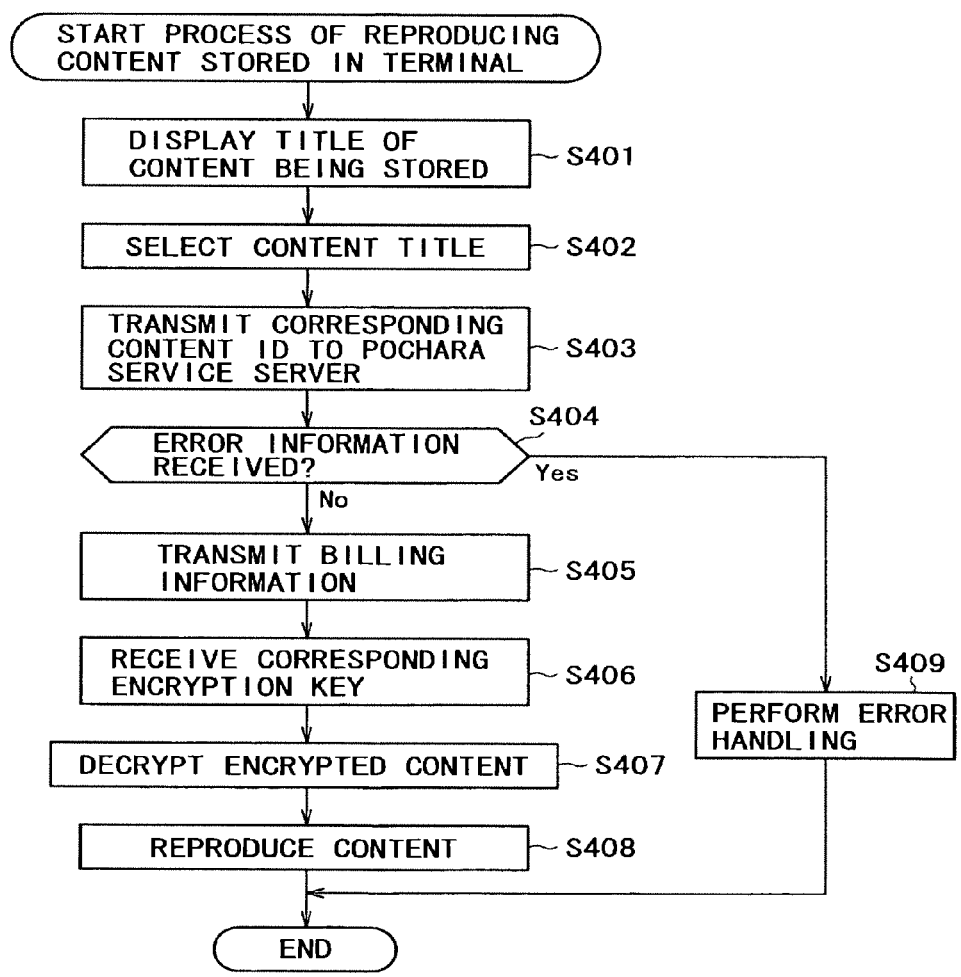
FIG. 44 is a flowchart of steps constituting the process of reproducing content stored in a terminal.

Described below with reference to the flowchart of FIG. 44 is another typical process carried out when content data kept in a given terminal are to be reproduced on that terminal by use of the Pochara the Good Friend. It is assumed that the content data are already stored in the storage unit 228 of the personal computer 22 acting as the terminal, the storing process having been executed illustratively according to the above-discussed flowchart of FIG. 34.

In step S401, the CPU 221 of the personal computer 22 causes the display device of the output unit 227 to display the titles (i.e., names) of the content data held in the PC. The user designates desired content to be reproduced from among the displayed titles by operating the input unit 226. In step S402, the CPU 221 selects the user-designated content in keeping with the input from the input unit 226.

In step S403, the CPU 221 causes the communication unit 229 to transmit the content ID of the content selected in step S402 to the Pochara service server 9. As will be discussed later with reference to FIG. 45, the Pochara service server 9 sends back error information (step S425) or an encryption key (step S424) in association with the content ID.

In step S404, the CPU 221 determines whether error information is received. If the error information is found to be received, the CPU 221 goes to step S409 and carries out error handling.

If no error information is found received, step S405 is reached. In step S405, the CPU 221 acquires billing information necessary for a billing process on the basis of the input by the user, and transmits the billing information to the Pochara service server 9.

In step S406, the CPU 221 receives the encryption key (sent in step S424) from the Pochara service server 9. In step S407, the CPU 221 decrypts the content (in encrypted form) selected in step S402, using the encryption key received in step S406. In step S408, the CPU 221 causes the output unit 227 to output the content decrypted in step S407.

Figure 45:
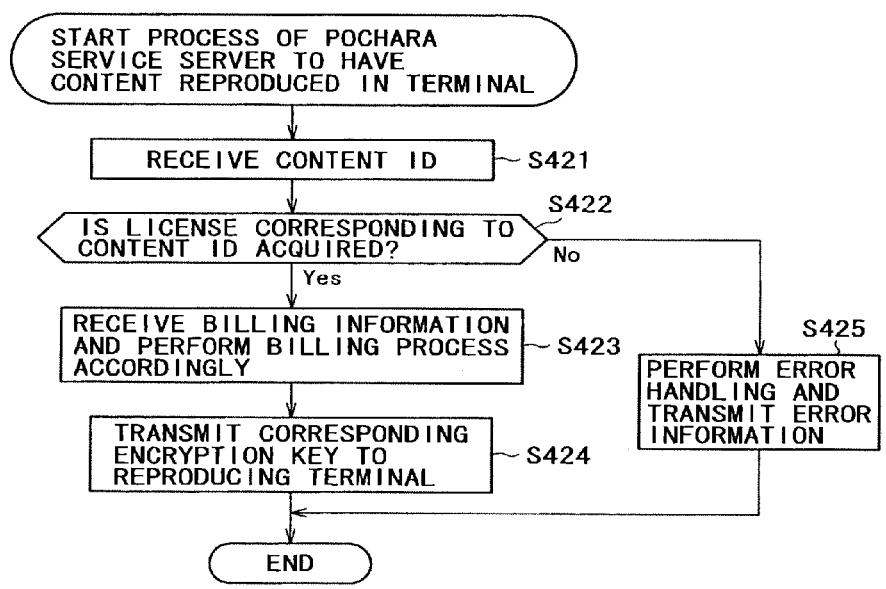
FIG. 45 is a flowchart of steps constituting a process performed by the Pochara service server when content stored in a terminal is reproduced.

In conjunction with the process above in FIG. 44, the Pochara service server 9 carries out the process in the flowchart of FIG. 45. In step S421, the CPU 121 of Pochara service server 9 receives the content ID (sent in step S403) from the personal computer 22. In step S422, the CPU 121 determines whether the user has acquired the license corresponding to the content ID received in step S421. As discussed above with reference to FIG. 31, the stored Pochara information includes a content ID as part of content information and a license ID as part of license information about each of the registered Pochara the Good Friends. The CPU 121 determines whether the received content ID has a corresponding license ID stored on the basis of the Pochara information shown in FIG. 31.

If in step S422 the user is found to have acquired the license corresponding to the content ID, step S423 is reached. In step S423, the CPU 121 performs a billing process upon receipt of the billing information sent by the personal computer 22 in step S405. In step S424, the CPU 121 reads an encryption key corresponding to the license ID and transmits the retrieved key to the reproducing terminal (i.e., personal computer 22 in this case). The encryption key is received by the personal computer 22 in step S406 as described above.

If in step S422 the user is not found to have acquired the license corresponding to the content ID, the CPU 121 goes to step S425 and performs error handling. The CPU 121 transmits error information to the personal computer 22.

Figure 46:
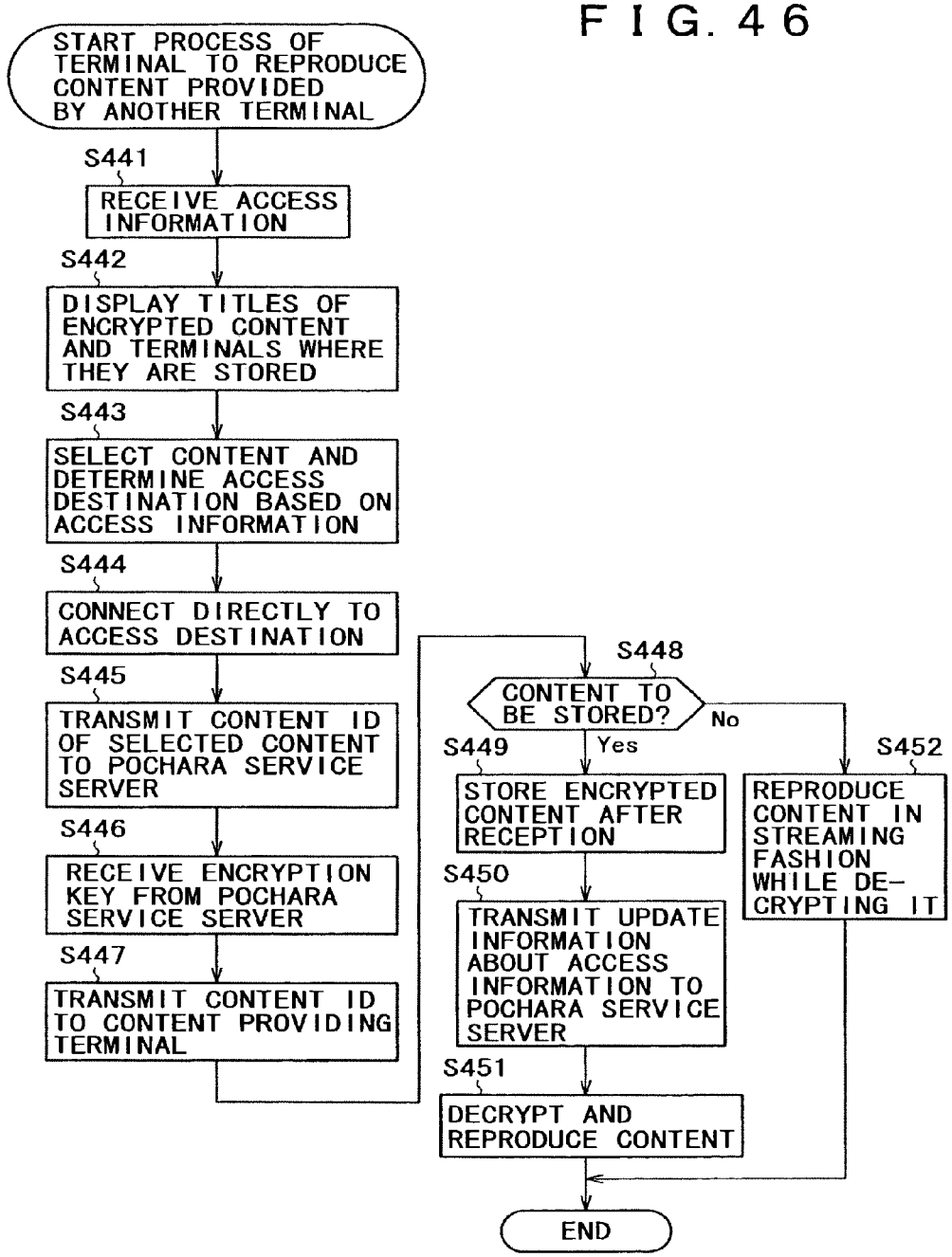
FIG. 46 is a flowchart of steps constituting a process performed by a terminal to reproduce content provided by another terminal.

Described below with reference to the flowchart of FIG. 46 is the process performed by a terminal as it reproduces content data that are not retained therein. It is assumed here that content data are stored in the personal computer 26 and that the content data are to be reproduced by the personal computer 22.

In step S441, the CPU 221 of the personal computer 22 accesses the Pochara service server 9 to receive access information about the content data stored in the Pochara database 10. As described above, the Pochara database 10 retains access information denoting the destinations to be accessed for content data (i.e., the destinations are actually apparatuses that hold the content). The CPU 221 receives such access information from the Pochara service server 9.

In step S442, the CPU 221 causes the output unit 227 to display a list of encrypted content data and of terminals that hold the content data, on the basis of the received access information. The user selects desired content among the displayed content data by operating the input unit 226. In step S443, the CPU 221 selects the content based on the input from the input unit 226 and determines the destination to be accessed on the basis of the access information about the selected content.

In step S444, the CPU 221 causes the communication unit 229 directly to connect with the access destination determined in step S443. In this case, the CPU 221 of the personal computer 22 gains access to the personal computer 26 that holds the content in question.

In step S445, the CPU 221 transmits to the Pochara service server 9 the content ID of the content determined (i.e., selected) in step S443. The Pochara service server 9 sends back an encryption key corresponding to the content ID (step S493 of FIG. 48, to be discussed later).

In step S446, the CPU 221 receives the encryption key from the Pochara service server 9. In step S447, the CPU 221 transmits the content ID to the content-providing terminal (personal computer 26 in this case).

In step S448, the CPU 221 checks to determine whether or not the user retains the content. The check is made on the basis of the user's input.

If the user decides to retain the content, step S449 is reached. In step S449, the CPU 221 receives the encrypted content from the personal computer 26, and stores the received content into the storage unit 228.

In step S450, the CPU 221 transmits update information about the access information to the Pochara service server 9. That is, now that the content has been transferred from the personal computer 26 to the personal computer 22, the new destination at which to access the content in question (i.e., the terminal holding the content is currently the personal computer 22) is signaled to the Pochara service server 9.

In step S451, the CPU 221 decrypts the encrypted content placed in the storage unit 228 by use of the encryption key received in step S446, and reproduces the decrypted content. The reproduced content is output by the output unit 227.

If in step S448 the user decides not to retain the content, step S452 is reached. In step S452, the CPU 221 decrypts the content using the encryption key while causing the output unit 227 to reproduce the decrypted content in streaming fashion.

Figure 47:
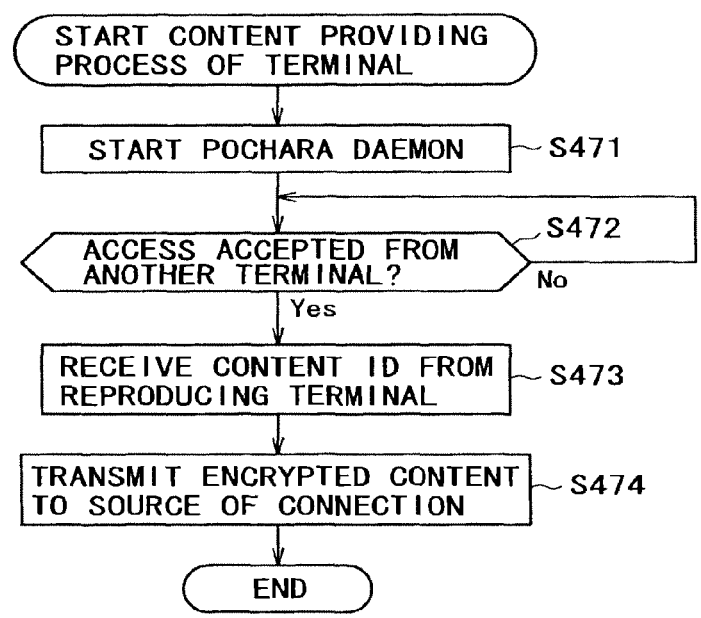
FIG. 47 is a flowchart of steps constituting a content providing process performed by a terminal.

In conjunction with the process executed by the personal computer 22 as shown in the flowchart of FIG. 46, the content-providing personal computer 26 carries out the process in the flowchart of FIG. 47 with regard to the personal computer 22.

First in step S471, the CPU 221 of the personal computer 26 activates a Pochara daemon. In step S472, the Pochara daemon waits until it is accessed by another terminal. If the daemon finds itself accessed by another terminal (i.e., by the personal computer 22 in this case), step S473 is reached. In step S473, a content ID is received from the reproducing terminal. In this example, the content ID sent by the personal computer 22 in step S447 is received. In step S474, the CPU 221 of the personal computer 26 transmits encrypted content to the source of connection. In this case, the encrypted content is transmitted to the personal computer 22.

As described above, the encrypted content is either stored in the personal computer 22 in step S449, or decrypted while being reproduced in streaming fashion in step S452.

Figure 48:
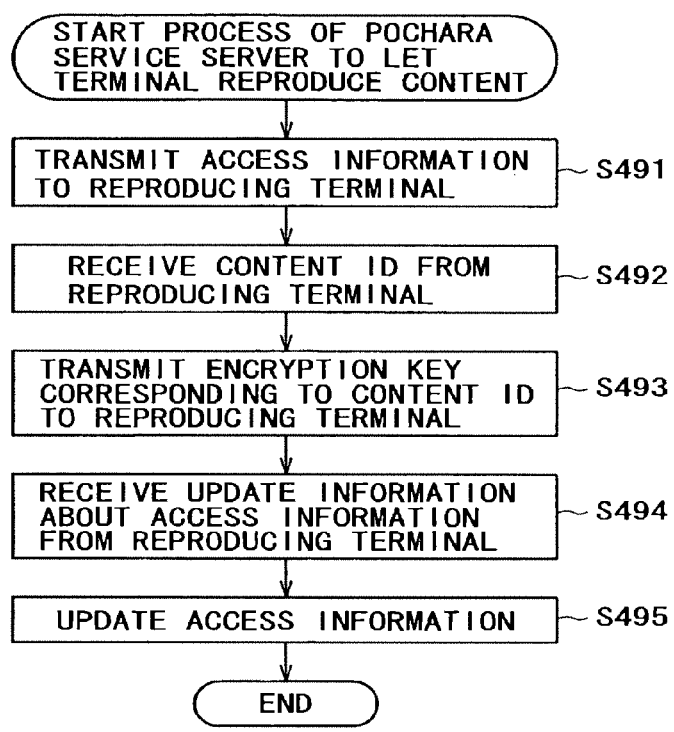
FIG. 48 is a flowchart of steps constituting a process performed by the Pochara service server when content is reproduced by a terminal.

In connection with the process executed by the personal computer 22 as shown in FIG. 46, the Pochara service server 9 performs the process shown in FIG. 48. In step S491, the CPU 121 of the Pochara service server 9 transmits access information to a reproducing terminal. More specifically, the CPU 121 reads the access information from the Pochara database 10 and sends the retrieved information to the personal computer 22. The personal computer 22 receives the access information in step S441 as discussed above.

In step S492, the CPU 121 of the Pochara service server 9 receives a content ID from the reproducing terminal (i.e., personal computer 22 in this case). This content ID was sent by the personal computer 22 in step S445 of FIG. 46.

In step S493, the CPU 121 receives update information about the access information from the reproducing terminal. This update information was transmitted by the personal computer 22 in step S450 of FIG. 46.

In step S495, the CPU 121 writes the access information received in step S494 to the Pochara database 10 (i.e., updates the database). Now that the content has been transferred from one terminal to another, the personal computer 22 is set to replace in the database 10 the personal computer 26 as the destination at which to access the content in question.

Figure 49:
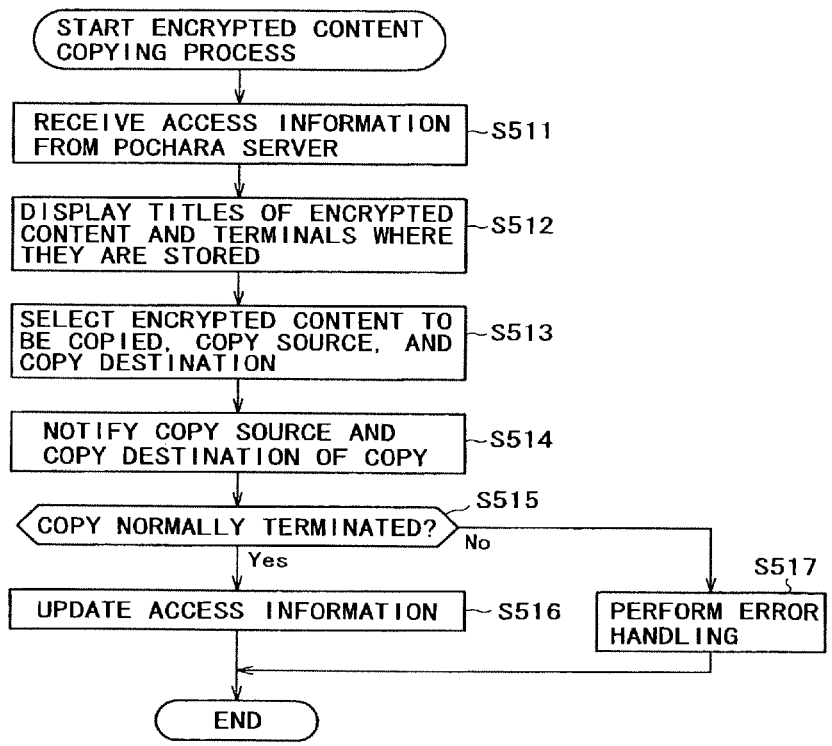
FIG. 49 is a flowchart of steps constituting an encrypted content copying process.

Described below with reference to the flowchart of FIG. 49 is the process carried out when encrypted content is copied from one apparatus to another. For example, it is assumed that content data held in the personal computer 26 are to be copied to a personal computer 52.

In step S511, the CPU 221 of the personal computer 22 receives access information from the Pochara service server 9. In step S512, the CPU 221 causes the output unit 227 to display a list of encrypted content data and of terminals that hold the content data, on the basis of the access information received in step S511.

When viewing the displayed list, the user selects a copy source and a copy destination by operating the input unit 226. In step S513, the CPU 221 selects the encrypted content to be copied based on the input from the input unit 226, and selects the personal computer 26 as the copy source and the personal computer 52 as the copy destination. In step S514, the CPU 221 notifies the copy source and copy destination of the upcoming copy. In this example, the personal computer 26 serving as the copy source and the personal computer 52 as the copy destination are notified of the copy to be made.

Figure 50:
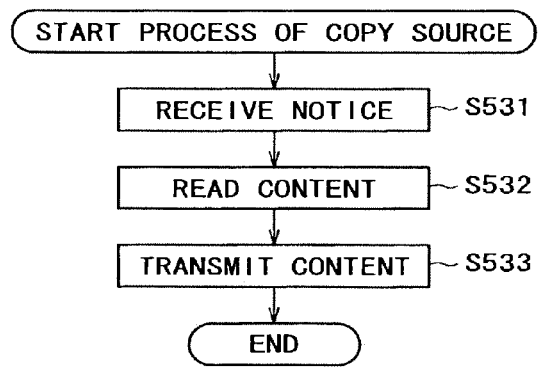
FIG. 50 is a flowchart of steps constituting a process performed by a copy source.

On the basis of the notice, the content in question is transferred from the copy source to the copy destination in a manner to be described later with reference to the flowcharts of FIGS. 50 and 51.

In step S515, the CPU 221 of the personal computer 22 determines whether the copy has normally ended in accordance with a notice coming from the copy source or copy destination. If the copy is found normally terminated, the CPU 221 goes to step S516 and updates the access information. Specifically, now that the content in question is being stored in the two terminals, both the personal computer 26 and the personal computer 52 are recorded as access destinations for the content.

If in step S515 the copy is not found to be normally terminated, the CPU 221 goes to steps S517. In step S517, the CPU 221 performs error handling.

The process carried out by the copy source will now be described with reference to the flowchart of FIG. 50. In this example, the process is performed by the personal computer 26.

In step S531, the CPU 221 of the personal computer 26 receives the copy notice (i.e., copy request) issued by the personal computer 22 in step S514. In step S532, the CPU 221 of the personal computer 26 reads the relevant content from the storage unit 228. In step S533, the CPU 221 causes the communication unit 229 to transmit the retrieved content to the personal computer 52. When the transmission has normally ended, the CPU 221 notifies the personal computer 22 thereof.

Figure 51:
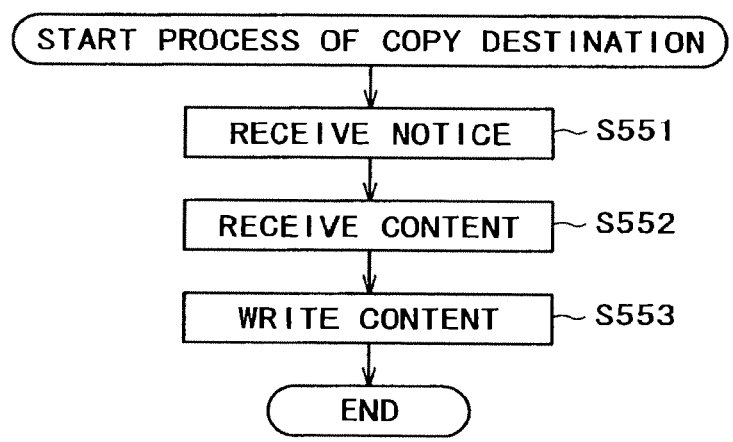
FIG. 51 is a flowchart of steps constituting a process performed by a copy destination.

Shown in FIG. 51 is the process performed by the copy destination in conjunction with the process executed by the copy source. In this example, the process of FIG. 51 is carried out by the personal computer 52.

In step S551, the personal computer 52 receives the copy notice (i.e., copy request) issued by the personal computer 22 in step S514. In step S552, the CPU 221 of the personal computer 52 receives the content transmitted by the personal computer 26 acting as the copy source in step S33. In step S563, the CPU 221 of the personal computer 52 writes to the storage unit 228 the content received in step S552. When reception of the content has normally ended, the CPU 221 notifies the personal computer 22 thereof.

In the foregoing description, the user was shown having various processes executed by mounting the Pochara the Good Friend doll 161 or On-sale Pochara doll 181 on the stand 23 connected to the personal computer 22 in the room 31. Alternatively, the user may place the Pochara doll on a stand connected to any apparatus desired to be used. For example, if the Pochara the Good Friend character 311 has an additional function of controlling a TV set, the user may place the Pochara the Good Friend doll 161 on the stand 25 connected to the TV set 24. This allows the TV set 24 to be controlled through the Pochara doll.

It is also possible for the user to utilize in the room 33 the content recorded to the personal computer 22 by placing the Pochara the Good Friend doll 161 on the stand 23. In this case, the user mounts the Pochara the Good Friend doll 161 on the stand 27 connected to the personal computer 26 in the room 33. At this point, the Pochara service server 9 accessed by the personal computer 26 reads the content data recorded in the personal computer 22, decrypts the retrieved content data, and sends the decrypted data to the personal computer 26. In this manner, the user is able to use the content at any preferred location (i.e., by placing the Pochara the Good Friend doll 161 on the stand connected to the desired apparatus).

Illustratively, the user may carry the Pochara the Good Friend doll 161 to the workplace 5 and place the doll 161 on the stand 53 connected to the personal computer 52 installed there. This causes the personal computer 52 to connect to the Internet 1 through the LAN 51 and ISP 4 and from the Internet 1 to the Pochara service server 9. Thus the user at the workplace 5 can check e-mail messages sent to the user's home. Obviously, it is also possible for the user to send e-mail from the workplace 5.

As described, the user may carry the Pochara the Good Friend doll 161 around and place it on the stand connected to a desired apparatus. This allows the user to receive through any apparatus those services offered by the Pochara the Good Friend acting as the user's agent. One such apparatus may be the mobile phone 61 shown in FIG. 1.

The mobile phone 61 is not connected to a stand but equipped with a built-in reader/writer. The user positions the Pochara the Good Friend doll 161 close to the mobile phone (i.e., brings the doll into contact with the phone) to access the Pochara service server 9.

Because the mobile phone 61 is not provided with a stand, the Pochara the Good Friend doll 161 cannot be mounted continuously on such an arrangement. Instead, once the Pochara service server 9 is accessed (i.e., logged in) by the Pochara the Good Friend doll 161 positioned close to the mobile phone 61, the connection with the server 9 is maintained after the Pochara doll 161 is detached from the phone 61.

When logging out, the user first causes a menu to appear on the phone display by operating buttons on the mobile phone 61. The user then selects a "Log-out" item from the menu to issue a log-out command. This executes a log-out process.

As with the Pochara the Good Friend doll 161, the On-sale Pochara doll 181, if used, is also placed close to (i.e., brought into contact with) the mobile phone 61 for access to the server. The connection with the server is also maintained until the user designates log-out in the menu.

The CPU incorporated in the mobile phone 61 generally provides lower performance than its counterpart in personal computers. This requires the phone to adopt an appreciably simpler format in which to display the Pochara the Good Friend or On-sale Pochara character in terms of resolution, number of colors used, number of polygons, and number of frames than the formats used by PC's.

Pochara data may be expressed in XML-based data. It is also possible to display the Pochara character using Java (registered trademark). Another option is to employ what is known as i-mode.

Where it is desired to carry the Pochara the Good Friend doll 161 around together with the mobile phone 61, portability may be compromised if the doll is too bulky. That eventuality can be circumvented by reducing the Pochara the Good Friend doll 161 to a key size for attachment to a key holder. The key holder holding the key-size Pochara the Good Friend doll may be hung from a strap fastened to the mobile phone 61.

It is technically feasible to make the IC chip small enough to fit into the miniature Pochara the Good Friend doll. This allows the doll to be hung from the strap of the mobile phone 61.

In addition to the mobile phone, such diverse apparatuses as PDAs, digital still cameras, camcorders, video tape recorders, DVD recorders, hard disc recorders, car navigation systems, and video game consoles may be used as a platform from which to access the Pochara service server 9.

The examples discussed above have focused primarily on the use of content data. The Pochara the Good Friend acting as the user's agent analyzes the user's preferences to generate the recommended information explained earlier with reference to FIG. 31. Based on the result of the analysis, the Pochara the Good Friend acquires content data deemed to fit the user's preferences from various servers on the Internet 1, without receiving any instructions from the user. Then the user can view the recommended information prepared by the Pochara the Good Friend. When the user issues a recommended information viewing command, the Pochara the Good Friend doll displays images of On-sale Pocharas that introduce the content searched for and collected up to that point. Through the intervention of these On-sale Pocharas, the user can be presented with the content acquired so far. In that case, images of the On-sale Pocharas are displayed without the intervention of the actual On-sale Pochara doll 181.

The same process takes place when the user gains access to the portal site of On-sale Pocharas. In such cases, the billing process is carried out not by any On-sale Pochara but by the Pochara the Good Friend.

The Pochara ID's of On-sale Pocharas may be preserved as bookmarks and registered as the preference information explained above with reference to FIG. 31. This allows the URL of any desired On-sale Pochara to be accessed quickly.

In the foregoing description, the Pochara the Good Friend doll 161 and the On-sale Pochara doll 181 were each presented as an object prominently resembling a doll. Alternatively, an object resembling an animal, a building or other particular entities may be utilized instead.

As a variation of the On-sale Pochara doll, the jacket of a compact disc (CD) or a DVD (digital versatile disc) may be used as the object. In this example, the jacket (object) incorporates an IC chip. When the jacket is placed on the stand, an image of an On-sale Pochara character representing the jacket is displayed on the apparatus connected to the stand. If the jacket belongs to a CD, its Pochara character may illustratively represent the singer who sings the song held as content on the CD.

The On-sale Pochara character on display may have a simulated conversation with the user or may introduce the website dedicated to the singer in question.

As another alternative, the On-sale Pochara may let the user sample the singer's latest song (content) based on coupons recorded in the IC chip held in the jacket. The IC chip may also store comments on the content recorded on the CD as well as promotion information about the singer. These items of information are presented by the On-sale Pochara being displayed.

If the jacket belongs to a DVD, an image of the leading character in the movie recorded on the disc may appear as an On-sale Pochara on display. The IC chip of the jacket may store detailed information about the making of the movie as well as coupons. Based on the stored coupons, the On-sale Pochara may perform processes for selling goods related to the movie in question.

As another category of services, it is possible to provide each On-sale Pochara with the right to acquire content. Purchasing such an On-sale Pochara allows the user to reproduce specific content wherever and whenever desired. In this case, the IC chip of each On-sale Pochara accommodates a service ID representing the type of content that may be acquired through the Pochara. Illustratively, if a user purchases an On-sale Pochara having a service ID that allows 40 songs to be acquired, the user can obtain 40 favorite songs among, say, as many as 2,500 songs stored in the content server.

Figure 52:
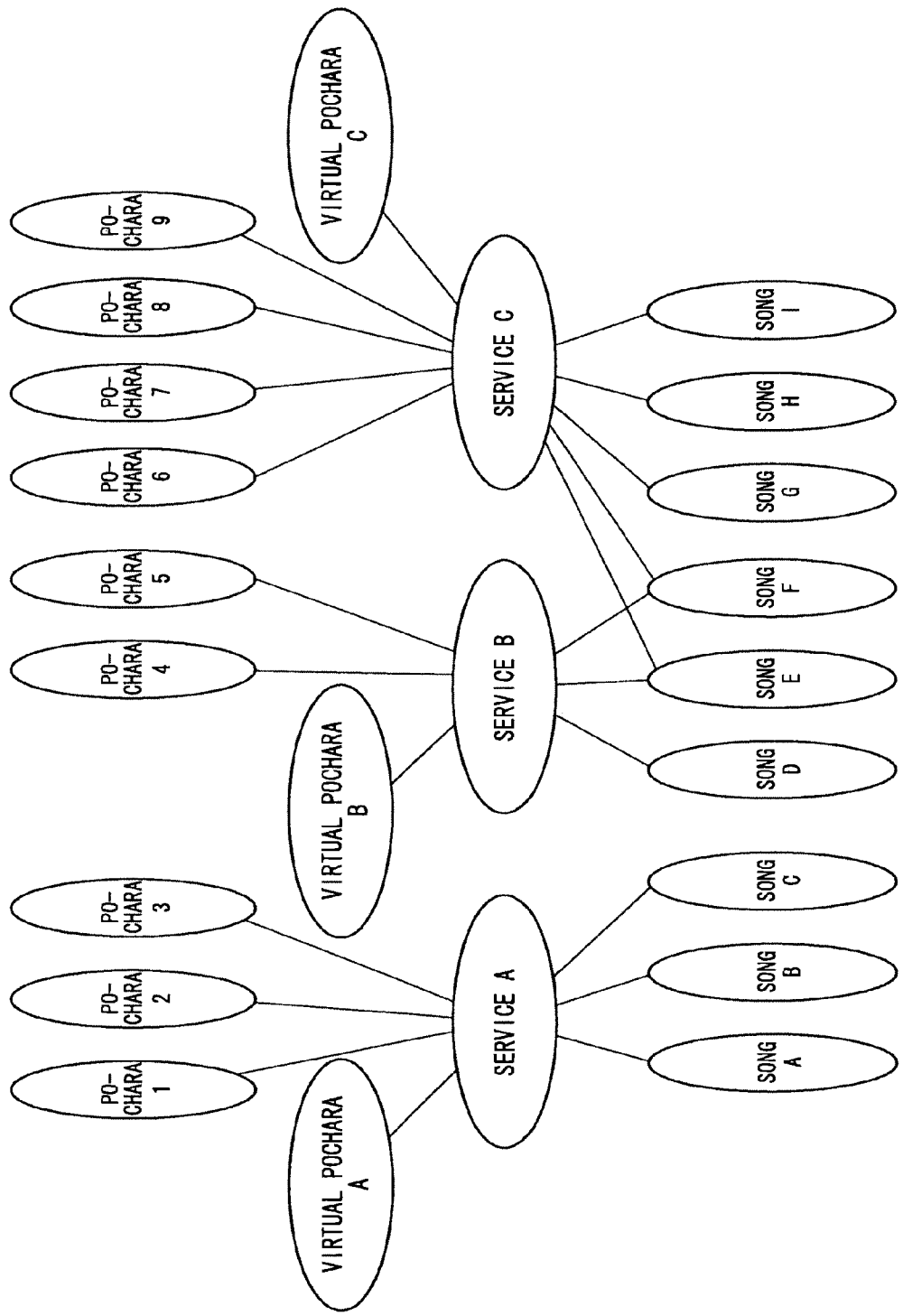
FIG. 52 is a schematic view of a content providing service involving On-sale Pocharas.

How these services are typically offered is shown in FIG. 52. As illustrated, a service A offers songs A, B and C. To get the service A, the user may purchase one of Pocharas 1, 2 and 3 as On-sale Pochara dolls. Where the service A is being used, a virtual Pochara doll A appears on the screen of the user's personal computer.

A service B offers songs D, E and F. To obtain the service B, the user may purchase a Pochara 4 or 5 as an On-sale Pochara doll. Where the service B is being used, a virtual Pochara B is displayed on the user's personal computer.

A service C offers songs E through I. To get the service C, the user may purchase one of Pocharas 6 through 9. Where the service C is being used, a virtual Pochara C appears on the screen of the user's personal computer.

Figure 53:
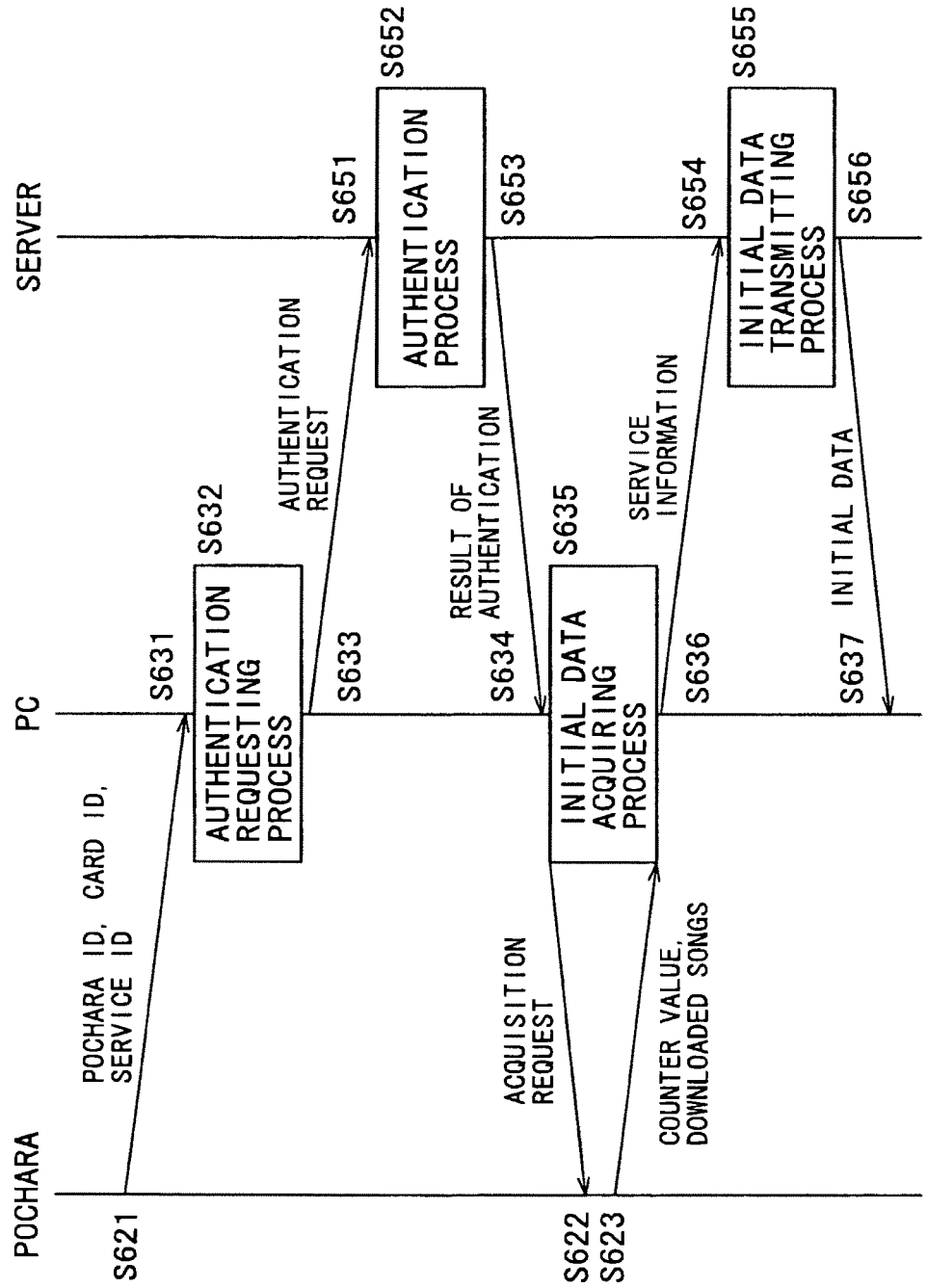
FIG. 53 is a schematic flow diagram outlining On-sale Pochara authentication and initial data acquisition.

FIG. 53 is a schematic flow diagram outlining the process in which content is acquired by use of an On-sale Pochara doll. In step S611, the user places the On-sale Pochara doll 181 on the stand connected to the apparatus to be used. If the user utilizes the personal computer 22, then the On-sale Pochara doll 181 is mounted on the stand 23 connected to the PC 22. A Pochara ID, a card ID, and a service ID are transferred from the IC chip in the On-sale Pochara doll 181 to the personal computer 22.

In step S631, the personal computer 22 acquires the Pochara ID, card ID, and service ID. In step S632, the personal computer 632 carries out an authentication requesting process, to be described later with reference to FIG. 54. In step S633, the personal computer 22 transmits an authentication request to the content server 6. In step S651, the request is received by the content server 6.

Figure 55:
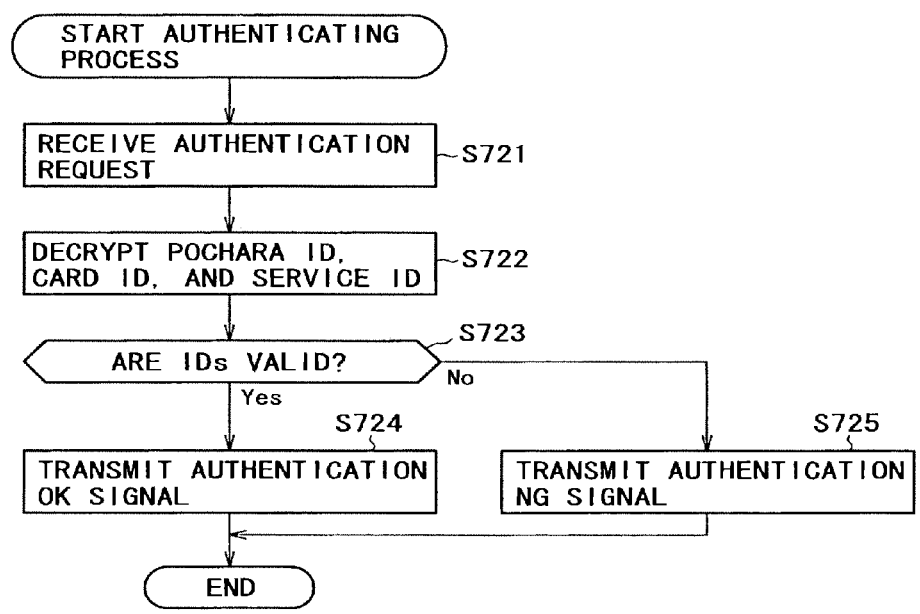
FIG. 55 is a flowchart of steps constituting an authenticating process.

In step S652, the content server 6 performs an authenticating process, to be discussed later with reference to FIG. 55. The process is carried out to authenticate the Pochara mounted on the stand. In step S653, the result of the authentication is transmitted to the personal computer 22. In step S634, the personal computer 22 receives the result of the authentication.

Figure 56:
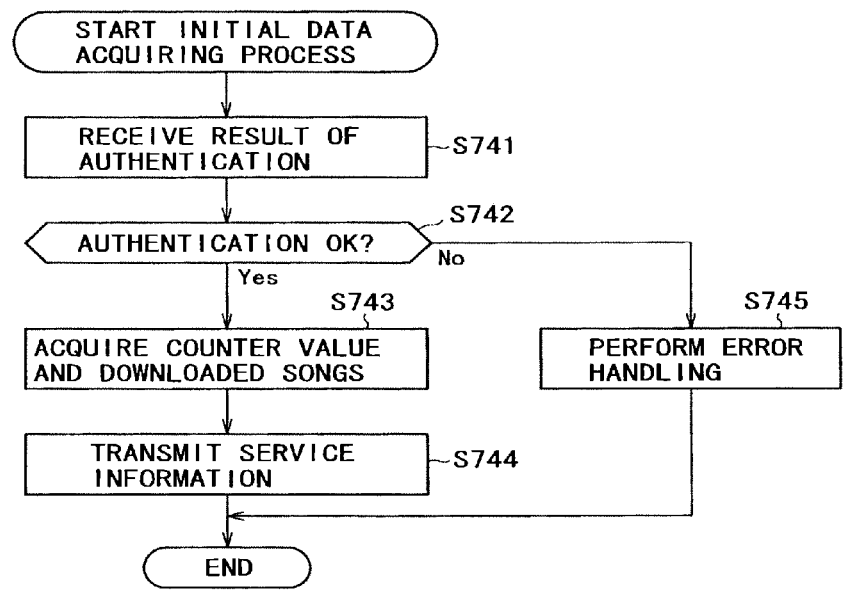
FIG. 56 is a flowchart of steps constituting an initial data acquiring process.

In step S635, the personal computer 22 executes an initial data acquiring process, which will be described later with reference to FIG. 56. At this point, a list of songs (content) acquired through the On-sale Pochara doll 181 and a downloadable count, i.e., a counter value denoting the number of times the user is allowed to download more content are acquired from the On-sale Pochara doll 181 (steps S622 and S623). The acquired data are in encrypted form. The data may be decrypted by use of a key stored in the content server 6; they cannot be decrypted by the personal computer 22.

In step S636, the personal computer 22 transmits the data sent in steps S623 as service information to the content server 6. In step S654, the service information is received by the content server 6. In step S655, the content server 6 carries out an initial data transmitting process, to be discussed later with reference to FIG. 58. This process decrypts the list of songs (content) acquired by use of the On-sale Pochara doll 181 as well as the counter value representative of the downloadable count. The decrypted data are to be stored as initial data into the personal computer 22. In step S656, the content server 6 transmits the initial data to the personal computer 22. In step S637, the personal computer 22 receives the initial data.

Figure 54:
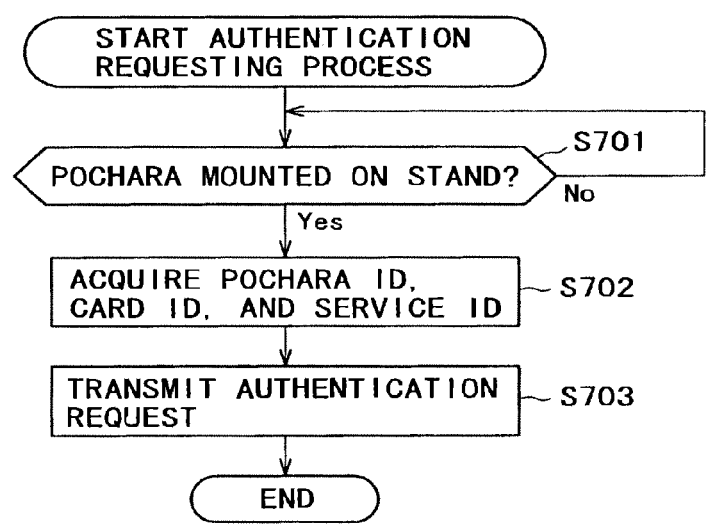
FIG. 54 is a flowchart of steps constituting an authentication requesting process.

The authenticating process in step S631 of FIG. 53 will now be described in more detail with reference to the flowchart of FIG. 54. In step S701, the CPU 221 of the personal computer 22 determines whether the On-sale Pochara doll 181 is placed on the stand 23. The CPU 221 waits until the doll is mounted on the stand.

If in step S701 the On-sale Pochara doll 181 is found to be mounted on the stand 23, the CPU 221 goes to step S702 and acquires a Pochara ID and a service ID from the mounted doll 181. The IC chip in the On-sale Pochara doll 181 contains a service ID specifying the type of service available (e.g., service A) and a card ID identifying the IC chip in question. These data are in encrypted form. It is the encrypted data that are acquired in step S702.

In step S703, the CPU 221 generates an authentication request based on the data obtained in step S702 and transmits the generated request to the content server 6. In the manner described, the request to authenticate the On-sale Pochara doll 181 is sent to the content server 6.

The authenticating process in step S652 of FIG. 53 is described below in more detail with reference to the flowchart of FIG. 55. In step S721, the CPU 121 of the content server 6 receives the authentication request. In step S722, the CPU 121 decrypts the Pochara ID, card ID, and service ID using a decryption key. The decryption keys for decrypting Pochara ID's, card ID's and service ID's are stored beforehand in the storage unit 128 of the server 6.

In step S723, the CPU 121 checks to determine whether the ID's decrypted in step S722 are legitimate. The check of step S723 is carried out specifically as follows: the storage unit 128 of the server 6 has a database containing card ID's in association with service ID's. A check is then made on the database to determine whether the card ID corresponds to one of the stored service ID's. A similar check is made to see if the Pochara ID is valid using another database describing a list of the Pochara ID's associated with the Pochara dolls sold so far.

If in step S723 the ID's are found to be legitimate, the CPU 121 goes to step S724 and transmits an "Authentication OK" signal to the personal computer 22 as the result of the authentication. If any ID is found invalid in step S723, the CPU 121 reaches step S725 and sends an "Authentication NG" signal to the PC 22 as the result of the authentication. This is how the On-sale Pochara doll 181 is authenticated.

The initial data acquiring process in step S635 of FIG. 53 is described below in more detail with reference to FIG. 56. In step S741, the CPU 221 of the personal computer 22 receives the result of the authentication. In step S742, the CPU 221 determines whether the received result of the authentication is the "Authentication OK" signal. If the OK signal is found received in step S742, step S743 is reached. In step S743, the CPU 221 acquires a counter value and downloaded songs from the On-sale Pochara Doll 181.

The IC chip in the On-sale Pochara doll 181 contains information such as that shown in FIG. 57. For example, the On-sale Pochara doll 181 is furnished with a service ID that entitles the user to acquire 40 songs as content. As each song is acquired, its content ID and the date and time of its acquisition are recorded to the chip. In this example, a song corresponding to a content ID "10001" is shown acquired at 13:12, Mar. 7, 2002. That is, the downloaded song is described as content having the content ID "10001." Every time a song is acquired (downloaded), the counter value representative of the downloadable count is decremented by one. The initial value of the downloadable count is 40. One song is shown downloaded in this example, so that the counter value is currently 39.

The information such as that shown in FIG. 57 is stored in encrypted form. That means the information is acquired as encrypted in step S743.

In step S744, the CPU 221 generates service information by adding a predetermined header to the counter value and downloaded songs, and transmits the generated service information to the content server 6.

If in step S742 the "Authentication NG" signal is found to be received (i.e., authentication is unsuccessful), then the CPU 221 goes to step S745. In step S745, the CPU 221 performs error handling.

In the manner described above, the content ID's identifying the downloaded songs placed in the IC chip of the On-sale Pochara doll 181 and the counter value representative of the downloadable count are transmitted in encrypted form to the content server 6.

Figure 58:
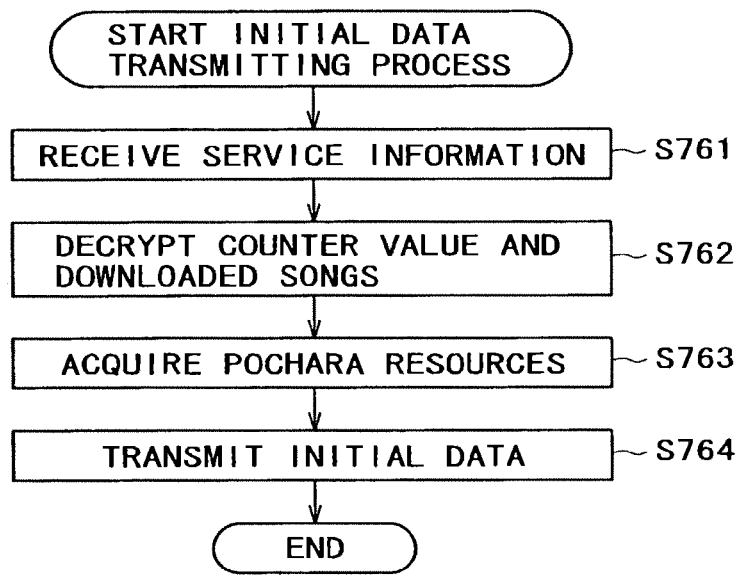
FIG. 58 is a flowchart of steps constituting an initial data transmitting process.

The initial data transmitting process in step S655 of FIG. 53 is described below in more detail with reference to the flowchart of FIG. 58. In step S761, the CPU 121 of the content server 6 receives service information. In step S762, the CPU 121 decrypts the counter value and downloaded songs. The decryption keys for decrypting counter values and downloaded songs are stored beforehand in the storage unit 128 of the content server 6.

In step S763, the CPU 221 acquires Pochara resources. The Pochara resources include information about a three-dimensional image of the Pochara character displayed on the output unit of the personal computer, data about conversations held by the character, and name information about the character. As such, the Pochara resources are stored in advance in the storage unit 128 of the content server 6. Each service is provided with the corresponding Pochara resources that are identified by a service ID identifying the service in question.

In step S764, the CPU 121 attaches a predetermined header to the counter value, downloaded songs and Pochara resources, and transmits the header-furnished data to the personal computer 22 as initial data. The transmitted initial data are stored into the storage unit 228 of the personal computer 22.

The steps above allow the personal computer 22 to recognize the list of the songs acquired (downloaded) through the On-sale Pochara doll 181 as well as the downloadable count. The information held in the IC chip of the On-sale Pochara doll 181 is in encrypted form and can only be decrypted by the content server 6, so that falsification or abuse of the information is prevented more reliably than before.

Figure 59:
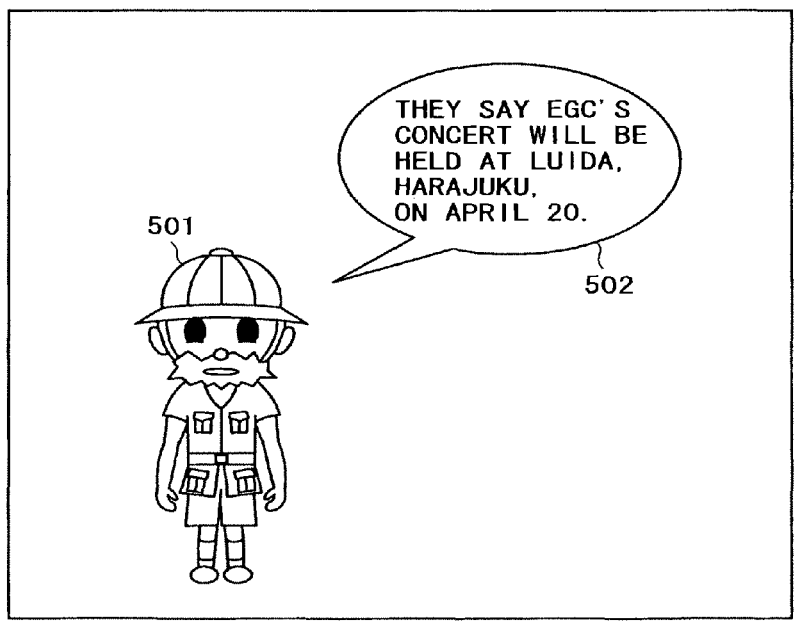
FIG. 59 is a schematic view of a typical screen display that appears upon acquisition of initial data.

In step S764, the display device of the output unit 227 of the personal computer 22 displays an image such as one shown in FIG. 59 on the basis of the transmitted Pochara resources. FIG. 59 depicts a virtual Pochara 501 used by this service, with a balloon 502 indicating the lines spoken by the virtual Pochara. In this example, the balloon 502 contains the speech, "They say EGC's concert will be held at Luida, Harajuku, on April 20."

Service providers may keep providing users with the latest information by updating the Pochara resources as needed. With the most recent information always made available, a user who purchased an On-sale Pochara doll 181 is able to obtain the most up-to-date news about, say, the artist the user is interest in. Such information may be provided in formats that are familiar to the users.

Figure 60:
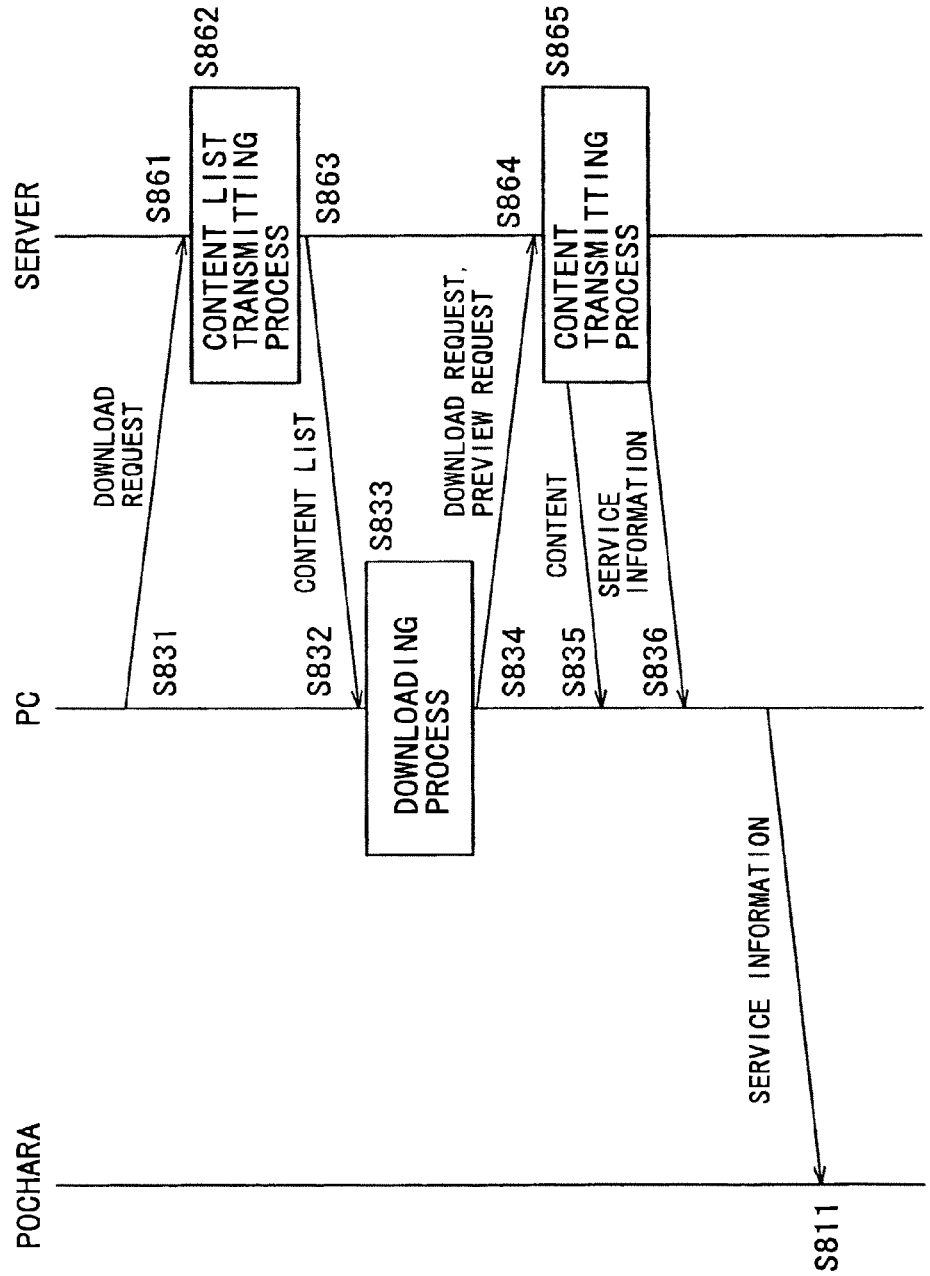
FIG. 60 is a schematic flow diagram of a content downloading process involving an On-sale Pochara.

Described below with reference to FIG. 60 is a typical flow of the content downloading process carried out by use of the On-sale Pochara doll 181. This process is performed following the process described above with reference to FIG. 53. In step S831, the personal computer 22 sends a download request to the content server 6. In step S861, the download request is received by the content server 6. The download request is transmitted illustratively by the user operating the input unit 226 of the personal computer 22 to enter an appropriate command.

Figure 61:
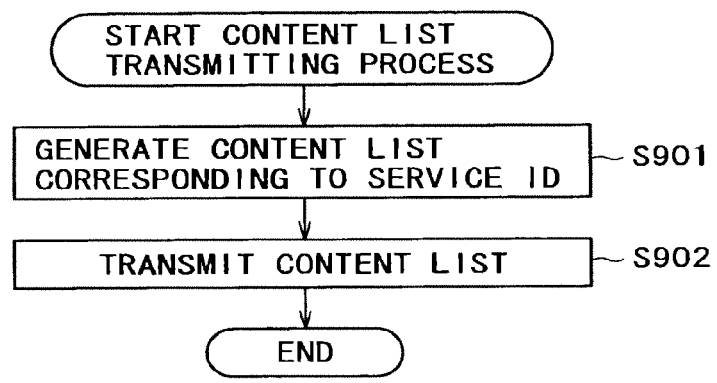
FIG. 61 is a flowchart of a content list transmitting process.

In step S862, the content server 6 executes a content list transmitting process, to be discussed later with reference to FIG. 61. In step S863, the content server 6 transmits a content list to the personal computer 22. In step S832, the content list is received by the personal computer 22.

In step S833, the personal computer 22 carries out a downloading process, to be described later with reference to FIG. 64. During the downloading process, the content to be downloaded or previewed is designated and signaled to the content server 6. In step S834, the personal computer 22 transmits a download request or a preview request to the content server 6. In step S864, the request is received by the content server 6.

In step S865, the content server 6 performs a content transmitting process, to be discussed later with reference to FIG. 67. The content is thus transmitted from the content server 6 to the personal computer 22. In step S835, the content is received by the personal computer 22. Service information is also sent from the content server 6 and received by the personal computer 22 in step S836. In step S811, the service information is received by the On-sale Pochara doll 181.

The content list transmitting process in step S862 of FIG. 60 is described below in more detail with reference to FIG. 61. In step S901, the CPU 121 of the content server 6 generates a content list corresponding to the service ID of interest.

The storage unit 128 of the content server illustratively has a database such as one shown in FIG. 62. In this database, content ID's are stored in association with service ID's, licenses, and downloaded content ID's. For example, a service ID "100" is described on line 1 corresponding to a content ID "1001" in the database. That means any On-sale Pochara having the service ID "100" entitles its buyer to acquire the content corresponding to the content ID "1001." A license "XXXX" is shown described on line 1 corresponding to the content ID "1001." This means the content associated with the content ID "1001" can be decrypted using the license "XXXX."

Downloaded content ID's A, B and C are described on line 1. This indicates that the On-sale Pochara dolls having Pochara ID's A, B and C have already downloaded the content corresponding to the content ID "1001."

Furthermore, the storage unit 128 of the content server stores a database such as one shown in FIG. 63. This database contains a song title of each song corresponding to a content ID, points sold this week, cumulative points sold so far, an album title containing the song in question, and a new-song flag indicating whether this song is a newly released song. Also stored in the database are the name of the artist singing each song, name of the lyricist of the song in question, name of the composer of the song, and playing time of the song.

In addition, the database includes a path to a liner note file introducing each song, a path to a song data file (e.g., WAV file) of the song in question, a path to a karaoke data file of the song, and a path to a jacket photo file for the song. Also described are a release date of each song, a genre name of the song in question, and a preview start frame number and a preview end frame number for the song.

For example, suppose that the service ID received in step S631 (FIG. 53) is "100." In that case, a list of the songs as the content corresponding to the content ID's "1001" and "1003" is generated in step S901. The content list includes the names of the songs, artist names, album titles, and points sold.

In step S902, the CPU 121 transmits the content list to the personal computer 22. In this manner, the list of downloadable songs is sent to the PC 22.

The downloading process in step S833 of FIG. 60 is described below in more detail with reference to the flowchart of FIG. 64. In step S921, the CPU 221 of the personal computer 22 receives a content list. In step S922, the CPU 221 determines whether the downloadable count is at least one. The downloadable count is sent from the content server 6 in step S637 (FIG. 53); the count is acquired by referring to the counter value included in the initial data stored in the personal computer 22.

If in step S922 the downloadable count is found to be at least one, the CPU 221 goes to step S923 and displays a download screen. At this point, the display device of the output unit 227 display a screen such as one shown in FIG. 65. The screen of FIG. 65 indicates a virtual Pochara 501 and a balloon 511, with a download list screen 510 displayed in the top left area of the virtual Pochara.

Figure 66:
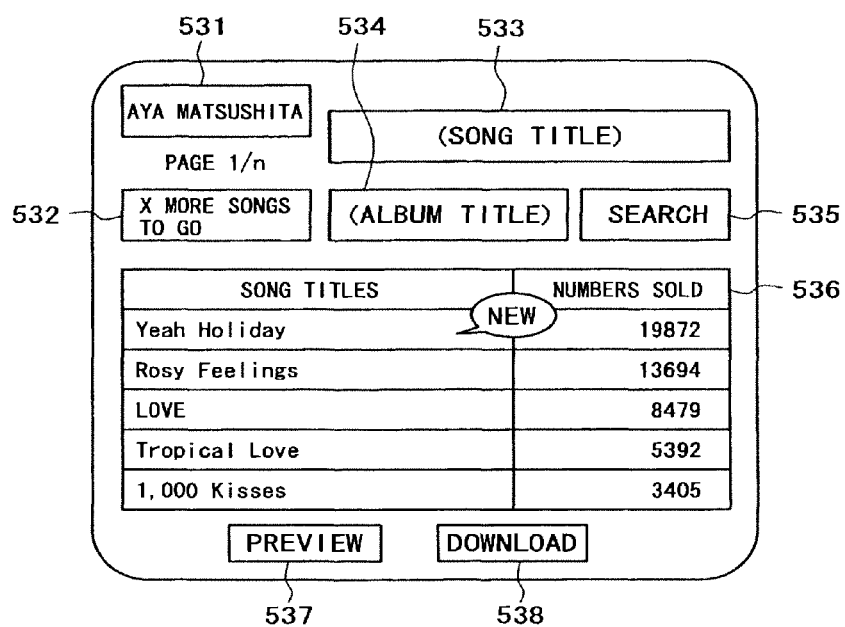
FIG. 66 is a schematic view of a typical download list screen.

FIG. 66 schematically shows a typical download list screen 510. In the screen 510, a field 531 displays the name of the artist associated with the content being listed. By inputting a desired artist name into the field 531, the user can get a display of the names of songs corresponding to the artist and the numbers sold so far of these songs in a field 536. In this example, the songs as the content associated with an artist named Aya Matsushita and the numbers sold so far of these songs are displayed in list form.

In this example, the field 531 is shown accommodating an input of the artist name associated with the content being displayed. Alternatively, the field 531 may be arranged to accept entry of a genre name. This causes the field 536 to display the names of songs corresponding to the input genre and the numbers sold of these songs.

A field 532 indicates a downloadable count (i.e., number of downloadable songs). In this example, the field 532 shows "X more songs to go."

In the download list screen, the user may search for desired content (i.e., a song) by inputting a song name in the field 533 or by entering an album title in the field 534, before clicking on a Search button 535.

Figure 64:
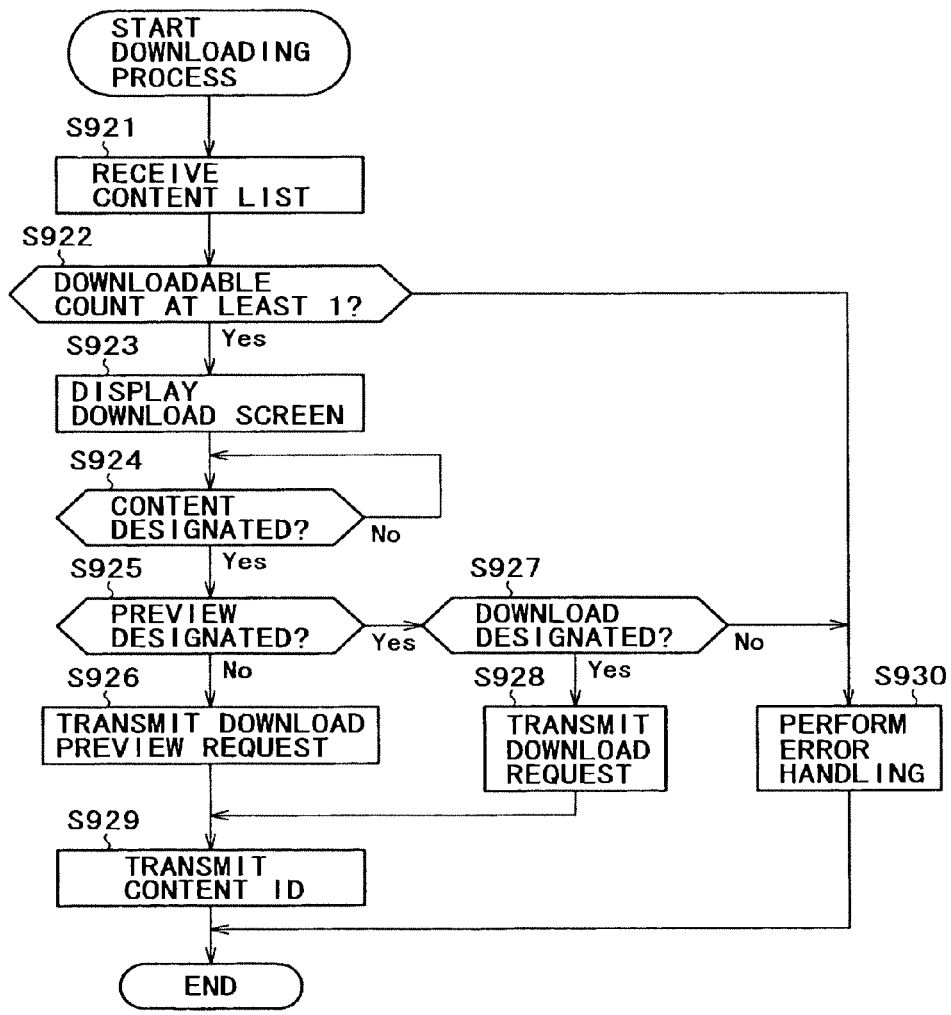
FIG. 64 is a flowchart of steps constituting a downloading process.

Returning to step S924 in FIG. 64, the CPU 221 determines whether any content is designated. The CPU 221 waits until the user specifies content. The content is designated illustratively by clicking once on a song name included in the field 536 of FIG. 66.

If in step S924 any content is found to be designated, step S925 is reached. In step S925, the CPU 22 determines whether a preview is designated. A preview is designated illustratively by the user clicking on a Preview button 537 in FIG. 66. If in step S925 the preview is found to be designated, step S926 is reached. In step S926, the CPU 221 transmits a preview request to the content server 6.

If in step S925 the preview is not found designated, step S927 is reached. In step S927, the CPU 221 determines whether download is designated. The download is designated illustratively by the user clicking on a Download button 538 in FIG. 66. If in step S927 the download is found designated, step S928 is reached. In step S928, the CPU 221 transmits a download request to the content server 6.

After step S926 or S928, the CPU 221 goes to step S929. In step S929, the CPU 221 transmits to the content server 6 the content ID corresponding to the content designated in step S924.

If in step S922 the downloadable count is not found to be at least one, i.e., if the downloadable count is found exhausted, or if in step S927 the download is not found designated, then step S930 is reached. In step S930, the CPU 221 performs error handling. This is the typical way in which the desired content is downloaded.

The content transmitting process in step S865 of FIG. 60 is described below in more detail with reference to FIG. 67. In step S951, the CPU 121 of the content server 6 receives either a download request or a preview request. In step S952, the CPU 121 receives a content ID.

In step S953, the CPU 121 determines whether what was received in step S951 is a download request. If the download request is found to be received, step S954 is reached. In step S954, the CPU 121 carries out a download content transmitting process, to be discussed later with reference to FIG. 68.

If in step S953 what was received is not found to be the download request (i.e., a preview request was received), step S955 is reached. In step S955, the CPU 121 performs a preview content transmitting process, to be described later with reference to FIG. 70.

Figure 67:
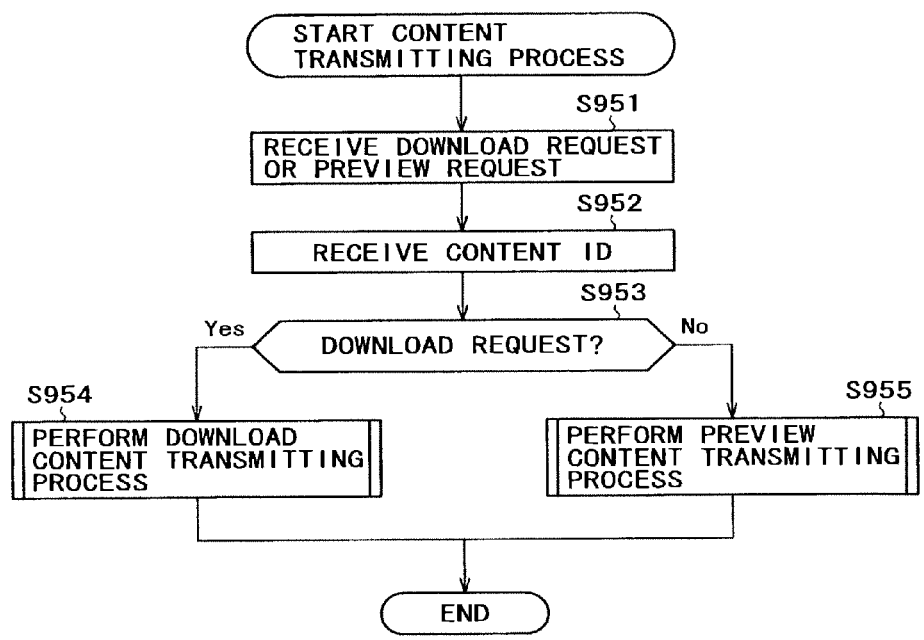
FIG. 67 is a flowchart of steps constituting a content transmitting process.
Figure 68:
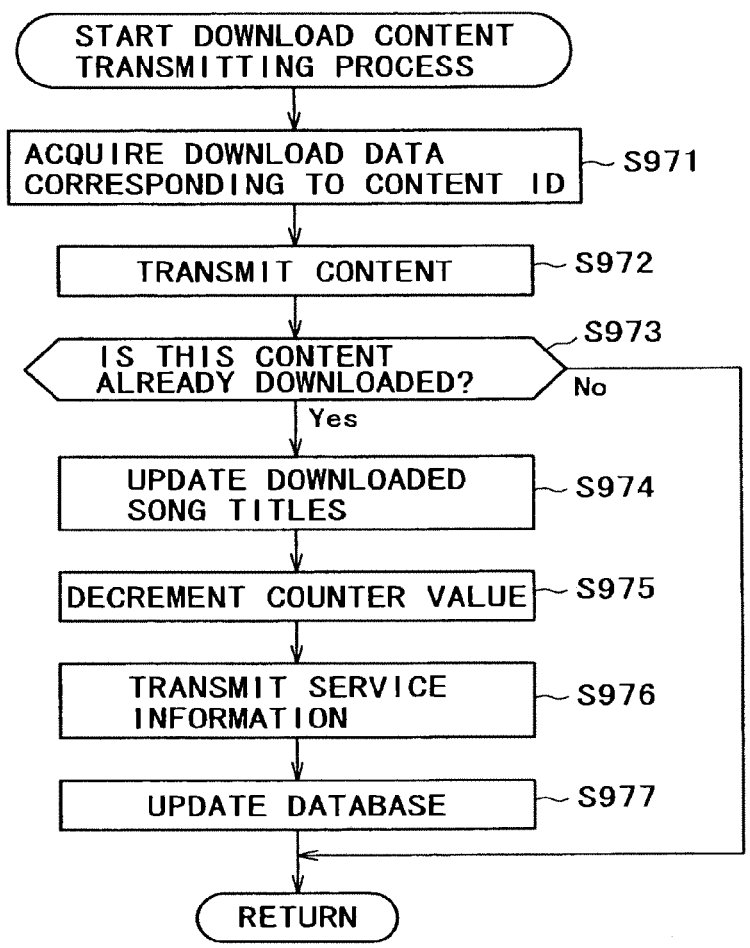
FIG. 68 is a flowchart of steps constituting a download content transmitting process.

The download content transmitting process in step S954 of FIG. 67 is described below in more detail with reference to FIG. 68. In step S971, the CPU 121 acquires download data corresponding to the content ID of interest.

The storage unit 128 of the content server stores data such as those shown in FIG. 69. Song fringe data 601 about each song are constituted by a group of files describing information including the playing time of the song in question. Lyrics data 602 are made up of a group of files describing the lyrics of each song. Liner notes 603 are a group of files describing comments introducing the song in question. A jacket photo 604 is a group of computer-readable files (e.g., JPEG files) prepared based on the actual jacket photo of the CD carrying the song. Song data 605 constitute a group of files (e.g., WAV files) regarding the song. The song fringe data 601 through the song data 605 constitute a plurality of files about each of the stored songs. Each of the files is identified in association with a content ID.

As discussed above, the storage unit 128 of the content server has the database such as that shown in FIG. 63. In this database, designating a content ID determines the path to the liner note file corresponding to the content ID in question, path to the corresponding song data files, path to the corresponding karaoke data (song fringe data and lyrics data) files, and path to the corresponding jacket photo files. In step S971, the CPU 121 designates those files from among the song fringe data 601 through the song data 605 which correspond to the content ID in question. The designated files are merged and acquired as download data.

In step S972, the CPU 121 transmits the download data acquired in step S971 to the personal computer 22 as content. The transmitted content is received by the personal computer 22 in step S835 (FIG. 60) and stored into the storage unit 228. The content is encrypted when transmitted and are placed into the storage unit 228 as encrypted. To reproduce any encrypted content requires making use of a decryption key (i.e., license), which will be discussed later.

Figure 65:
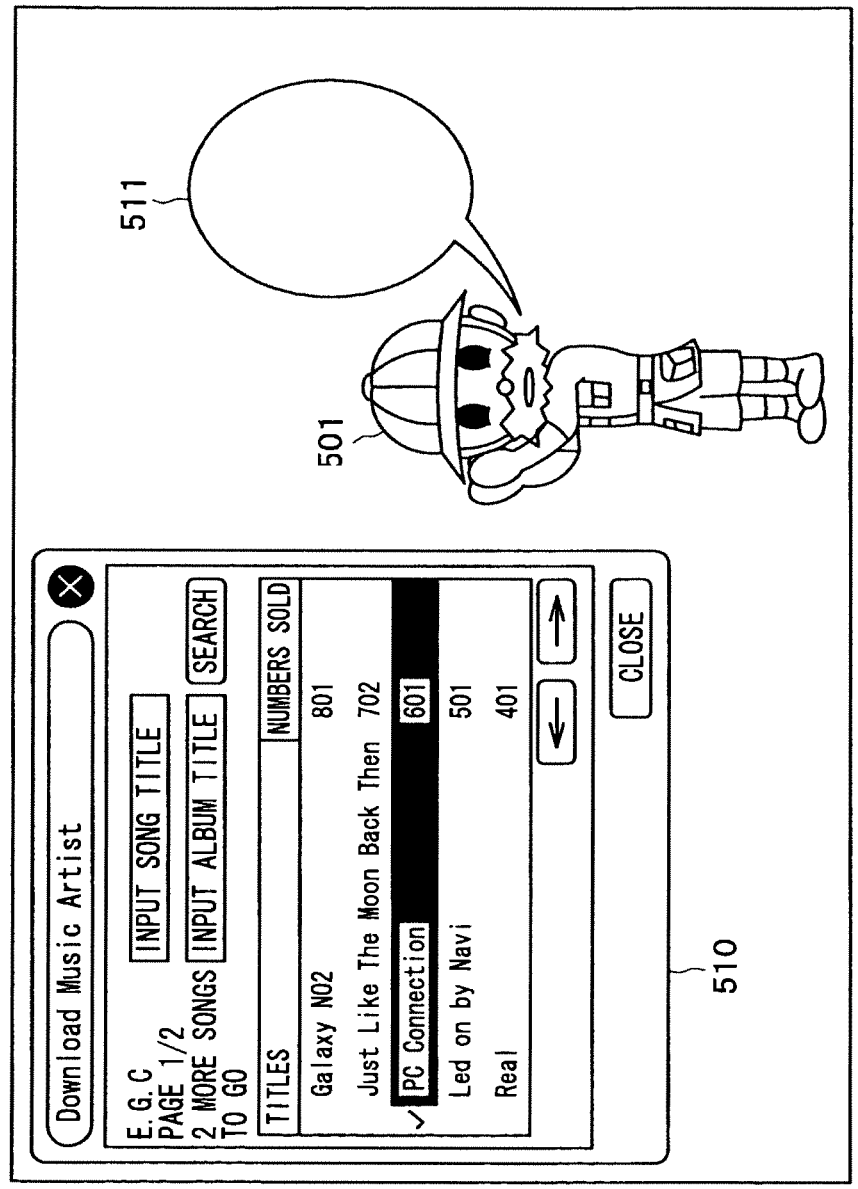
FIG. 65 is a schematic view of a typical screen display that appears during the downloading process.

While the download data are being received, download progress status (e.g., indicated as "Download X % complete") is displayed illustratively in the balloon 511 of the display screen in FIG. 65, on the display device of the output unit 227 attached to the personal computer 22.

In step S973, the CPU 121 checks to determine whether the download of the content is completed. The check is made on the basis of the downloaded song titles described in the service information acquired in step S654 (FIG. 53).

If in step S973 the download of the content is not found to be complete, step S974 is reached. In step S974, the CPU 121 updates the downloaded song titles in the service information obtained in step S654 (FIG. 53). For example, if the content corresponding to a content ID "1002" has been transmitted, the CPU 121 supplements the downloaded song titles with the song corresponding to the content ID "1002."

In step S975, the CPU 121 decrements the counter value in the service information acquired in step S654 (FIG. 53).

In step S976, the CPU 121 sends to the personal computer 22 the service information updated in steps S974 and S975. The transmitted service information is received by the personal computer 22 in step S836 (FIG. 60). In step S811, the received service information is placed into the IC chip of the On-sale Pochara doll 181.

In step S977, the CPU 121 updates the database. At this point, the downloaded content ID's are updated in the database shown in FIG. 62. Illustratively, if the content corresponding to a content ID "1003" is downloaded, the downloaded content ID field on line 3 is supplemented with a downloaded content ID "A."

If in step S793 the download of the content is found to be complete, steps S974 through S977 are skipped. In this manner, the downloaded content is transmitted, and the information held in the IC chip of the On-sale Pochara doll 181 is updated accordingly.

Figure 70:
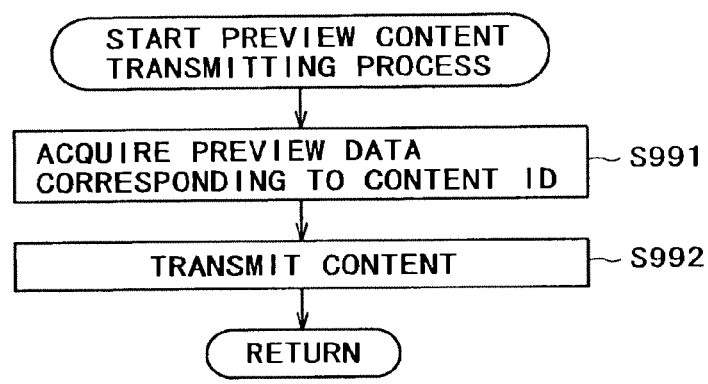
FIG. 70 is a flowchart of steps constituting a preview content transmitting process.

The preview content transmitting process in step S955 of FIG. 67 is described below in more detail with reference to FIG. 70. In step S991, the CPU 121 acquires preview data corresponding to the content ID of interest. At this point, the CPU 121 designates those files from among the song fringe data 601 through the song data 605 in FIG. 69 which correspond to the content ID in question. From the designated files, data are extracted in accordance with the relevant preview start frame number and preview end frame number found in the database of FIG. 63. The extracted data are merged into preview data.

Alternatively, it is possible to prepare beforehand preview-oriented song fringe data 601 through song data 605 of slightly reduced image or sound quality. From these data, the files corresponding to a particular content ID may be designated and merged into preview data.

In step S992, the CPU 121 transmits the preview data acquired in step S991 to the personal computer 22 as content. This allows the user to preview (i.e., sample) the content of interest. For a preview, the downloadable count (counter value) in the IC chip of the On-sale Pochara doll is not decremented, so that the user can readily test-listen to desired songs. Upon receipt of the preview data, the personal computer 22 is set to reproduce the data. At this point, the display device of the output unit 227 of the personal computer 22 displays the liner notes corresponding to the content illustratively in the balloon 511 on the display screen of FIG. 65.

The user can reproduce the acquired (i.e., downloaded) content using the On-sale Pochara doll 181. The apparatus to be used for reproduction may or may not be the apparatus through which the content in question was downloaded.

For example, if the personal computer 22 through which the content was downloaded is to be used for reproduction, the user mounts the On-sale Pochara doll 181 on the stand 23 connected to the PC 22. If the personal computer 26 through which the content was not downloaded is to be utilized for reproduction, the user places the On-sale Pochara doll 181 on the stand 27 connected to the PC 22. Then another process similar to what was discussed above with reference to FIG. 53 is carried out so that the initial data are stored into the personal computer 22 or 26.

In the examples above, the apparatus in use was shown to be the personal computer 22 or 26. However, this is not limitative of the invention and other apparatuses may be employed instead.

Figure 71:
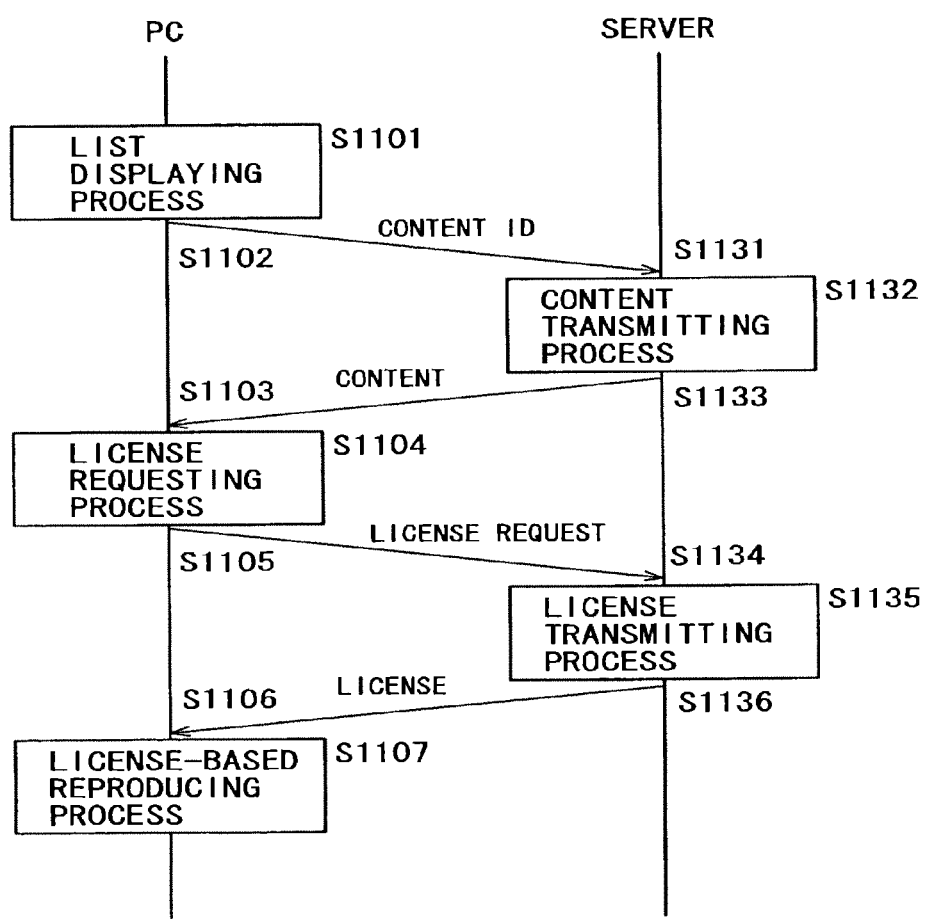
FIG. 71 is a schematic flow diagram of a content reproducing process involving an On-sale Pochara.

Described below with reference to FIG. 71 is a typical flow of the content reproducing process. In step S1101, the personal computer 22 or 26 carries out a list displaying process, to be discussed later by referring to FIG. 72. This causes a content list to be displayed so that the user may designate desired content to be reproduced. At this point, a search is made for the designated content through the storage unit 228 of the personal computer 22 or 26.

For example, if the user is utilizing the personal computer 22, then the content in question is already stored (i.e., downloaded) in the storage unit 228; if the user is operating the personal computer 26, then the content of interest is not found in the storage unit 228.

If the content is not found in the storage unit 228, step S1102 is reached. In step S1102, the personal computer 26 sends the content ID to the content server 6. In step S1131, the content ID is received by the content server 6. In step S1132, the content server 6 performs a content transmitting process corresponding to the content ID. This process is the same as the content transmitting process discussed above with reference to FIG. 67, and thus will not be discussed further. In step S1133, the content server 6 transmits the content to the personal computer 26. In step S1103, the content is received by the personal computer 26.

If the user is employing the personal computer 22, then the content of interest is already stored (downloaded) in the storage unit 228. In that case, steps S1102, S1131, S1132, S1133, and S1103 are skipped.

Figure 75:
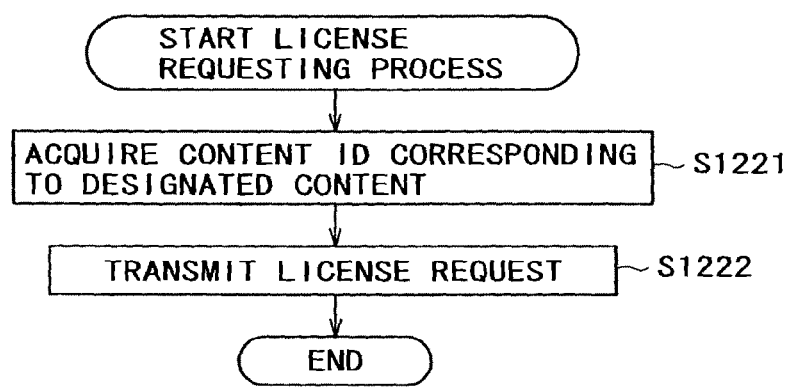
FIG. 75 is a flowchart of steps constituting a license requesting process.

In step S1104, the personal computer 22 or 26 carries out a license requesting process, to be discussed later with reference to FIG. 75. In step S1105, the personal computer 22 or 26 transmits a license request to the content server 6. In step S1134, the license request is received by the content server 6. In step S1135, the content server 6 executes a license transmitting process, to be described later with reference to FIG. 76. This process involves transmitting a license as an encryption key for decrypting the encrypted content.

In step S1106, the content server 6 transmits the license to the personal computer 22 or 26. In step S1106, the license is received by the personal computer 22 or 26. In step S1107, the personal computer 22 or 26 carries out a license-based reproducing process, to be discussed later with reference to FIG. 77. Executing the process of step S1107 reproduces the content of interest.

The list displaying process in step S1101 of FIG. 71 is described below in more detail with reference to the flowchart of FIG. 72. In step S1201, the CPU 221 of the personal computer 22 or 26 displays a reproduction screen. At this point, the display device of the output unit 227 indicates an image such as one shown in FIG. 73.

Figure 73:
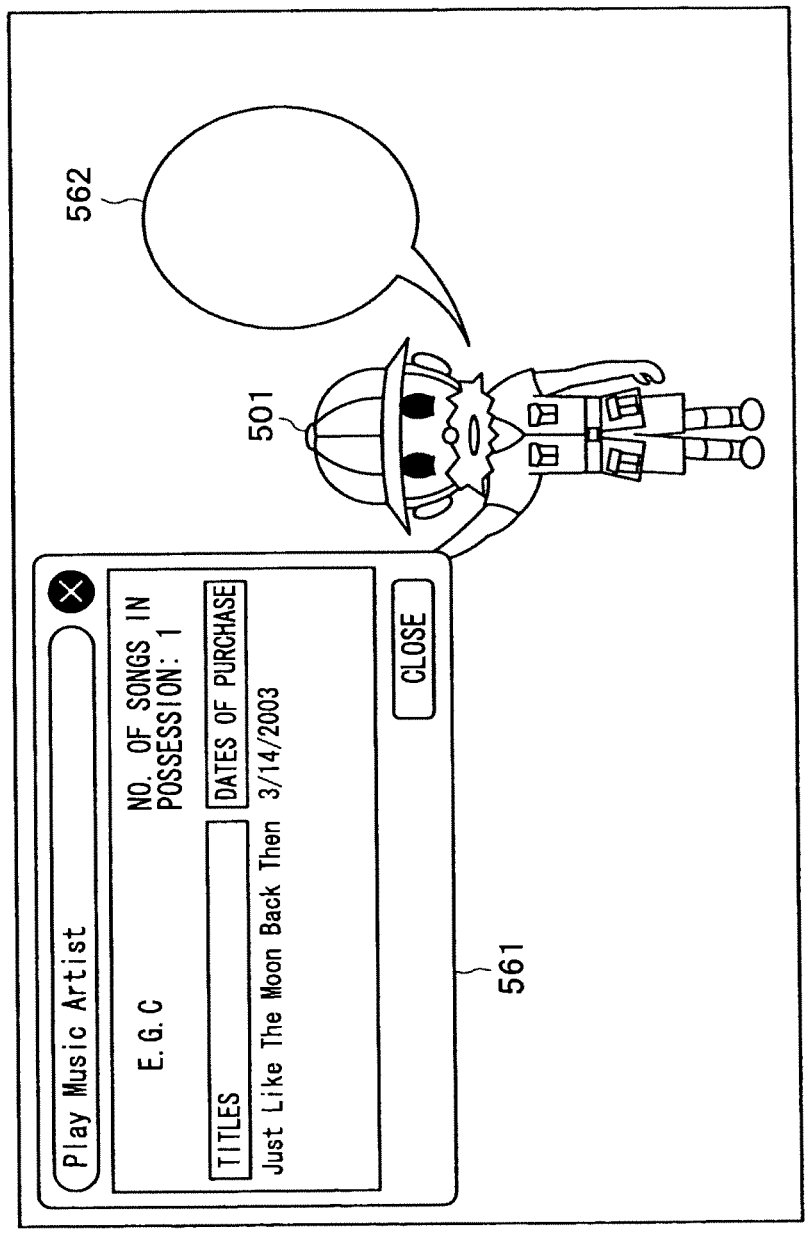
FIG. 73 is a schematic view of a typical display screen that appears during the list displaying process.

FIG. 73 schematically shows a virtual Pochara 501 and a balloon 562. In the top left area of the virtual Pochara is a reproduction list screen 561.

FIG. 74 schematically depicts a typical reproduction list screen 561. A field 581 on the screen 561 indicates the name of the artist associated with the content being displayed. The user may input a desired artist name into the field 581. This causes a field 583 to display the titles of acquired songs associated with the artist and dates of their purchases (i.e., dates of acquisition). In this example, the titles of the songs associated with an artist named Aya Matsushita are displayed in tabular form along with the dates of their purchases.

Of the content displayed in the field 538, the titles of acquired songs and the dates of their purchases are displayed in a dark color if these songs are already stored in the storage unit 228; the song titles and the dates of the songs' purchases are displayed in a light color if the songs are not stored in the storage unit 228.

Illustratively, the title of a song "Rosy Feelings" on line 1 in the field 538 is displayed in a light color along with the date of its purchase "Feb. 2, 2002." This means that the content was acquired through the use of this On-sale Pochara doll 181 but is not stored in the storage unit 228 of the currently used personal computer. That is, the content was downloaded using another apparatus. The title of a song "1,000 Kisses" on line 2 in the field 538 is displayed in a dark color along with the date of its purchase "Apr. 4, 2002." It indicates that the content was acquired using this On-sale Pochara doll 181 and is now stored in the storage unit 228 of the currently used personal computer.

In this example, the field 581 was shown admitting the name of the artist associated with the content being displayed. Alternatively, the field 581 may accept input of a genre name. This will cause the field 583 to display the titles of acquired songs and the dates of their purchases in connection with the genre of interest.

A field 582 displays the number of songs in the user's possession. This is the number of songs downloaded (acquired) using the On-sale Pochara doll 181. The display in this example indicates "No. of content in possession: Y."

Returning to step S1202 of FIG. 72, the CPU 221 determines whether the content to be reproduced is designated. The CPU 221 waits until such designation is made. Illustratively, the user may operate the input unit 226 to double-click on the title of a desired song in the reproduction list screen of FIG. 74. If in step S1202 the content to be reproduced is found designated, the CPU 221 goes to step S1203.

In step S1203, the CPU 221 determines whether the content to be reproduced is located in the terminal (i.e., in the apparatus currently used). For example, if the content on line 1 (song title: "Rosy feelings") is designated in the field 583 of FIG. 74 for reproduction, the CPU 221 determines that the song in question is not found in the terminal. In that case, step S1204 is reached. In step S1204, the CPU 221 transmits to the content server the content ID corresponding to the designated content, and downloads the content in question from the server.

At this point, the content server 6 sends the content to the personal computer 22 or 26. This content transmitting process (step S1132 of FIG. 71) is the same as the process discussed above with reference to FIGS. 67 and 68. Because the content is found already downloaded in step S973 (FIG. 68), steps S974 through S977 are skipped.

If, say, the song title "1,000 kisses" on line 2 in the field 583 is designated as the content to be reproduced, that content is found to exist in the terminal. In this case, step S1204 is skipped. In the manner described, the content to be reproduced is designated, and is downloaded if not located in the terminal.

The license requesting process in step S1104 of FIG. 71 is described below in more detail with reference to the flowchart of FIG. 75. In step S1221, the CPU 221 of the personal computer 22 or 26 acquires the content ID corresponding to the designated content. In step S1222, the CPU 221 transmits a license request to the content server 6 with a predetermined header added to the content ID acquired in step S1221. This is how the license for reproduction of the content is requested.

Figure 76:
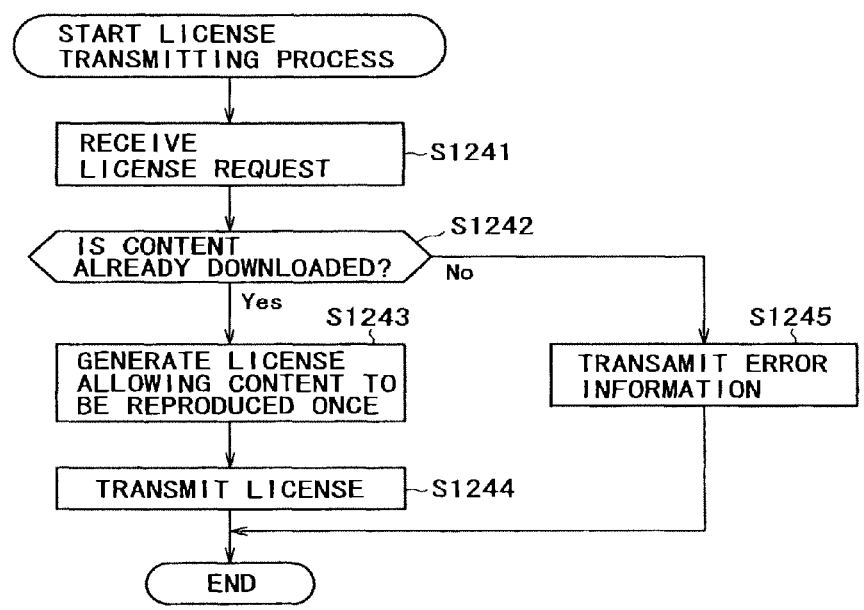
FIG. 76 is a flowchart of steps constituting a license transmitting process.

The license transmitting process in step S1135 of FIG. 71 is described below in more detail with reference to FIG. 76. In step S1241, the CPU 121 of the content server 6 receives a license request. In step S1242, the CPU 121 checks to determine whether the content in question is already downloaded. This check is made by referring to the database shown in FIG. 62.

In step S1243, the CPU 121 generates a license for allowing the content to be reproduced once. Generation of the license is accomplished by use of such techniques as Open MGX, Windows, or DRM (Digital Rights Management). In step S1244, the CPU 121 transmits the generated license to the personal computer 22 or 26. In this manner, the license as the key to decrypting the encrypted content is transmitted.

The license-based reproducing process in step S1107 of FIG. 71 is described below in more detail with reference to the flowchart of FIG. 76. In step S1261, the CPU 221 of the personal computer 22 or 26 receives the license. In step S1262, the CPU 221 decrypts the content based on the acquired license to reproduce the content.

At this point, an image such as one shown in FIG. 78 is displayed on the display device of the output unit 227 attached to the personal computer 22 or 26. FIG. 78 schematically depicts a virtual Pochara doll 501 and a balloon 562 on display. In the top left area of the virtual Pochara doll 501 is a reproduction list screen 561. In the bottom left area of the doll 501 is a jacket photo 563 of the content in question. The balloon 562 shows the lyrics of the content being reproduced, and the virtual Pochara 501 gives predetermined choreographed motions. This is how the content is reproduced.

The content server 6 manages licenses for content reproduction in the manner described above. All content is encrypted, so that the user must acquire a license for reproducing any desired content by use of the On-sale Pochara doll 181. Even if content is illegally copied, it cannot be reproduced and thus the copyrights of the content are protected. The user who purchased the On-sale Pochara doll 181 can readily reproduce the content by simply placing the doll 181 on the stand. Every time content is set to be reproduced, the content server 6 checks to see if the On-sale Pochara doll has a legitimate ID. This provides more secure protection of the copyrights of the content than ever.

In the foregoing examples, the content server 6 was shown managing licenses for the acquired content. Alternatively, it is possible to store a license in the IC chip of the On-sale Pochara doll 181 so that the license may be acquired from the doll 181 when the content is to be reproduced. This allows the user to acquire the content associated with the service ID of the On-sale Pochara doll 181 as desired for reproduction.

A suitable object may be arranged to store user identification information, so that the display device mounted with the object may display an image specifically representing the object in question. The displayed image prompts users intuitively to recognize their own objects, effectively preventing them from mistakenly using other users' objects.

Where an information processing apparatus having user identification information stored and managed therein receives user identification information from another information processing apparatus, the received information is checked against the stored user identification information for authentication. Based on the result of the authentication, the apparatus sends over the network display information necessary for the other information processing apparatus to display an image representative of the user identification information. This setup makes it possible to identify easily and reliably the user operating the other information processing apparatus.

Acquired user identification information may be transmitted to the other information processing apparatus over the network. In that case, the result of authentication regarding the user identification information in question is received from the other information processing apparatus. Based on the result of the authentication, an image corresponding to the user identification information is displayed. This setup allows the user to have his or her identity reliably authenticated.

A doll may be arranged to incorporate a memory that stores user identification information, and the doll may be shaped to be indicative of the image to be displayed. This makes it possible for the user to perform the authenticating process dependably by use of the doll.

Objects may be distributed with each object containing object identification information, and pieces of the object identification information may be received over the network. In that case, each received piece of object identification information is associated with relevant content identification information which in turn is used to transmit the corresponding content over the network. This constitutes a system whereby the content is distributed more effectively to the users.

A notice based on object identification information originated by a second other information processing apparatus may be transferred to a first information processing apparatus so that the latter apparatus may perform a billing process on the user of the second other information processing apparatus. This arrangement makes it possible to provide securely each user with content and to collect reliably the payment for the provided content.

Content identification information stored in an object may be acquired and transmitted over the network to another information processing apparatus, so that the corresponding content may be received and output. In that case, simply obtaining the object allows the user to make use of the corresponding content reliably.

A memory inside each doll may be arranged to store doll identification information, and the doll may be shaped to represent an image associated with content. This arrangement makes it possible to distribute the content effectively to users.

A memory inside each object may be arranged to retain content identification information, and the object may be arranged to retain features evocative of the image associated with the content. This arrangement allows users to make use of the content in a more enjoyable manner.

The series of steps described above may be executed either by hardware or by software. For the software-based processing to take place, the programs constituting the software may be either incorporated beforehand in dedicated hardware of a computer or installed upon use over a network or from a suitable storage medium into a general-purpose computer or like equipment capable of performing diverse functions based on the installed programs.

As shown in FIG. 2 or 3, the storage medium is offered to users apart from the apparatus itself not only as a package medium constituted by the magnetic disc 141 or 251 (including floppy discs), optical disc 142 or 252 (including CD-ROM (compact disc-read only memory) and DVD (digital versatile disc)), magneto-optical disc 143 or 253 (including MD (Mini-disk)), or semiconductor memory 144 or 254; but also in the form of the ROM 122 or 222, or a hard disc drive in the storage unit 128 or 228, each containing the programs and incorporate beforehand in the computer.

In this specification, the steps which are stored on the storage medium and which describe the programs to be executed by the computer represent not only the processes that are carried out in the depicted sequence (i.e., on a time series basis) but also processes that may be performed parallelly or individually.

In this specification, the term "system" refers to an entire configuration made up of a plurality of component devices.

INDUSTRIAL APPLICABILITY

As described, the information processing apparatus and information processing method according to the invention constitute a system capable of recognizing each user reliably and of preventing the user from inadvertently making use of any other user's object.

The first information processing apparatus, first information processing method, first program storage medium, and first program of this invention allow another information processing apparatus to recognize the user reliably. They also make it possible for the user of the other information processing apparatus to verify dependably whether the correct result of authentication is acquired.

The second information processing apparatus, second information processing method, second program storage medium, and second program of this invention permit reliable authentication of each user. They also make it possible for the user to determine reliably whether the correct result of authentication is acquired.

The first doll of this invention allows the user in possession of it to be identified reliably. The doll also prevents the user from inadvertently making use of any other doll for his or her authentication.

The information providing system and information providing method according to the invention constitute a system capable of delivering large quantities of content to users in a secure manner.

The third information processing apparatus, third information processing method, third program storage medium, and third program of this invention provide content dependably to each user. They also make it possible to collect the payment for the content unfailingly from the user.

The fourth information processing apparatus, fourth information processing method, fourth program storage medium, and fourth program of this invention provide an apparatus being used by the user with desired content.

The fifth information processing apparatus, fifth information processing method, fifth program storage medium, and fifth program of this invention provide simple and quick utilization of content. In addition, they eliminate the need for providing complicated structures for content usage.

The second doll of this invention induces users in a simple and dependable manner to buy content. The doll also provides content in secure and reliable fashion to the users.

Furthermore, the object of this invention allows users to enjoy content in a deeper, more impressive manner than before.

It should be understood by those skilled in the art that various modifications, combinations, sub-combinations and alterations may occur depending on design requirements and other factors insofar as they are within the scope of the appended claims or the equivalents thereof.

The invention is claimed as follows:

1. An information processing method for use with an information processing apparatus operably coupled to a reader device, comprising:
   detecting a doll, which includes an IC chip, being mounted on the reader device;
   acquiring identification information from the doll via the reader device;
   controlling an output unit to display a first image corresponding to the identification information acquired from the doll;
   detecting the doll being dismounted from the reading device; and
   controlling the output unit to display a second image in response to detecting the doll being dismounted from the reading device.

2. The information processing method according to claim 1, further comprising:
   controlling the output unit to display a stage entrance before detecting the doll being mounted on the reader device and to display the first image based on a stage entrance.

3. The information processing method according to claim 1, further comprising:
   controlling the output unit to display a plurality of icons representing functions.

4. The information processing method according to claim 3, wherein the first image is surrounded by the plurality of icons on the output unit.

5. The information processing method according to claim 3, wherein the plurality of icons are displayed based on a user operation.

6. The information processing method according to claim 1, further comprising:
   controlling the output unit to display a third image including a first costume that is different from a second costume included in the first image based on a user operation.

7. The information processing method according to claim 1, further comprising:
   controlling the output unit to display a forth image including a first item that is different from a second item included in the first image based on a user operation.

8. The information processing method according to claim 1, wherein the first image has approximately the same shape as the doll.

9. A non-transitory computer readable medium storing instructions, which when executed by a processor, cause the processor to:
   detect a doll, which includes an IC chip, being mounted on a reader device operably coupled to the processor;
   acquire identification information from the doll via the reader device;
   control an output unit to display a first image corresponding to the identification information acquired from the doll;
   detect the doll being dismounted from the reading device; and
   control the output unit to display a second image in response to detecting the doll being dismounted from the reading device.

10. The non-transitory recording medium according to claim 9, further comprising instructions, which when executed by a processor, cause the processor to:
    control the output unit to display a stage entrance before detecting the doll being mounted on the reader device and to display the first image based on a stage entrance.

11. The non-transitory recording medium according to claim 9, further comprising instructions, which when executed by a processor, cause the processor to:
    control the output unit to display a plurality of icons representing functions.

12. The non-transitory recording medium according to claim 11, wherein the first image is surrounded by the plurality of icons on the output unit.

13. The non-transitory recording medium according to claim 11, wherein the plurality of icons are displayed based on a user operation.

14. The non-transitory recording medium according to claim 9, further comprising instructions, which when executed by a processor, cause the processor to:
    control the output unit to display a third image including a first costume that is different from a second costume included in the first image based on a user operation.

15. The non-transitory recording medium according to claim 9, further comprising instructions, which when executed by a processor, cause the processor to:
    control the output unit to display a forth image including a first item that is different from a second item included in the first image based on a user operation.

16. The non-transitory recording medium according to claim 9, wherein the first image has approximately the same shape as the doll.

17. An information processing apparatus, comprising:
    a processor; and
    a memory device storing computer readable instructions, which when executed by the processor, cause the processor to:
      detect a doll, which includes an IC chip, being mounted on a reader device operably coupled to the processor;
      acquire identification information from the doll via the reader device;
      control an output unit to display a first image corresponding to the identification information acquired from the doll;
      detect the doll being dismounted from the reading device; and
      control the output unit to display a second image in response to detecting the doll being dismounted from the reading device.

18. The information processing apparatus according to claim 17, further comprising computer readable instructions, which when executed by a processor, cause the processor to:

control the output unit to display a stage entrance before detecting the doll being mounted on the reader device and to display the first image based on a stage entrance.

19. The information processing apparatus according to claim 17, further comprising computer readable instructions, which when executed by a processor, cause the processor to:
control the output unit to display a plurality of icons representing functions.

20. The information processing apparatus according to claim 19, wherein the first image is surrounded by the plurality of icons on the output unit.

21. The information processing apparatus according to claim 19, wherein the plurality of icons are displayed based on a user operation.

22. The information processing apparatus according to claim 17, further comprising computer readable instructions, which when executed by a processor, cause the processor to:
control the output unit to display a third image including a first costume that is different from a second costume included in the first image based on a user operation.

23. The information processing apparatus according to claim 17, further comprising computer readable instructions, which when executed by a processor, cause the processor to:
control the output unit to display a forth image including a first item that is different from a second item included in the first image based on a user operation.

24. The information processing apparatus according to claim 17, wherein the first image has approximately the same shape as the doll.

* * * * *